United States Patent [19]
Fujita

[11] Patent Number: 5,930,450
[45] Date of Patent: Jul. 27, 1999

[54] RECORDING MEDIUM, APPARATUS AND METHOD OF RECORDING DATA ON THE SAME, AND APPARATUS AND METHOD OF REPRODUCING DATA FROM THE RECORDING MEDIUM

[75] Inventor: Kazuya Fujita, Kawasaki, Japan

[73] Assignee: Kabushiki Kaisha Toshiba, Kawasaki, Japan

[21] Appl. No.: 08/607,486

[22] Filed: Feb. 27, 1996

[30] Foreign Application Priority Data

Feb. 28, 1995 [JP] Japan .................................. 7-040454

[51] Int. Cl.⁶ ...................................................... H04N 5/76
[52] U.S. Cl. ............................................ 386/95; 386/104
[58] Field of Search ................................ 386/46, 111, 95, 386/96, 112, 125, 109, 124, 126, 104, 105, 121; 348/468, 563, 565; 434/308, 309; H04N 5/76

[56] References Cited

U.S. PATENT DOCUMENTS

| | | | |
|---|---|---|---|
| 5,097,348 | 3/1992 | Suetaka ..................................... | 386/95 |
| 5,396,497 | 3/1995 | Veltman .................................... | 348/423 |
| 5,497,241 | 3/1996 | Ostrover et al. .......................... | 386/97 |
| 5,596,564 | 1/1997 | Fukushima et al. ..................... | 386/111 |
| 5,684,542 | 11/1997 | Tsukagoshi .............................. | 348/468 |

*Primary Examiner*—Huy T. Nguyen
*Attorney, Agent, or Firm*—Pillsbury Madison & Sutro LLP

[57] ABSTRACT

In an apparatus and method of reproducing a data unit consisting of a stream of packs of main picture data, a data unit consisting of a stream of packs of audio data, and a data unit consisting of a stream of packs of sub-picture data, which recorded on an optical disk and which are reproducible in the same time slot, reproduction data of the data unit including the sub-picture data is reproduced is reproduced by a sub-picture decoder section after reproduction data of the data unit including the audio data and reproduction data of the data unit including the video data are simultaneously reproduced by a video decoder section and an audio decoder section, and after the reproduction data of the data unit including the sub-picture, the reproduction data of the data unit including the audio data and the reproduction data of the data unit including the video data are simultaneously reproduced again.

4 Claims, 39 Drawing Sheets

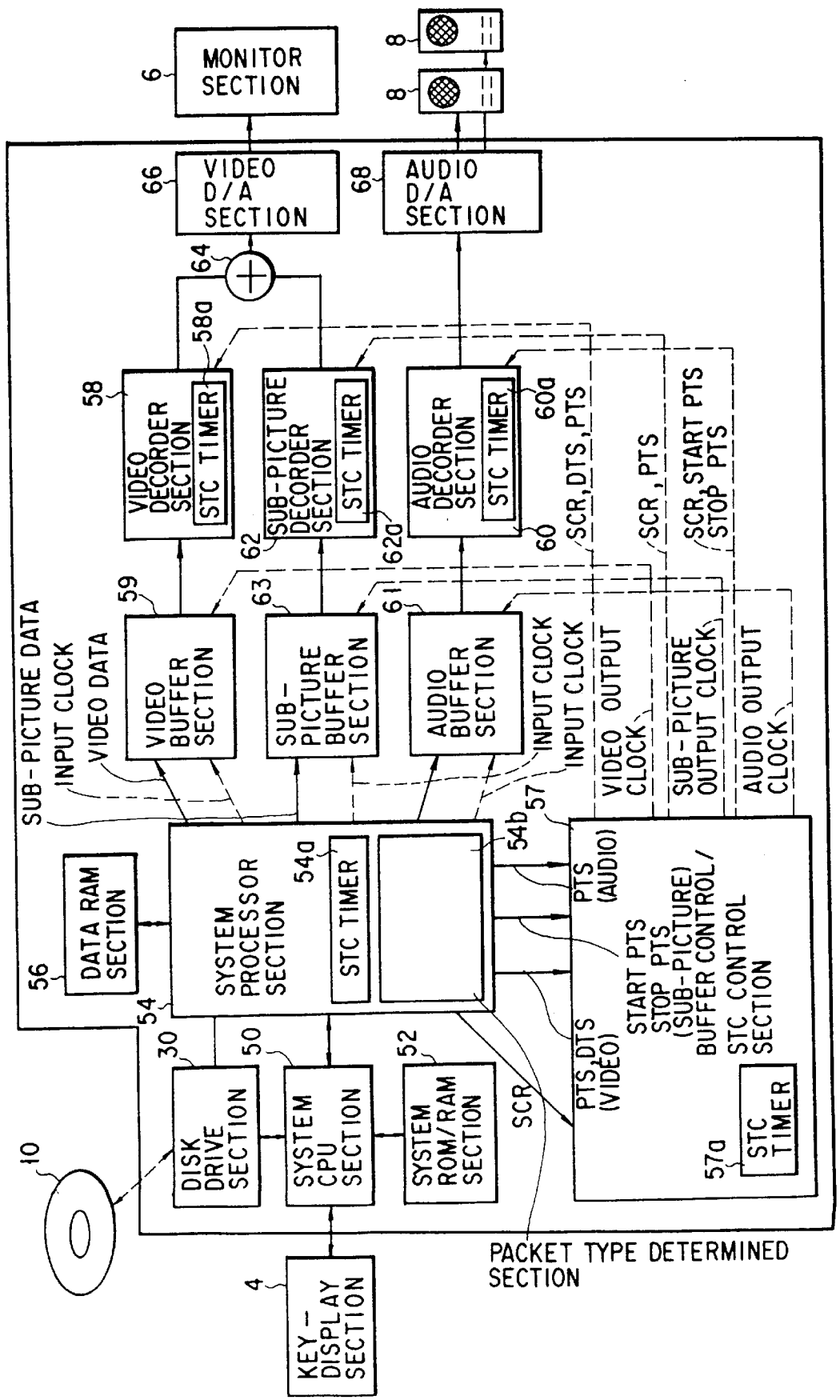
F I G. 1

FIG. 6

| Video Object Set (VOBS) 82 | Video Object (VOBUIDNj) | Cell (C_IDNj) | Video Object Unit (VOBU) | A Pack |
| --- | --- | --- | --- | --- |
| | | | | . |
| | | | | . |
| | | | | . |
| | | | | VBI Pack |
| | | | | NAV Pack |
| | | | | V Pack |
| | | | | V Pack |
| | | | | V Pack |
| | | | | SP Pack |
| | | | | A Pack |
| | | | | . |
| | | | | . |
| | | | | . |
| | Video Object (VOBUIDN2) | Cell (C_IDN2) | Video Object Unit (VOBU) | A Pack 91 |
| | | | | SP Pack 90 |
| | | | | V Pack |
| | | | | V Pack 88 |
| | Video Object (VOBUIDNl) 83 | Cell (C_IDNl) 84 | Video Object Unit (VOBU) 85 | V Pack |
| | | | | NAV Pack 86 |

| VMGI MAT | Content | (Description order) |
|---|---|---|
| VMG_ID | Video Manager Identifier | |
| VMGI_SZ | Size of Video Manager Information | |
| VERN | Version Number of DVD Video Specification | |
| VMG_CAT | Video Manager Category | |
| VLMS_ID | Volume Set Identifier | |
| VTS_Ns | Number of Video Title Set | |
| PVR_ID | Provider Unique ID | |
| VMGM_VOBS_SA | Video Manager Menu Video Object Set Start Address | |
| VMGI_MAT_EA | End Address of VMGI_MAT | |
| TT_SRPT_SA | Start Address of TT_SRPT | |
| VTS_ATRT_SA | Start Address of VTS_ATRT | |
| VMGM_V_ATR | Video Attribute of VMGM | |
| VMGM_AST_Ns | Number of Audio Stream of VMGM | |
| VMGM_AST_ATR | Audio Stream Attribute of VMGM | |
| VMGM_SPST_Ns | Number of Sub-picture Stream of VMGM | |
| VMGM_SPST_ATR | Sub-picture Stream Attribute of VMGM | |

F I G. 8

TT_SRPT
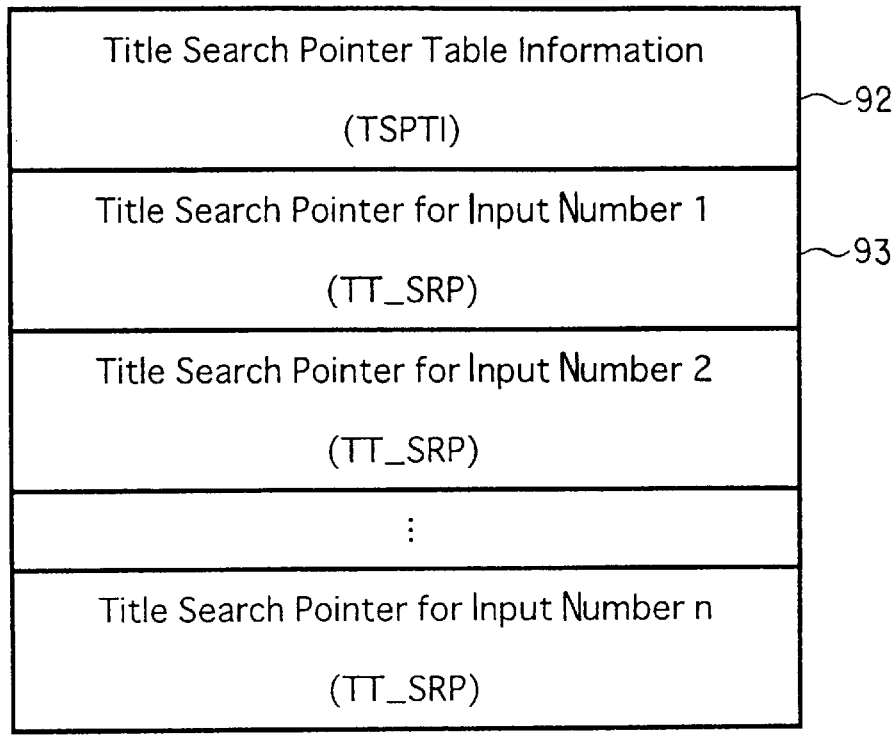
F I G. 9
| TT_SRPTI | (Description order) |
|---|---|
| | Content |
| EN_PGC_Ns | Number of Entry PGC |
| TT_SRPT_EA | End Address of TT_SRPT |
F I G. 10
| TT_SRP | (Description order) |
|---|---|
| | Content |
| VTSN | Video Title Set Number |
| PGCN | Program Chain Number |
| VTS_SA | Start Address of Video Title Set |
F I G. 11

| VTSI_MAT | Content (Description order) |
|---|---|
| VTS_ID | Video Title Set Identifier |
| VTS_SZ | Size of the VTS |
| VERN | Version Number of DVD_Video Specification |
| VTS_CAT | Video Title Set Category |
| VTSM_VOB_SA | Start Address of VTSM_VOBS |
| VTSTT_VOB_SA | Start Address of VTSTT_VOBS |
| VTI_MAT_EA | End Address of VTSI_MAT |
| VTS-DAPT-SA | Start Address of VTS_DAPT |
| VTS_PGCIT_SA | Start Address of VTS_PGCIT |
| VTS_PGCIT_UT_SA | Start Address of VTS_PGCIT_UT |
| VTS_MAPT_SA | Start Address of VTS_MAPT |
| VTS_V_ATR | Video Attribute |
| VTS_AST_Ns | Number of Audio Streams for VTS |
| VTS_AST_ATR | Audio Stream Attribute for VTS |
| VTS_SPST_Ns | Number of Sub-picture Streams for VTS |
| VTS_SPST_ATR | Sub-picture Stream Attribute for VTS |
| VTSM_AST_Ns | Number of Audio Streams for VTSM |
| VTSM_AST_ATR | Audio Stream Attribute for VTSM |
| VTS_SPST_Ns | Number of Sub-picture Streams for VTSM |
| VTS_SPST_ATR | Sub-picture Stream Attribute for VTSM |

F I G. 13

VTS_PGCIT_I
(Description order)
| | Content |
|---|---|
| VTS_PGC_Ns | Number of VTS_PGCs |
| VTS_PGCIT_EA | End Address of VTS_PGCCIT |
F I G. 15
VTS_PGCIT_SRP
(Description order)
| | Content |
|---|---|
| VTS_PGC_CAT | Video Title Set PGC category |
| VTS_PGCI_SA | Start Address of VTS_PGC Information |
F I G. 16
VTS_PGCI
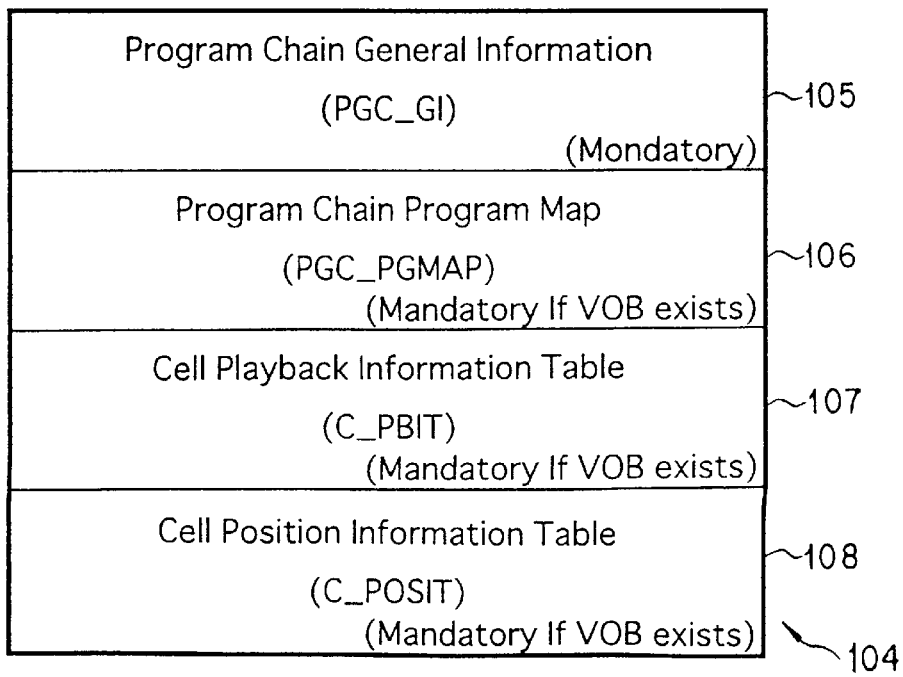
F I G. 17

PGCI_GI

| | (Description order) |
|---|---|
| | Content |
| PGCI_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| C_PBIT_SA | Start Address of C_PBIT |
| C_POSIT_SA | Start Address of C_POSIT |

FIG. 18

PGC_PGMAP

| Entry Cell Number for Program #1 |
|---|
| Entry Cell Number for Program #2 |
| ⋮ |
| Entry Cell Number for Program #n |

FIG. 19

Entry cell number

| | Content |
|---|---|
| ECELLN | Entry Cell Number |

FIG. 20

C_PBIT

| Cell Playback Information #1 (C_PBI1) |
|---|
| Cell Playback Information #2 (C_PBI2) |
| ⋮ |
| Cell Playback Information #n (C_PBIn) |

FIG. 21

C_PBI
|  | Content |
| --- | --- |
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
F I G. 22
C_POSI
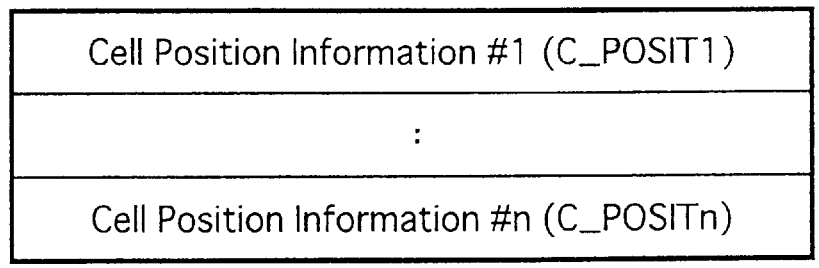
F I G. 23
C_POSI
|  | Content |
| --- | --- |
| C_VOB_IDN | VOB ID Number of Cell |
| C_IDN | Cell ID Number of the Cell |
F I G. 24

| PCI | |
|---|---|
| | Content |
| PCI_GI | PCI General Information |
| NSLS_ANGLI | Angle Information |

F I G. 27

| PCI_GI | |
|---|---|
| | Content |
| NV_PCK_LBN | LBN of NV Pack |
| VOBU_CAT | Category of VOBU |
| VOBU_SPTS | Start PTS of VOBU |
| VOBU_EPTS | End PTS of VOBU |

F I G. 28

| DSI | |
|---|---|
| | Content |
| DSI_GI | DSI General Information |
| SML_AGLI | Angle Information |
| VOBU_SI | VOB Search Information |
| SYNCI | Synchronus Playback Information |

F I G. 29

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

F I G. 30

| SYNCI | |
|---|---|
| | Content |
| A_SYNCA 0 to 7 | Target Audio Pack Address |
| SP_SYNCA 0 to 31 | VOBU Start Address of Target SP pack |

F I G. 31

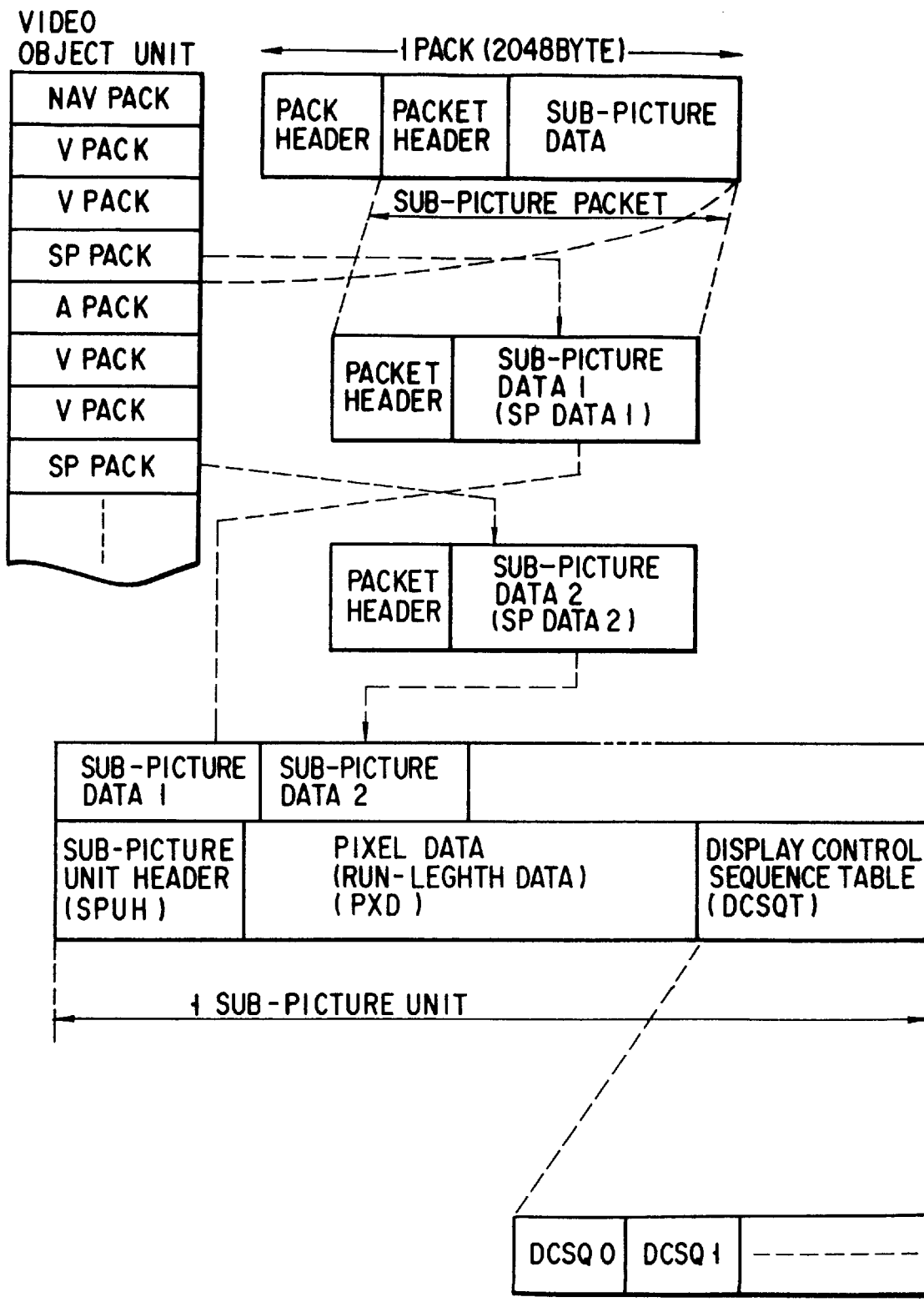
F I G. 32

SPUH

| | CONTENTS |
|---|---|
| SPDSZ | SIZE OF SUB-PICTURE UNIT |
| SPDCQTA | START ADDRESS OF DISPLAY CONTROL SEQUENCE TABLE |

F I G. 33

DCSQT

| | CONTENTS |
|---|---|
| DCSQ0 | DISPLAY CONTROL SEQUENC 0 |
| DCSQ1 | DISPLAY CONTROL SEQUENC 1 |
| ⋮ | ⋮ |
| ⋮ | ⋮ |
| | DISPLAY CONTROL SEQUENC n |

F I G. 34

DCSQ

| | CONTENTS |
|---|---|
| SPNDCSQA | ADDRESS OF FOLLOWING DISPLAY CONTROL SEQUENCE |
| SPDCCMDI | DISPLAY CONTROL COMMAND 1 |
| ⋮ | ⋮ |
| ⋮ | ⋮ |

F I G. 35

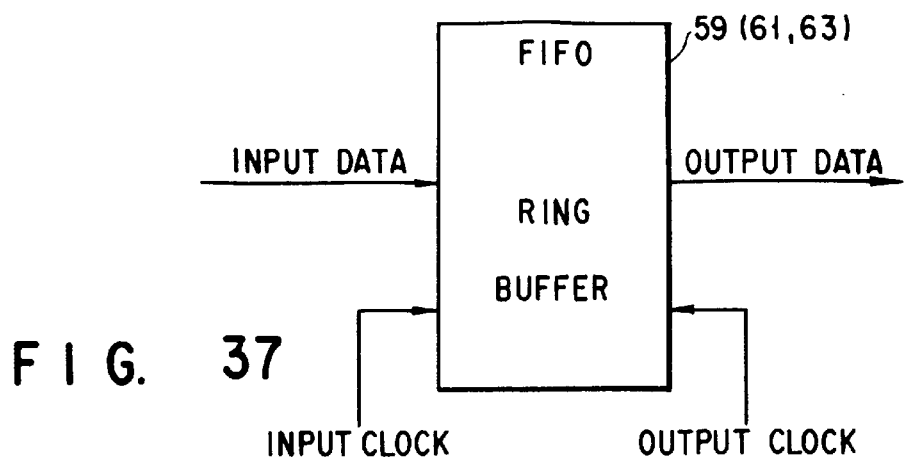
F I G. 37
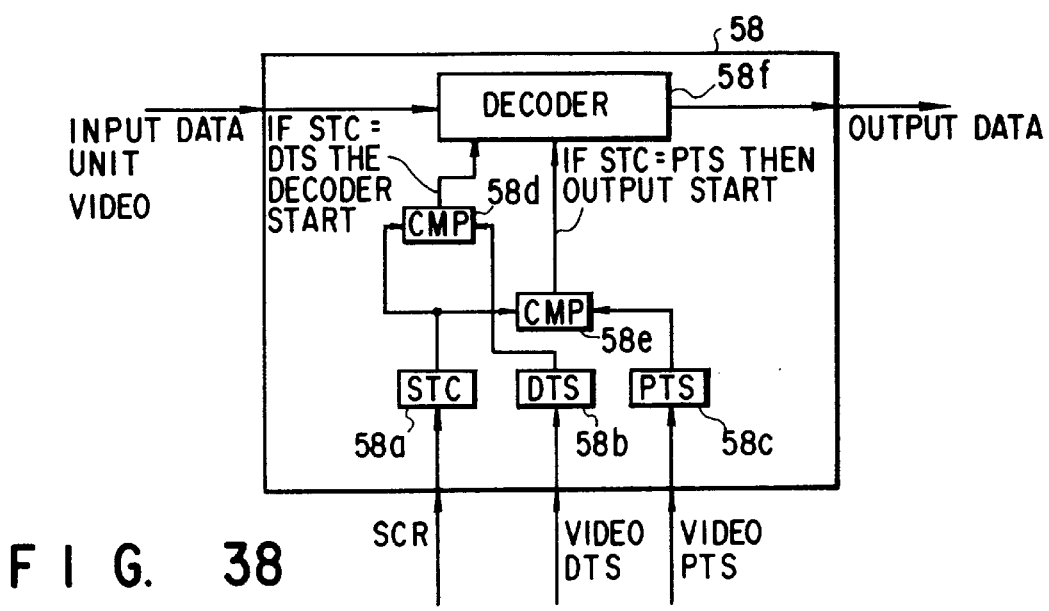
F I G. 38
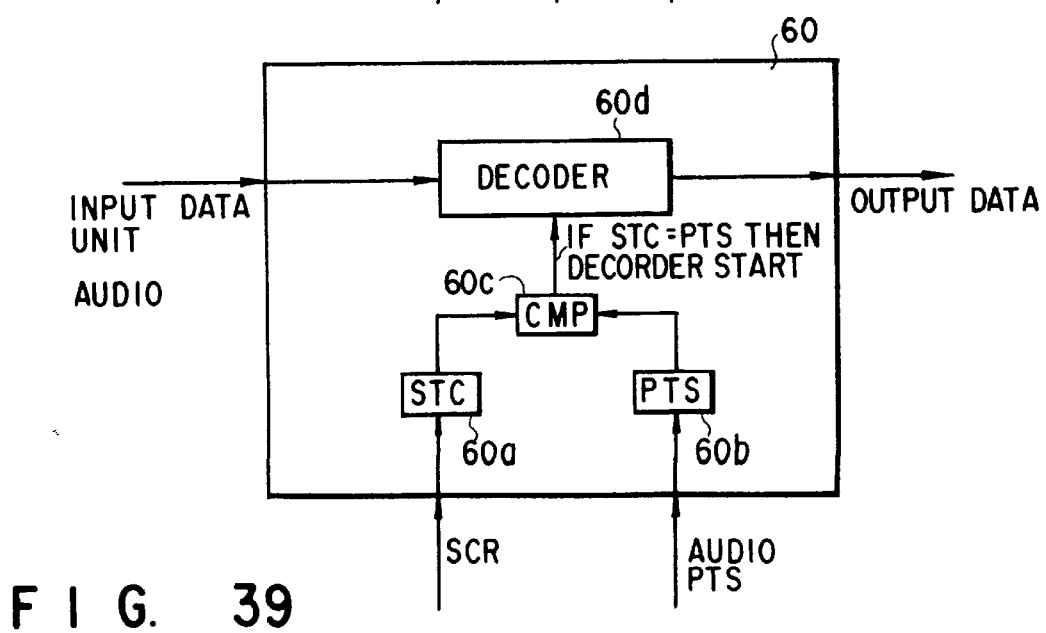
F I G. 39

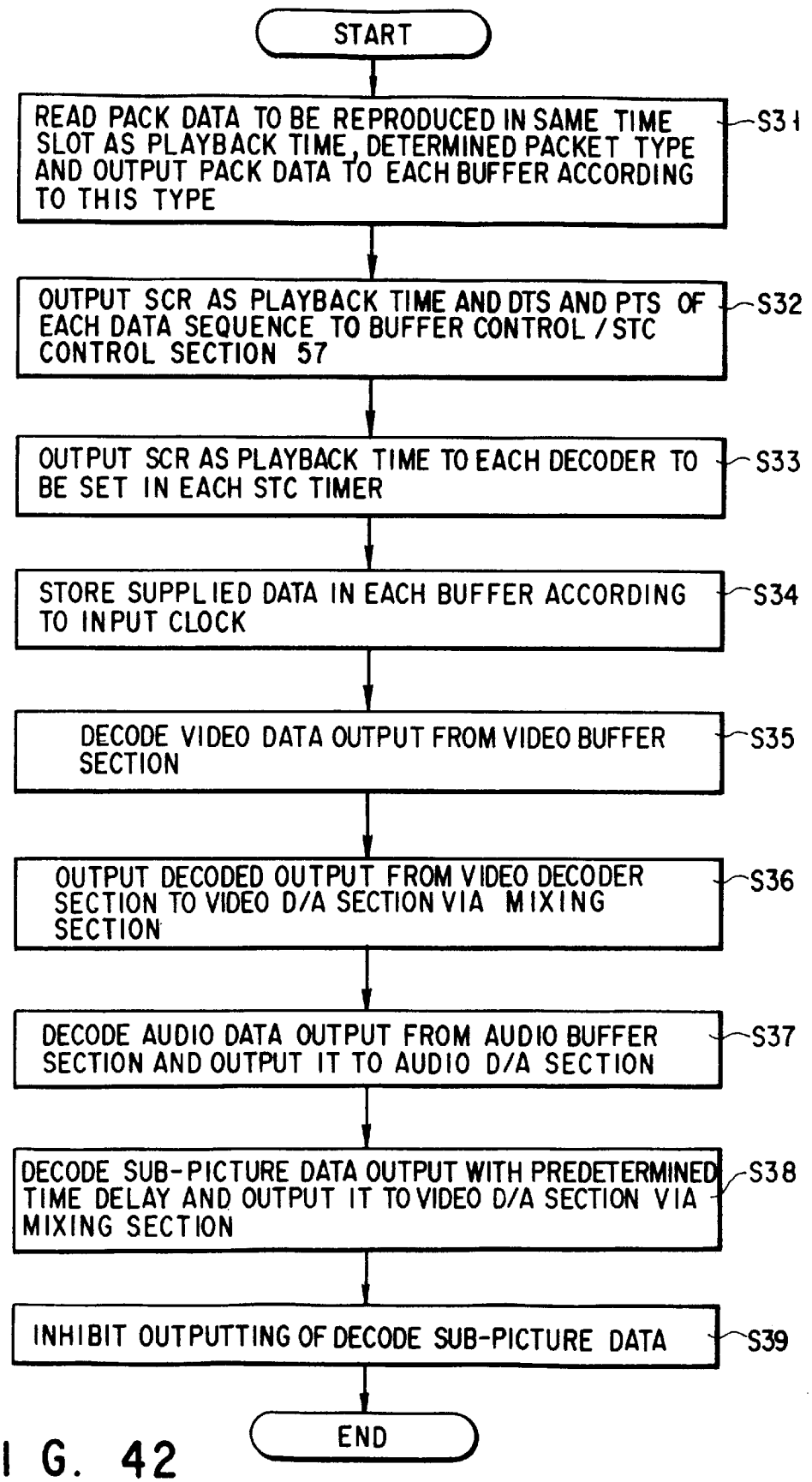
F I G. 42

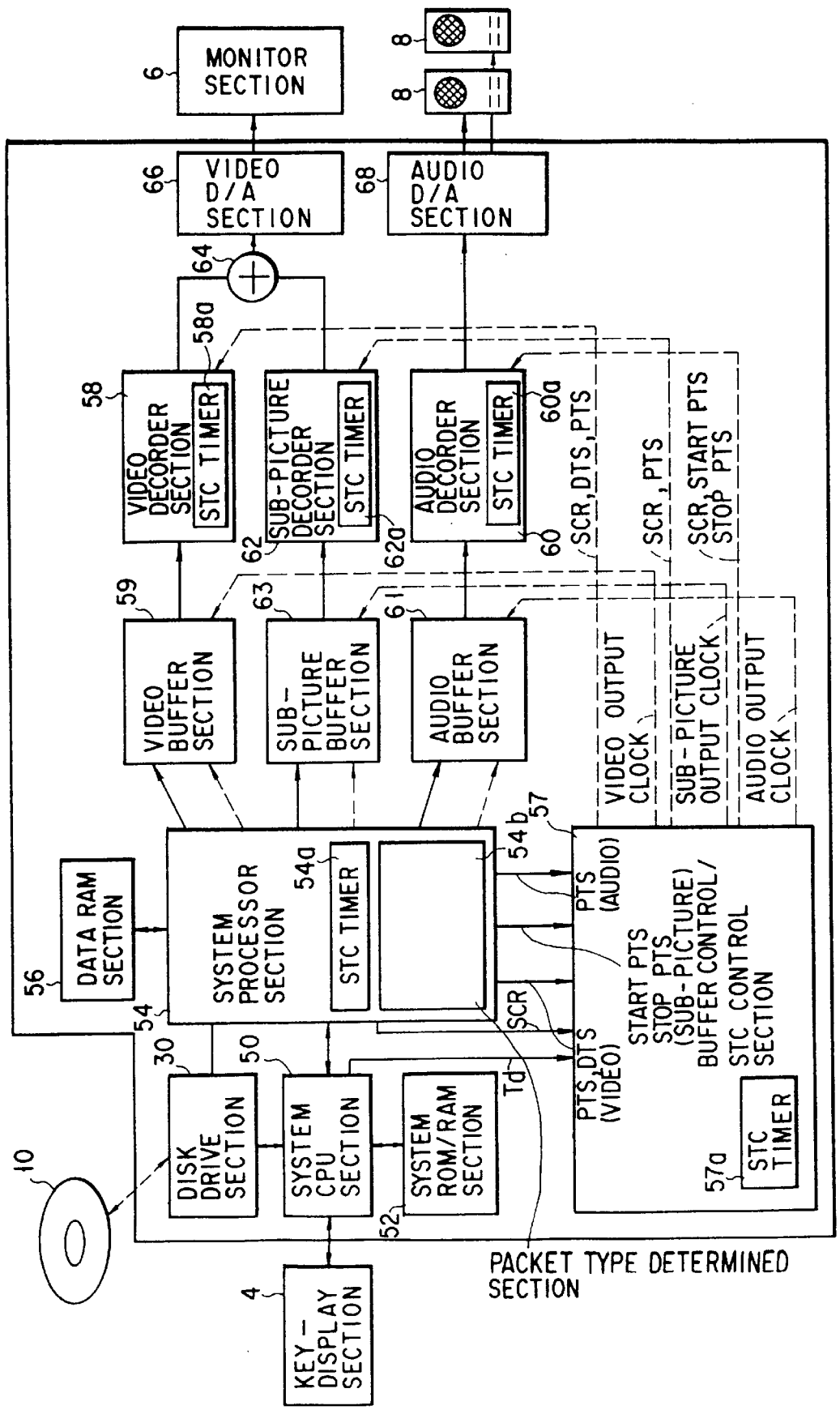
F I G. 44

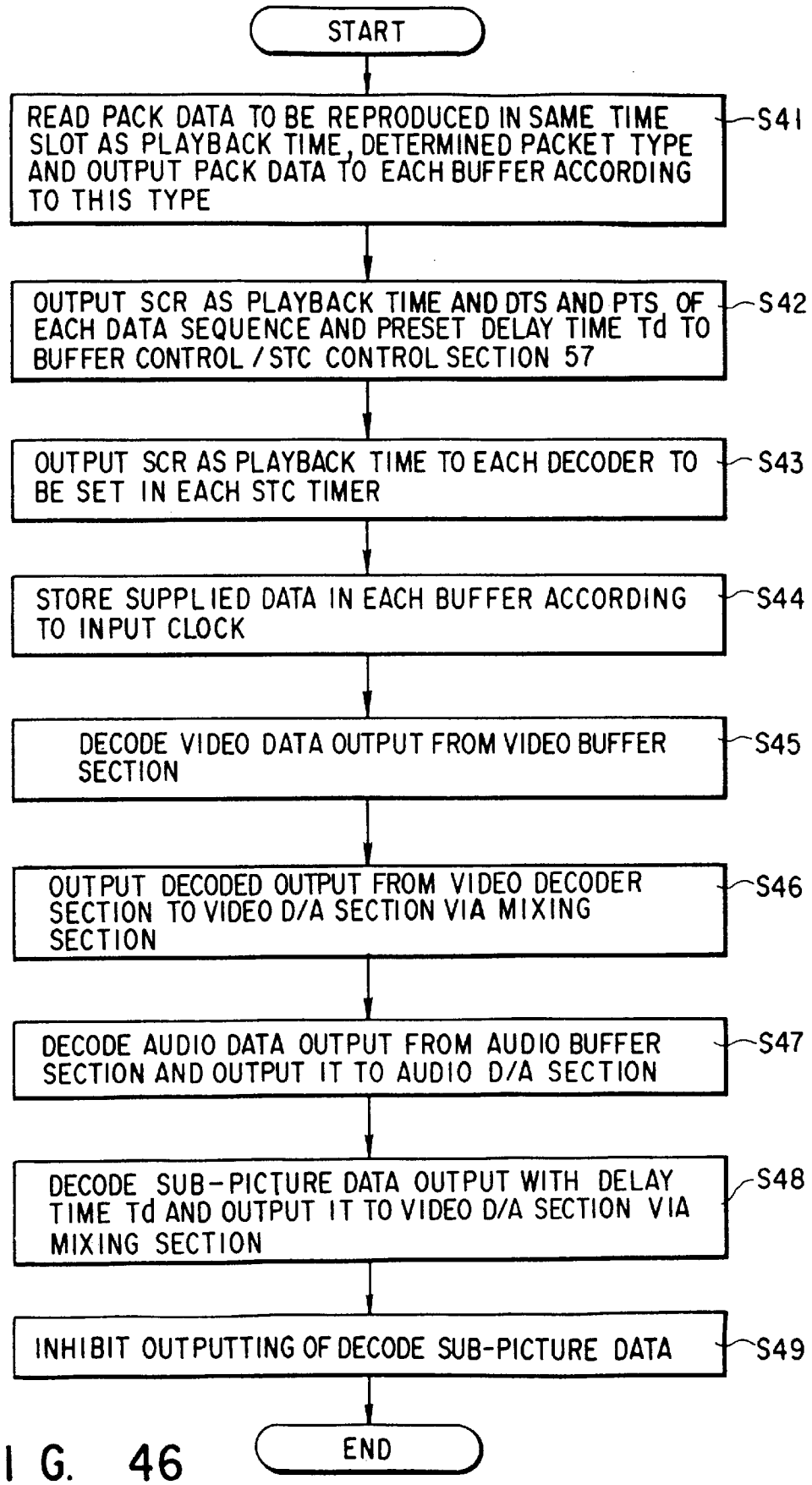
F I G. 46

FIG. 49A VIDEO DATA 

FIG. 49B VIDEO DATA INPUT CLOCK 

FIG. 49C AUDIO DATA 

FIG. 49D AUDIO DATA INPUT CLOCK 

FIG. 49E SUB-PICTURE DATA 

FIG. 49F SUB-PICTURE DATA INPUT CLOCK 

FIG. 49G VIDEO DTS — VIDEO STC STOP

FIG. 49H VIDEO OUTPUT CLOCK 

FIG. 49I AUDIO PTS / VIDEO PTS

FIG. 49J AUDIO OUTPUT CLOCK — AUDIO STC STOP

FIG. 49K SUB-PICTURE PTS — Td START STOP

FIG. 49L SUB-PICTURE PTS — START STOP

FIG. 49M SUB-PICTURE OUTPUT CLOCK — SUB-PICTURE STC STOP

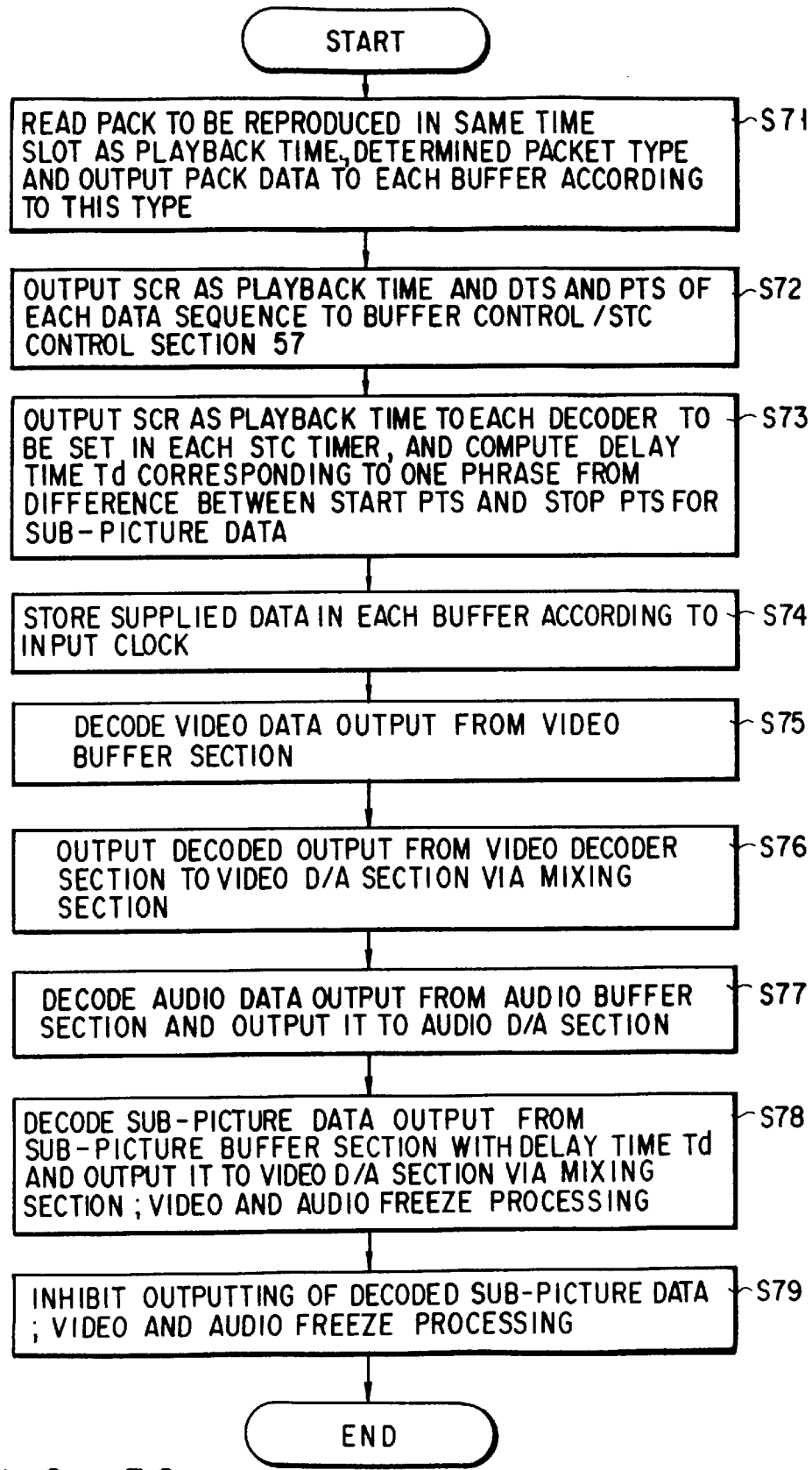
F I G. 50

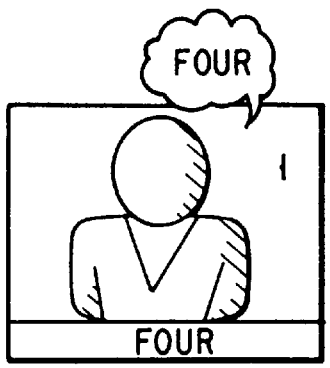
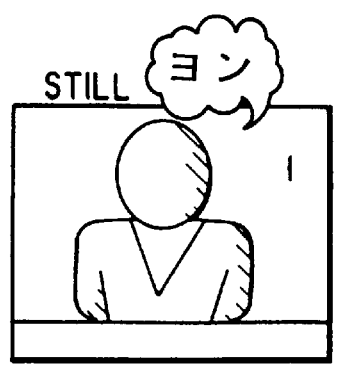
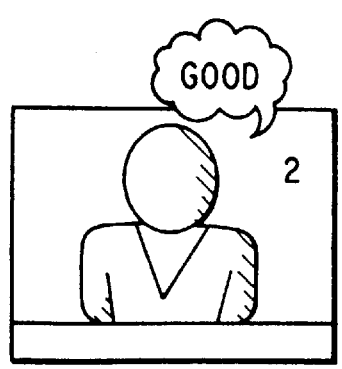
FIG. 54A   FIG. 54B   FIG. 54C
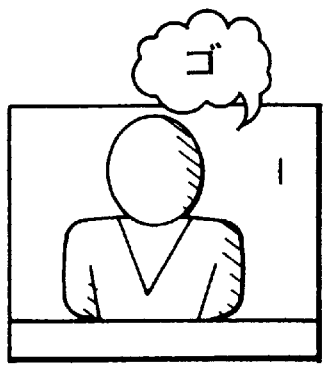
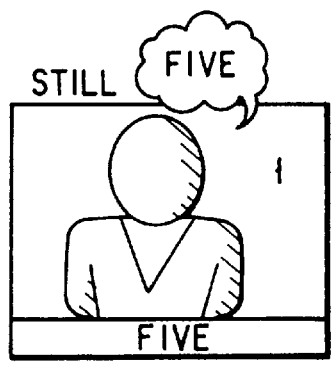
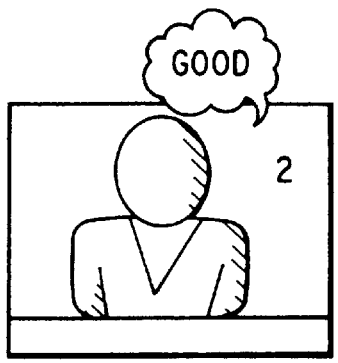
FIG. 55A   FIG. 55B   FIG. 55C
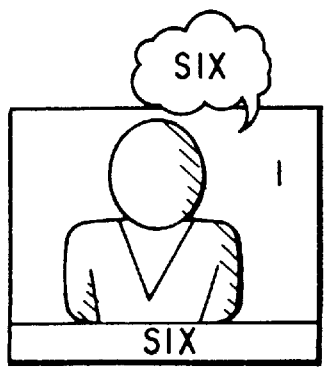
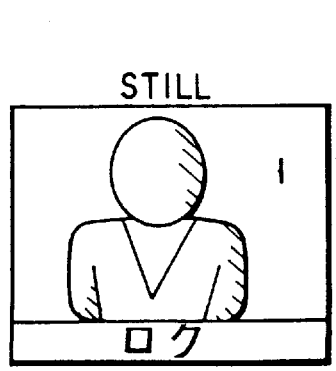
FIG. 56A   FIG. 56B   FIG. 56C

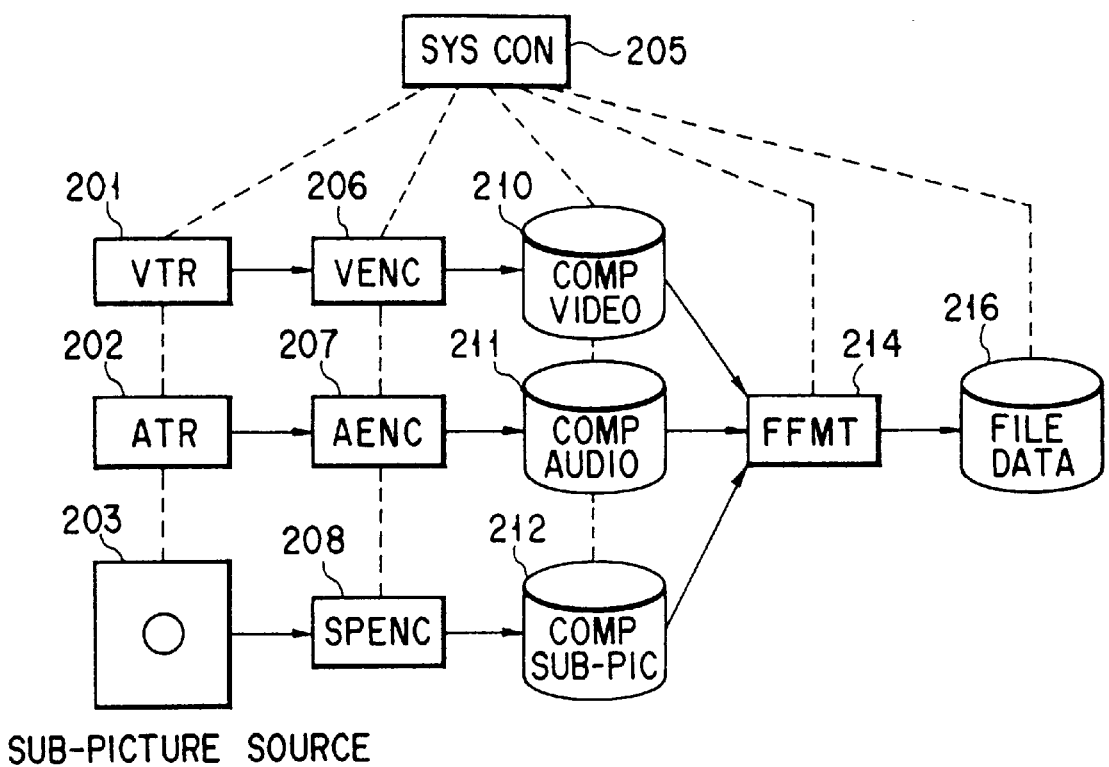
F I G. 59
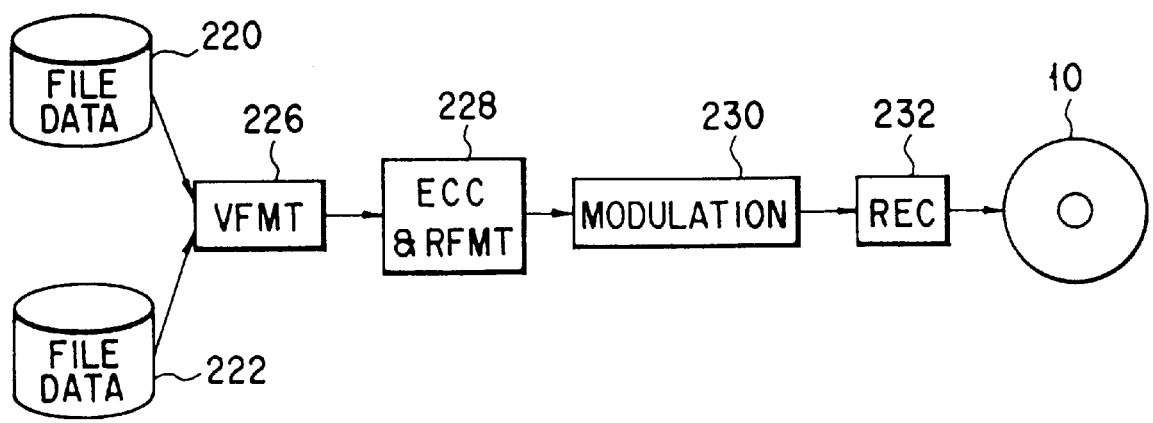
F I G. 62

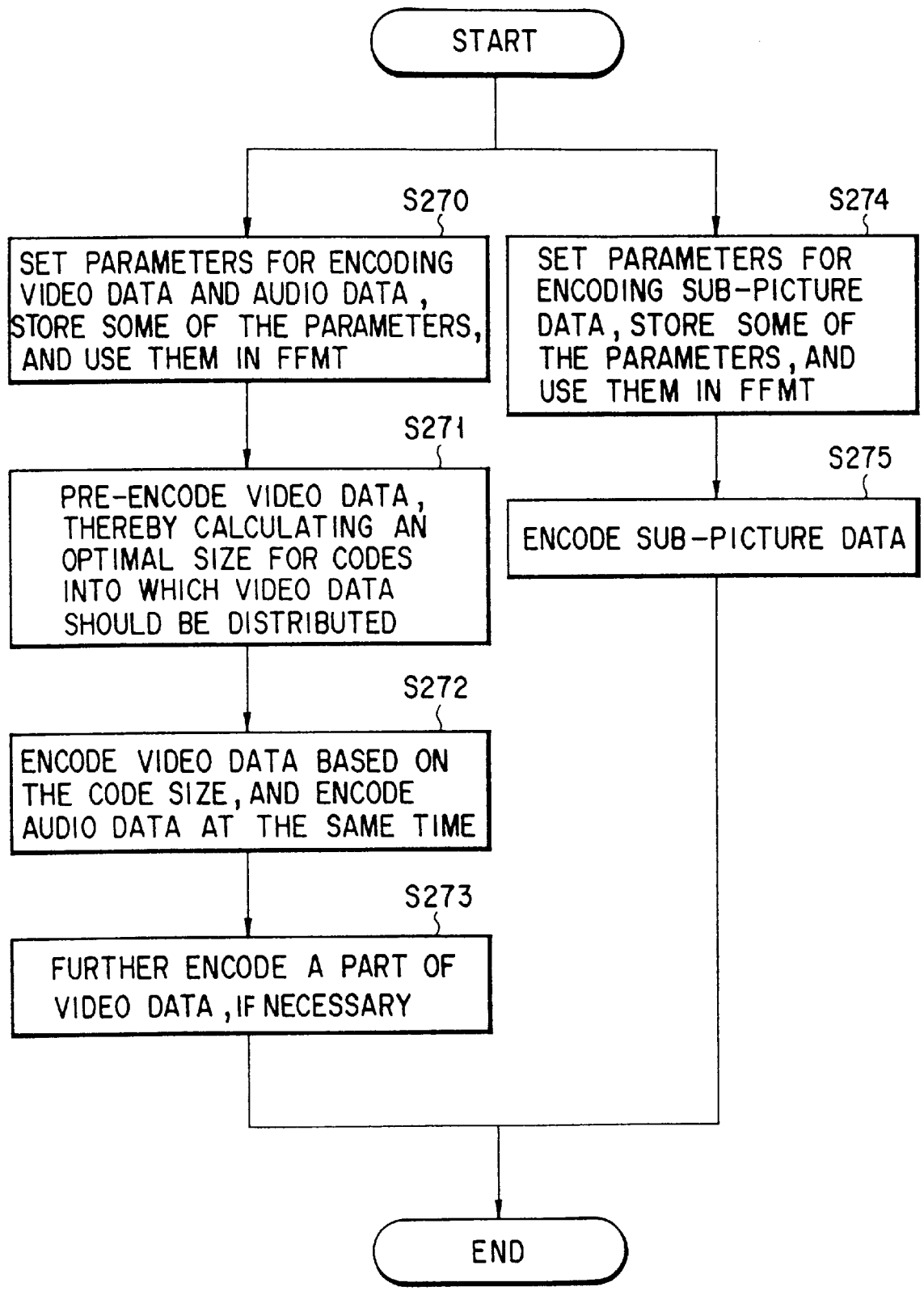
F I G. 60

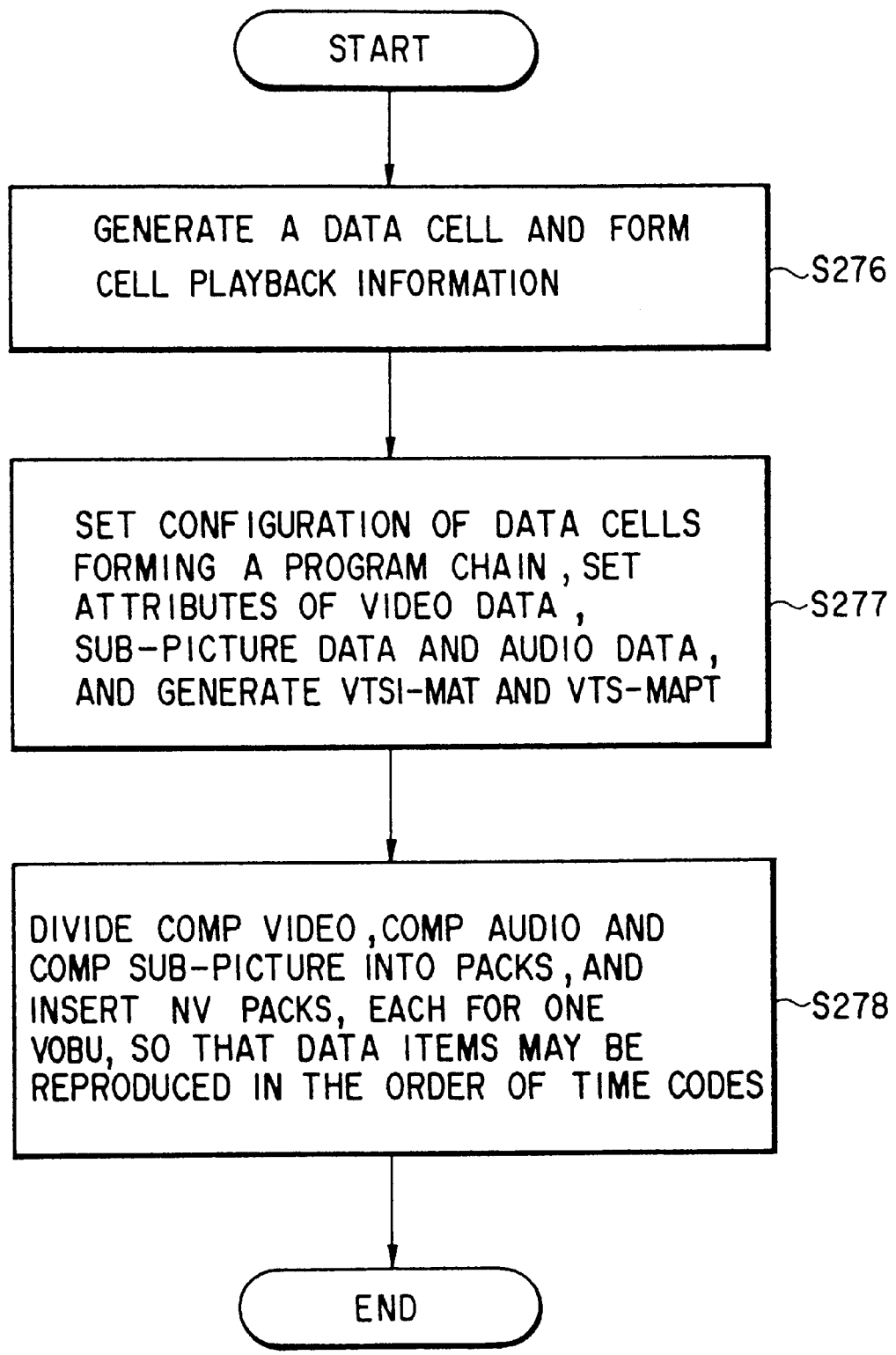
F I G. 61

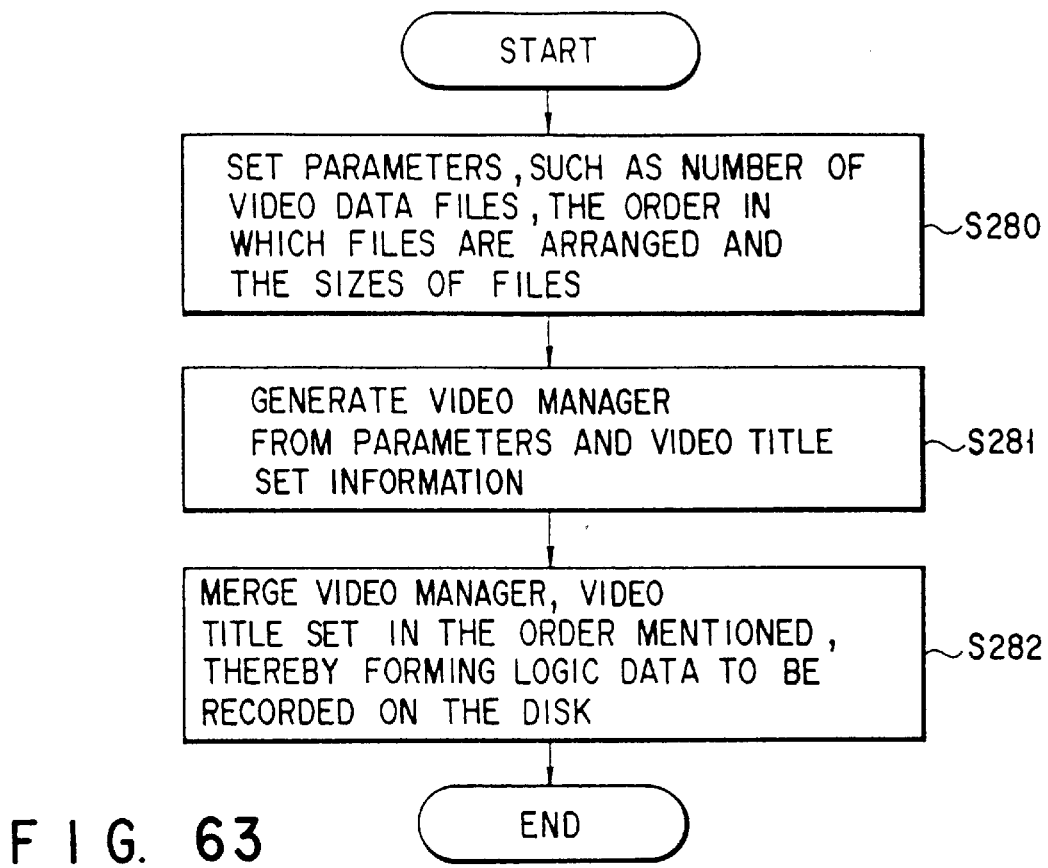
F I G. 63
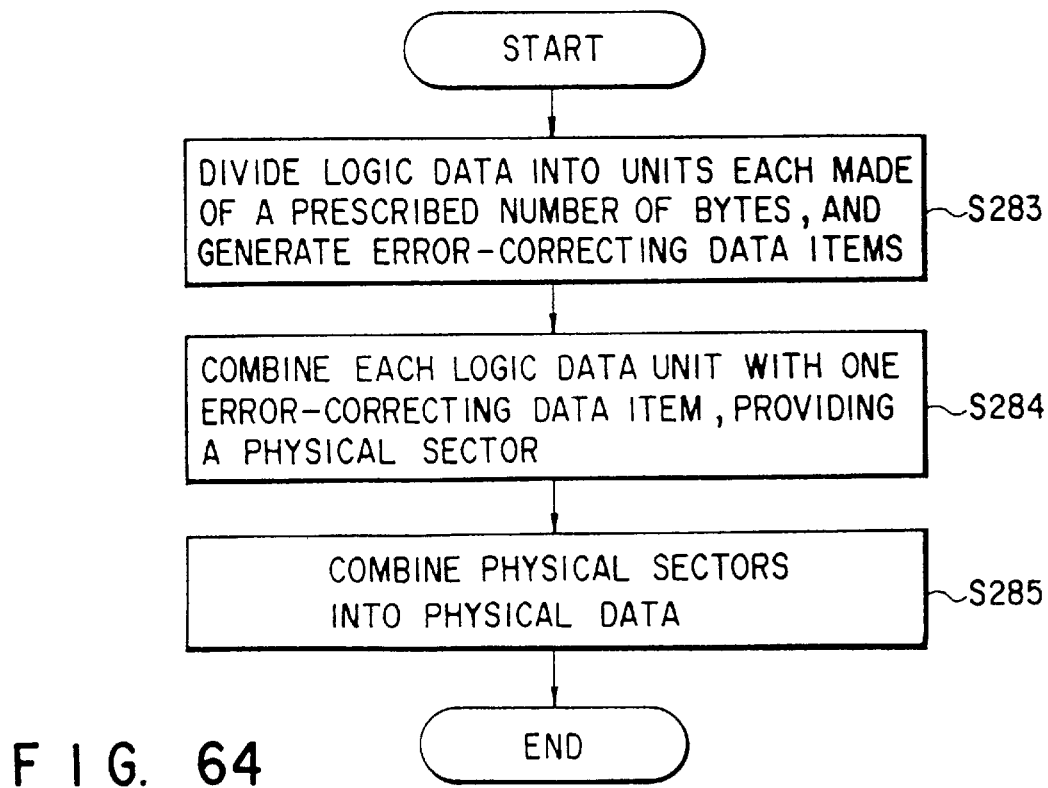
F I G. 64

RECORDING MEDIUM, APPARATUS AND METHOD OF RECORDING DATA ON THE SAME, AND APPARATUS AND METHOD OF REPRODUCING DATA FROM THE RECORDING MEDIUM

BACKGROUND OF THE INVENTION

1. Field of the Invention

The present invention relates to a recording medium, such as an optical disk, for recording compressed moving picture data, audio data and the like or different kinds of data, an apparatus and method of recording data on this recording medium, and an apparatus and method of reproducing data from the same.

2. Description of the Related Art

Recently, optical disk players, which can handle moving pictures and play optical disks on which picture and audio data are digitally recorded, have been developed, and are widely used as players for movie software, karaoke and so forth. Further, MPEG (Moving Picture Image Coding Expert Group) standards have recently become international standards for a data compression system for moving pictures. This MPEG system performs variable length compression of picture data.

The MPEG2 system is now also being internationally standardized, so that the system format which matches with the MPEG compression system is defined as an MPEG2 system layer. This MPEG2 system layer defines the setting of a transfer start time and a playback start time, expressed by using a reference time, in moving picture data, audio data and other data, so that those data can be transferred and reproduced synchronously. Playback is normally executed using this information.

With the increasing availability of optical disks designed for multiple uses, it is not sufficient to consider only the synchronism among individual pieces of data.

For educational purposes, such as learning languages, for example, main picture data used as video data may present questions to users, while sub-picture data superimposed on the picture may give answers to the users. In this case, it is significant to show answers after, and not before or during the time questions are given.

SUMMARY OF THE INVENTION

Accordingly, it is a primary object of the present invention to provide a recording medium on which various types of data, such as main picture data, audio data and sub-picture data, constructed in a reproducible manner, are recorded in such a way that the sub-picture data can be reproduced after a predetermined time delay with respect to the main picture data.

It is a secondary object of the present invention to provide a method and apparatus of reproducing data from a recording medium on which various types of data, such as main picture data, audio data and sub-picture data, constructed in a reproducible manner, are recorded in such a way that the sub-picture data can be reproduced with a predetermined time delay after respect to the main picture data.

It is a third object of the present invention to provide a method and apparatus of recording various types of data, such as main picture data, audio data and sub-picture data, constructed in a reproducible manner, in such a way that the sub-picture data can be reproduced with a predetermined time delay after respect to the main picture data.

It is a fourth object of the present invention to provide a method and apparatus of reproducing various types of data, such as main picture data, audio data and sub-picture data, constructed in a synchronously reproducible manner, in such a way that the sub-picture data can be reproduced after a predetermined time delay, preset in a machine, with respect to the main picture data.

It is a fifth object of the present invention to provide a method and apparatus of reproducing various types of data, such as main picture data, audio data and sub-picture data, constructed in a synchronously reproducible manner, in such a way that the sub-picture data is reproduced after a delay time, arbitrarily set using a menu screen, with respect to the main picture data.

It is a sixth object of the present invention to provide a method and apparatus of reproducing various types of data, such as main picture data, audio data and sub-picture data, constructed in a synchronously reproducible manner, in such a way that the sub-picture data is reproduced after a delay time, computed from the difference between the display start time given in sub-picture data for one still picture and the display end time, with respect to the main picture data.

It is a seventh object of the present invention to provide a method and apparatus of displaying pictures in such a way that at the time of reproducing superimposition data or the like as sub-picture data after an arbitrary time delay, with respect to main picture data belonging to various types of data, such as main picture data, audio data and sub-picture data, constructed in a reproducible manner, the superimposition data or the like appears as if hidden by a mosaic or a black filler during the delay period.

To achieve the above object, the present invention includes a recording medium comprising a plurality of data units recorded thereon, which become objects to be reproduced in a time sequential manner, each object being reproduced within a given time period; each of the data units being constituted of a stream of a plurality of data packs and playback time information, the data packs containing packets of reproduction data including at least one of audio data, video data and sub-picture data; the time information of that data unit which includes a sub-picture being later by a predetermined time than time information of that data unit which includes audio data or video data; reproduction data of the data unit including the sub-picture being reproduced after reproduction of reproduction data of the data unit including the audio data or video data.

The present invention also includes a recording apparatus for recording reproduction data on a recording medium, comprising: means for generating a plurality of data packs and playback time information, the data packs containing packets of reproduction data including at least one of audio data, video data and sub-picture data; means for preparing a plurality of data units including playback time information and having a stream of data packs to be reproduced within a given time period as a unit; and means for recording the data units on the recording medium in a time-sequentially reproducible manner, time information of that data unit which includes a sub-picture to be reproduced within the given time period being later by a predetermined time than time information of that data unit which includes audio data or video data to be reproduced within the given time period.

The present invention further includes a method of recording reproduction data on a recording medium, comprising the steps of: generating a plurality of data packs containing packets of reproduction data including at least one of audio data, video data and sub-picture data; preparing a plurality of data units including playback time information and having a stream of data packs to be reproduced within a given time period as a unit; and recording the data units on the recording medium in a time-sequentially reproducible manner, time information of that data unit which includes a sub-picture to be reproduced within the given time period being later by a predetermined time than time information of that data unit which includes audio data or video data to be reproduced within the given time period.

The present invention also includes a reproducing apparatus for reproducing reproduction data from a recording medium, comprising: means for acquiring, from the recording medium, a plurality of data units recorded thereon, which become objects to be reproduced in a time sequential manner, each object being reproduced within a given time period, each of the data units being constituted of a stream of a plurality of data packs and playback time information, the data packs containing packets of reproduction data including at least one of audio data, video data and sub-picture data, time information of that data unit which includes a sub-picture to be reproduced within a given time period being later by a predetermined time than time information of that data unit which includes audio data or video data to be reproduced within the given time period; and means for converting the data unit of the acquired reproduction data to a reproduction signal in accordance with the time information included in the data unit and reproducing the reproduction signal, whereby after reproduction data of that data unit which includes audio data or video data to be reproduced within a given time period is reproduced, the reproducing means reproduces reproduction data of the data unit including the sub-picture to be reproduced within the given period.

The present invention also includes a reproducing apparatus for reproducing reproduction data from a recording medium, comprising: means for acquiring, from the recording medium, a plurality of data units recorded thereon, which become objects to be reproduced in a time sequential manner, each object being reproduced within a given time period, each of the data units being constituted of a stream of a plurality of data packs and playback time information, the data packs containing packets of reproduction data including at least one of audio data, video data and sub-picture data; and means for converting the data unit of the acquired reproduction data to a reproduction signal in accordance with the time information included in the data unit and reproducing the reproduction signal, whereby after reproduction data of that data unit which includes audio data or video data to be reproduced within a given time period is reproduced, the reproducing means reproduces reproduction data of the data unit including the sub-picture to be reproduced within the given period when a predetermined time previously set elapses.

The present invention also includes a reproducing apparatus for reproducing reproduction data from a recording medium, comprising: means for acquiring, from the recording medium, a plurality of data units recorded thereon, which become objects to be reproduced in a time sequential manner, each object being reproduced within a given time period, each of the data units being constituted of a stream of a plurality of data packs and playback time information, the data packs containing packets of reproduction data including at least one of audio data, video data and sub-picture data; means for setting a delay time at which reproduction data of that data unit which includes a sub-picture to be reproduced within a given time period after reproduction data of that data unit which includes audio data or video data to be reproduced within the given time period is reproduced; and means for converting the data unit of the acquired reproduction data to a reproduction signal in accordance with the time information included in the data unit and reproducing the reproduction signal, whereby after reproduction data of that data unit which includes at least one of audio data and video data to be reproduced within a given time period is reproduced, the reproducing means reproduces reproduction data of the data unit including the sub-picture to be reproduced within the given period when the set delay time elapses.

The present invention also includes apparatus for reproducing reproduction data from a recording medium, comprising: means for acquiring, from the recording medium, a plurality of data units recorded thereon, which become objects to be reproduced in a time sequential manner, each object being reproduced within a given time period, each of the data units being constituted of a stream of a plurality of data packs and playback time information, the data packs containing packets of reproduction data including at least one of audio data, video data and sub-picture data, the time information of that data unit which includes a sub-picture consisting of a playback start time and playback stop time; means for computing a delay time of the data unit including the sub-picture from the playback start time and playback stop time recorded in the data unit including the sub-picture of the acquired reproduction data; and means for converting the data unit of the acquired reproduction data to a reproduction signal in accordance with the time information included in the data unit and reproducing the reproduction signal, whereby after reproduction data of that data unit which includes at least one of audio data and video data to be reproduced within a given time period is reproduced, the reproducing means reproduces reproduction data of the data unit including the sub-picture to be reproduced within the given period when the computed delay time elapses.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic block diagram of an optical disk apparatus according to the first embodiment of the present invention;

FIG. 6 shows an example of the structure of the video object set (VOBS) shown in FIG. 5;

FIG. 8 shows the parameters and contents of the volume manger information management table (VMGI_MAT) in the video manager (VMGI) of FIG. 5;

FIG. 9 shows the structure of the title search pointer table (TSPT) in the video manager (VMGI) of FIG. 5;

FIG. 10 shows the parameters and contents of the title search pointer table information (TSPTI) in the title search pointer table (TSPT) of FIG. 9;

FIG. 11 shows the parameters and contents of the title search pointer (TT_SRP) corresponding to the input number in the title search pointer table (TSPT) of FIG. 9;

FIG. 13 shows the parameters and contents of the video title set information management table (VTSI_MAT) of the video title set information (VTSI) of FIG. 12;

FIG. 15 shows the parameters and contents of the information (VTS_PGCITI) in the video title set program chain information table (VTS_PGCIT) of FIG. 14;

FIG. 16 shows the parameters and contents of the search pointer (VTS_PGCIT_SRP) corresponding to the program chain in the video title set program chain information table (VTS_PGCIT) of FIG. 14;

FIG. 17 illustrates the structure of the program chain information (VTS_PGCI) in the video set corresponding to the program chain in the video title set program chain information table (VTS_PGCIT) of FIG. 14;

FIG. 18 shows the parameters and contents of the program chain general information (PGC_GI) in the program chain information (VTS_PGCI) of FIG. 17;

FIG. 19 illustrates the structure of a program chain map (PGC_PGMAP) of the program chain information (VTS_PGCI) of FIG. 17;

FIG. 20 shows the parameters and contents of the entry cell numbers (ECELLN) corresponding to the programs written in the program chain map (PGC_PGMAP) of FIG. 19;

FIG. 21 illustrate the structure of the cell playback information table (C_PBIT) of the program chain information (VTS_PGCI) of FIG. 17;

FIG. 22 shows the parameters and contents of the cell playback information table (C_PBIT) of FIG. 21;

FIG. 23 illustrates the structure of the cell position information (C_POSI) in the program chain information (VTS_PGCI) of FIG. 18;

FIG. 24 shows the parameters and contents of the cell position information (C_POSI) of FIG. 23;

FIG. 27 shows the parameters and contents of the presentation control information (PCI) in the navigation pack of FIG. 26;

FIG. 28 shows the parameters and contents of the general information (PCI_GI) in the presentation control information (PCI) of FIG. 27;

FIG. 29 shows the parameters and contents of the disk search information (DSI) in the navigation pack of FIG. 26;

FIG. 30 shows the parameters and contents of the DSI general information (DSI_GI) in the disk search information of FIG. 29;

FIG. 31 shows the parameters and contents of the synchronizing playback information (SYNCI) on the video object (VOB) of FIG. 29;

FIG. 32 shows the structure of a sub-picture unit;

FIG. 33 shows parameters and contents of a sub-picture unit header (SPUH) of the sub-picture unit shown in FIG. 32;

FIG. 34 shows the parameters and contents of a display control sequence table (DCSQT) of the sub-picture unit shown in FIG. 32;

FIG. 35 shows the parameters and contents of a display control sequence (DCSQ) shown in FIG. 34;

FIG. 37 illustrates the structure of the video buffer section shown in FIG. 1;

FIG. 38 illustrates the structure of the video decoder section shown in FIG. 1;

FIG. 39 illustrates the structure of the audio decoder section shown in FIG. 1;

FIG. 42 is a flowchart illustrating the detailed reproduction procedures;

FIG. 44 is a block diagram schematically showing an optical disk apparatus according to the second embodiment of this invention;

FIG. 46 is a flowchart illustrating the procedures of reproducing video data, audio data and sub-picture data by the optical disk apparatus shown in FIG. 44;

FIGS. 49A through 49M present a timing chart for explaining the relationship among an input clock, output clock, PTS and DTS for use in the reproduction of video data, audio data and sub-picture data according to this fourth embodiment;

FIG. 50 is a flowchart illustrating the procedures of reproducing video data, audio data and sub-picture data by the optical disk apparatus shown in FIG. 48;

FIGS. 54A through 54C show the output states of video data, audio data and sub-picture data at the time the second sound is reproduced with some delay and the video image, sub-picture and first sound are frozen;

FIGS. 55A through 55C show the output states of video data, audio data and sub-picture data at the time the first sound and sub-picture are reproduced with some delay and the video image and second sound are frozen;

FIGS. 56A through 56C show the output states of video data, audio data and sub-picture data at the time the second sub-picture is reproduced with some delay and the video image, sounds and the first sub-picture are frozen;

FIG. 59 is a block diagram of an encoder system that encodes the video data and generates a video file;

FIG. 60 is a flowchart for an encoding process of FIG. 59;

FIG. 61 is a flowchart for combining the main video data, audio data, and sup-picture data all encoded according to the flow of FIG. 60 to create a video data file;

FIG. 62 is a block diagram of a disk formatter system that records the formatted video files on an optical disk;

FIG. 63 is a flowchart for creating logic data to be recorded on a disk in the disk formatter of FIG. 62;

FIG. 64 is a flowchart for creating from the logic data the physical data to be recorded on a disk.

DETAILED DESCRIPTION OF THE PREFERRED EMBODIMENTS

Hereinafter, referring to FIGS. 1 through 43C, an optical disk reproducing apparatus according to the first embodiment of the present invention will be explained.

Figure 2:
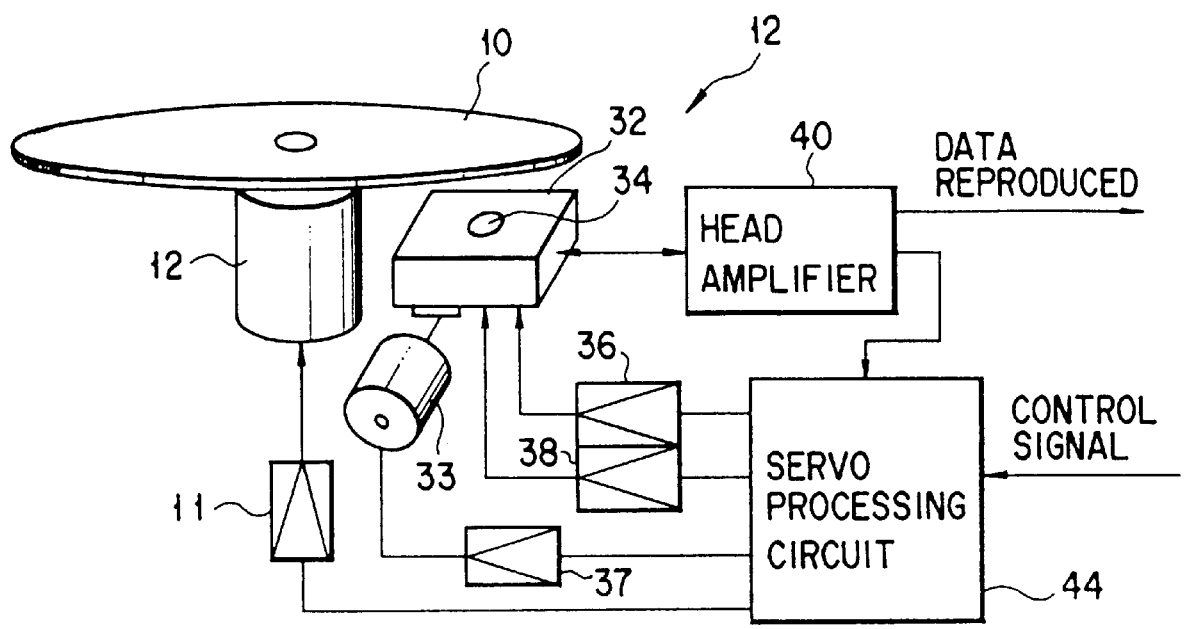
FIG. 2 is a detailed block diagram of the mechanical section of the disk drive unit of FIG. 1.
Figure 3:
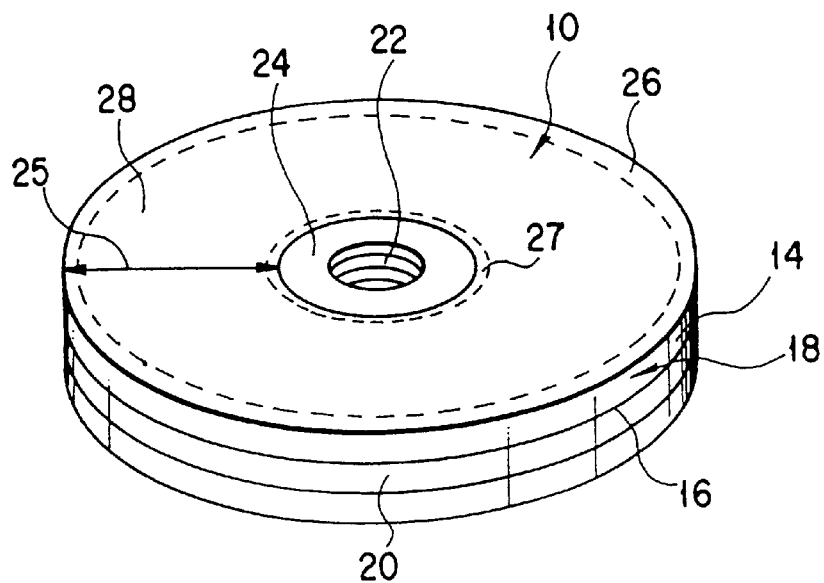
FIG. 3 is a schematic perspective view of the structure of an optical disk loaded in the disk drive unit of FIG. 1.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues to be clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which management data, main video data, sub-picture data, and audio data are recorded in the form of pits (that is, in the form of changes in the physical state) as explained later. With the read-only optical disk 10, a train of pits is previously formed in the transparent substrate 14 by a stamper, a reflecting layer is formed by evaporation on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a buffer control STC control section 57, a video decoder 58, a video buffer section 59, an audio decoder section 60, an audio buffer section 61, a sub-picture decoder section 62, a sub-picture buffer section 63, a mixing section 64, a video D/A section 66 and an audio D/A section 68.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12, driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 across the radius of the optical disk 10. The optical head 32 is provided with an object lens 34 positioned to face the optical disk 10. The object lens 34 is moved according to the driving signal supplied from the focus circuit 36 to move along its optical axis.

To reproduce the data from the above optical disk, the optical head 32 projects a laser beam on the optical disk 10 via the object lens 34. The object lens 34 is moved little by little across the radius of the optical disk 10 according to the driving signal supplied from the tracking circuit 38. Furthermore, the object lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track at, for example, a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in a data RAM section 56 by the system processor section 54 which is controlled by the system CPU section 50 which is operated in accordance with the programs stored in the system ROM/RAM section 52. The stored reproduced data is processed at the system processor section 54, which sorts the data into video data, audio data, and sub-picture data. The video data is sent via the video buffer section 59 to the video decoder section 58 to be decoded, the audio data is sent via the audio buffer section 61 to the audio decoder section 66 to be decoded, and the sub-picture data is sent via the sub-picture buffer section 63 to the sub-picture decoder section 62 to be decoded. The decoded video data and sub-picture data are mixed by the mixing section 64, and the resultant data is converted to an analog video signal by the video D/A section 66. This analog video signal is then supplied to the monitor section 6. The audio data is converted by the audio D/A section 68 to an audio signal which is supplied to the speaker section 8. Then, on the basis of the video signal, an image is displayed on the monitor section 6 and according to the audio signal, sound is simultaneously reproduced from the speaker section 8.

The detailed operation of the optical disk apparatus of FIG. 1 will be described later with reference to the logic format of the optical disk explained below.

Figure 4:
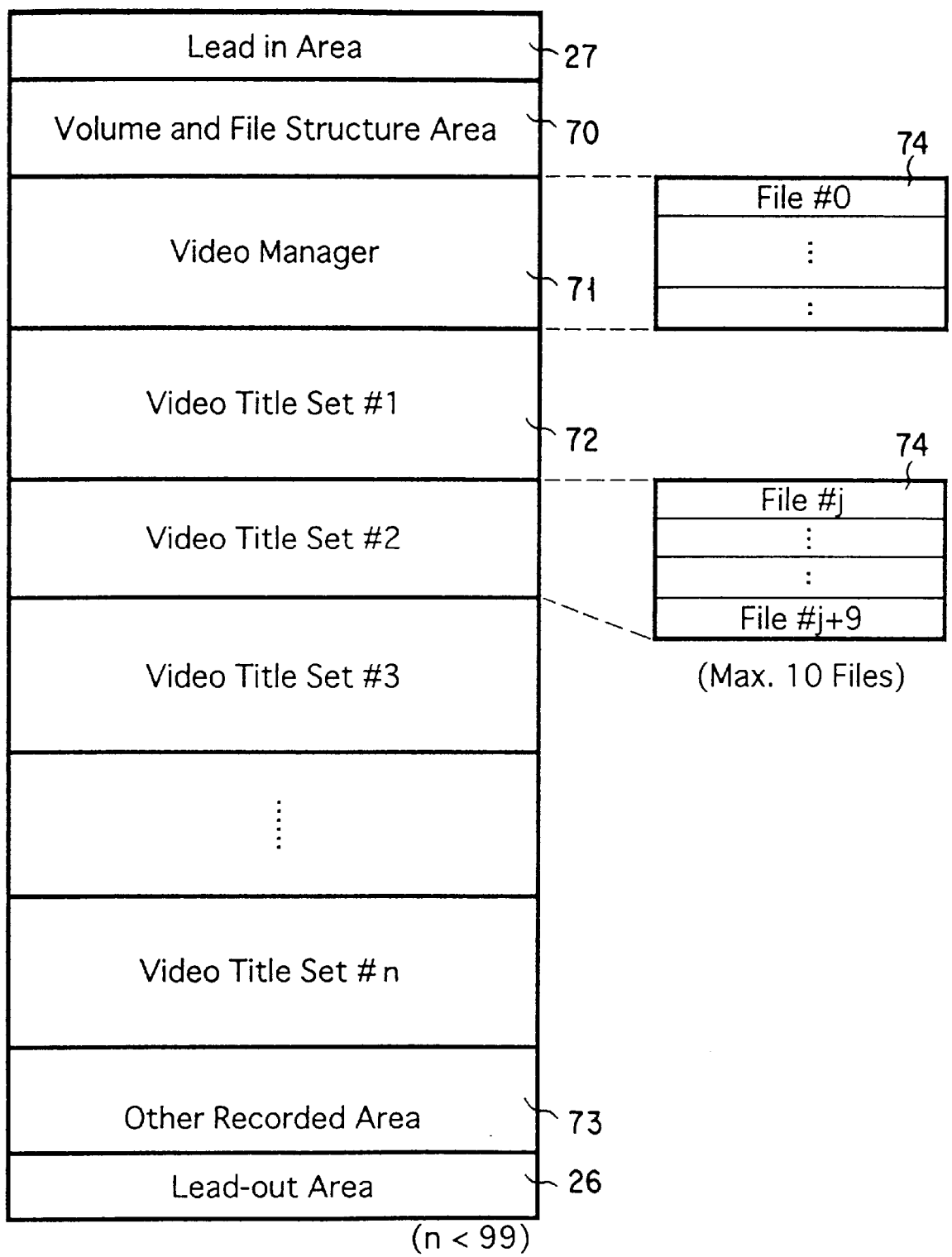
FIG. 4 shows the structure of the logic format of the optical disk of FIG. 3.

The data recording area 28 between the lead-in area 27 and the lead-out area 26 on the optical disk of FIG. 1 has a volume and file structure as shown in FIG. 4. The structure has been determined to conform to specific logic format standards, such as Micro UDF or ISO 9660. The data recording area 28 is physically divided into a plurality of sectors as described earlier. These physical sectors are assigned serial numbers. In the following explanation, the term "logical address" refers to a logical sector number (LSN) as determined in Micro UDF or ISO 9660. Like a physical sector, a logical sector contains 2048 bytes. The numbers (LSN) of logical sectors are assigned consecutively in ascending order as the physical sector number increments upward.

As shown in FIG. 4, the volume and file structure is a hierarchial structure and contains a volume and file structure area 70, a video manager 71, at least one video title set #i 72, and another recorded area 73. These areas 70, 71, 72, 73 are aligned with the boundaries between logical sectors. As with a conventional CD, a logical sector is defined as a set of 2048 bytes. Accordingly, one logical sector corresponds to one logical block.

The volume and file structure area 70 corresponds to a management area determined in Micro UDF or ISO 9660. According to the description in the management area, the video manager 71 is stored in the system ROM/RAM section 52. As explained with reference to FIG. 5, the information used to manage video title sets 72 is written in the video manager 71, which is composed of a plurality of files, starting with file #0. In each video title set 72, compressed video data, compressed audio data, compressed sub-picture data, and the reproducing information about these data items are stored as explained later. Each video title set is composed of a plurality of files 74. The number of video title sets 72 is limited to a maximum of 99. Furthermore, the number of files 74 (from file #j to file #j+9) constituting each video title set 72 is determined to be a maximum of 10. These files 74 are also aligned with the boundaries between logical sectors.

In the other recorded area 73, the information capable of utilizing the aforementioned video title sets 72 is recorded. The other recorded areas 73 are not necessarily provided.

Figure 5:
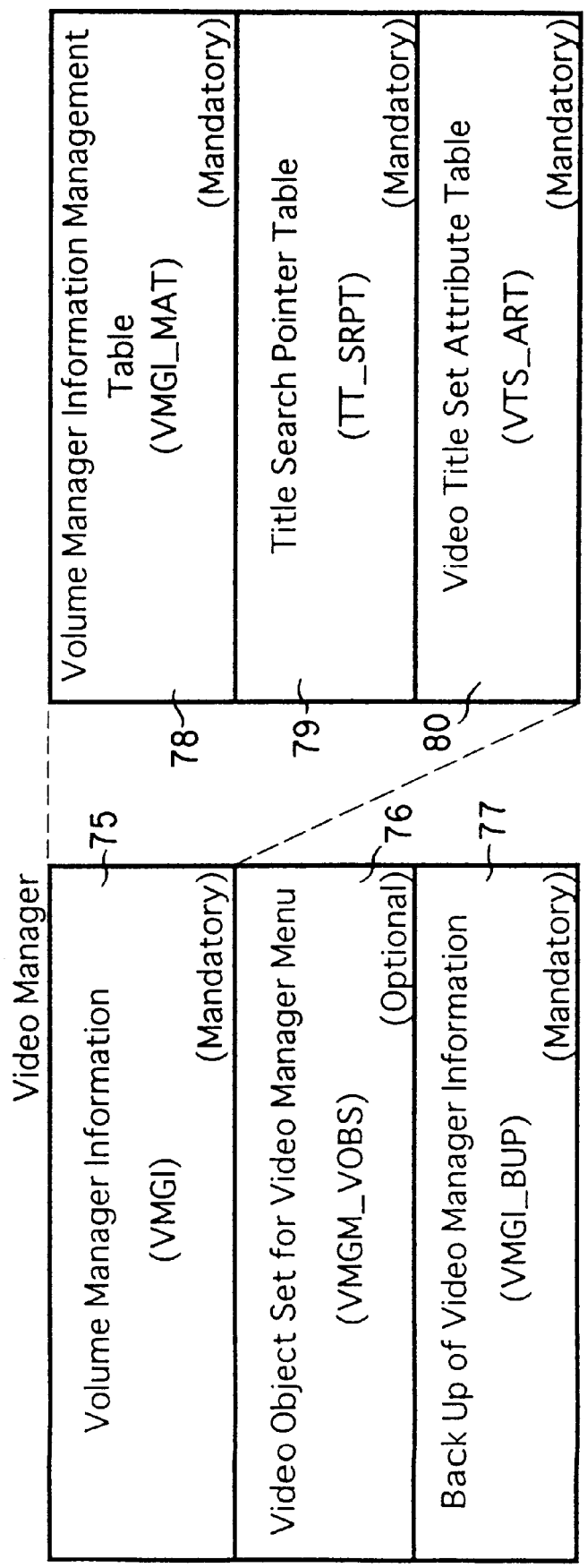
FIG. 5 shows the structure of the video manager of FIG. 4.

As shown in FIG. 5, the video manager 71 contains at least three items, each corresponding to individual files 74. Specifically, the video manager 71 is made up of volume manager information (VMGI) 75, a video object set for video manager menu (VMGM_VOBS) 76, and backup of video manager information (VMGI_BUP) 77. Here, the volume manager information (VMGI) 75 and the backup of video manager information (VMGI_BUP) 77 are determined to be indispensable items, and the video object set for video manager menu (VMGM_VOBS) 76 is determined to be an optional item. In the video object set 76 for VMGM, the video data, audio data, and sup-picture data about a menu of the volumes of the optical disk managed by the video manager 71 are stored.

By the video object set 76 for VMGM (VMGM_VOBS), the volume name of the optical disk 10, the sound accompanying the volume name representation, and the description of the sub-picture are displayed. At the same time, selectable items are provided in the form of sub-pictures as in video reproduction explained later. For example, the video object set 76 for VMGM (VMGM_VOBS) indicates that the optical disk 10 contains the video data representing English conversation for learning English. Specifically, lessons on English conversation, together with a volume name, such as the contents of English conversation, is reproduced in the form of video data, and at the same time, a theme song is reproduced in sound, and the level of the teaching material is displayed in a sub-picture. Furthermore, the user is asked which one of lessens 1 to N to select. Thus, for example, the VMGM video object set 76 (VMGM_VOBS) provides the user with preparations to watch an English conversation program for learning English.

Here, the structure of a video object set (VOBS) 82 will be described with reference to FIG. 6. FIG. 6 shows an example of a video object set (VOBS) 82. The video object set (VOBS) 82 comes in three types for two menus and a title. Specifically, the video object set (VOBS) 82 contains the video title set for video manager menu (VMGM_VOBS) 76, a video object set (VTSM_VOBS) 95 for a menu in the video title sets 72 and a video object set (VTSTT_VOBS) 82 for the titles of at least one video title set 72 in a video title set (VTS) 72 as explained later. Each video object set 82 has the same structure except that their uses differ.

As shown in FIG. 6, a video object set (VOBS) 82 is defined as a set of one or more video objects (VOB) 83. The video objects 83 in a video object set (VOBS) 82 is used for the same application. A video object set (VOBS) 82 for menus is usually made up of one video object (VOB) 83 and stores the data used to display a plurality of menu screens. In contrast, a video object set (VTSTT_VOBS) 82 for title sets is usually composed of a plurality of video objects (VOB) 83.

When the aforementioned video of an English conversation program for learning English is taken as example, a video object (VOB) 83 corresponds to the video data of each lesson. Specifying a particular video object (VOB) 83 enables, for example, lesson 1 to be reproduced on a video. The video object set (VTSM_VOBS) 95 for a menu of the video title sets 72 contains the menu data for the English conversation. According to the presentation of the menu, a particular lesson, for example, lesson 1, can be specified. In the case of a usual single story movie, one video object (VOB) 83 corresponds to one video object set (VOBS) 82. One video stream is completed with one video object set (VOBS) 82. In the case of a collection of animated cartoons or an omnibus movie, a plurality of video streams, each corresponding to individual stories, are provided in a single video object set (VOBS) 82. Each video stream is stored in the corresponding video object 83. Accordingly, the audio stream and sub-picture stream related to the video stream are also completed with each video object (VOB) 83.

An identification number (IDN#j) is assigned to a video object (VOB) 83. By the identification number (ID#j), the video object (VOB) 83 can be identified. A video object (VOB) 83 further comprises one or more such cells 84. Although a usual video stream is made up of a plurality of cells 84, a menu video stream, or a video object (VOB) 83 may be composed of one cell 84. A cell 84 is likewise assigned an identification number (C_IDN#j). By the identification number (C_IDN#j), the cell 84 is identified.

As shown in FIG. 6, each cell 84 is composed of one or more video object units (VOBU) 85, normally a plurality of video object units (VOBU) 85. Here, a video object unit (VOBU) 85 is defined as a pack train having a navigation pack (NAV pack) 86 at its head. Specifically, a video object unit (VOBU) 85 is defined as a set of all the packs recorded, starting at a navigation pack (NAV pack) 86, to immediately in front of the next navigation pack. The reproducing time of the video object unit (VOBU) 85 corresponds to the reproducing time of the video data made up of one or more GOP (Group of Pictures) contained in the video object unit (VOBU) 85 as shown in FIG. 6. The maximum reproducing time is determined to be more than 0.4 second and less than one second. In MPEG, one GOP is defined as compressed image data which corresponds to about 15 frames to be played back for, usually, 0.5 seconds.

In the case where the video data includes a video object unit as illustrated in FIG. 6, GOPs each composed of a video pack (V pack) 88, a sub-picture pack (SP pack) 90 and an audio pack (A pack) 91, all complying to the MPEG standards, are arranged, producing a video data stream. Regardless of the number of GOPs, a video object (VOBU) 83 is determined based on the time required for producing a GOP. In the video object (VOBU) 83 has a navigation pack (NAV) pack 86 arranged at its head. Any reproduced data, whether audio data, sub-picture data, or audio/sub-picture data, contains one or more video object units. Thus, even if a video object unit is composed of only audio packs only, these audio packs will be reproduced within the time for reproducing the video object unit. The procedure of reproducing these packs will be explained later in detail, along with the procedure of reproducing the navigation pack (NAV pack) 86.

The procedure for reproducing these packs, together with the navigation pack, will be explained in detail later.

The video manager 71 will be explained with reference to FIG. 5. The volume management information 75 placed at the head of the video manager 71 contains the information used to search for titles and the information used to manage the video title sets (VTS) 72 such as the information used for reproduction of a video manager menu. The volume management information 75 contains at least three tables 78, 79, 80 in the order shown in FIG. 5. Each of these tables 78, 79, 80 is aligned with the boundaries between logical sectors. A first table 78, a volume manger information management table (VMGI_MAT) 78 is a mandatory table, in which the size of the video manager 71, the starting address of each piece of the information in the video manger 71, and the attribute information about the video object set (VMGM_VOBS) 76 for a video manager menu are written.

Written in a second table of the video manager 71, a title search pointer table 79 (TT_SRPT), is an entry program chain (EPGC) of the video titles (VTS) 72 contained in the optical disk 10 that are selectable according to the entry of a title number from the key/display section 4 on the apparatus.

Figure 7:
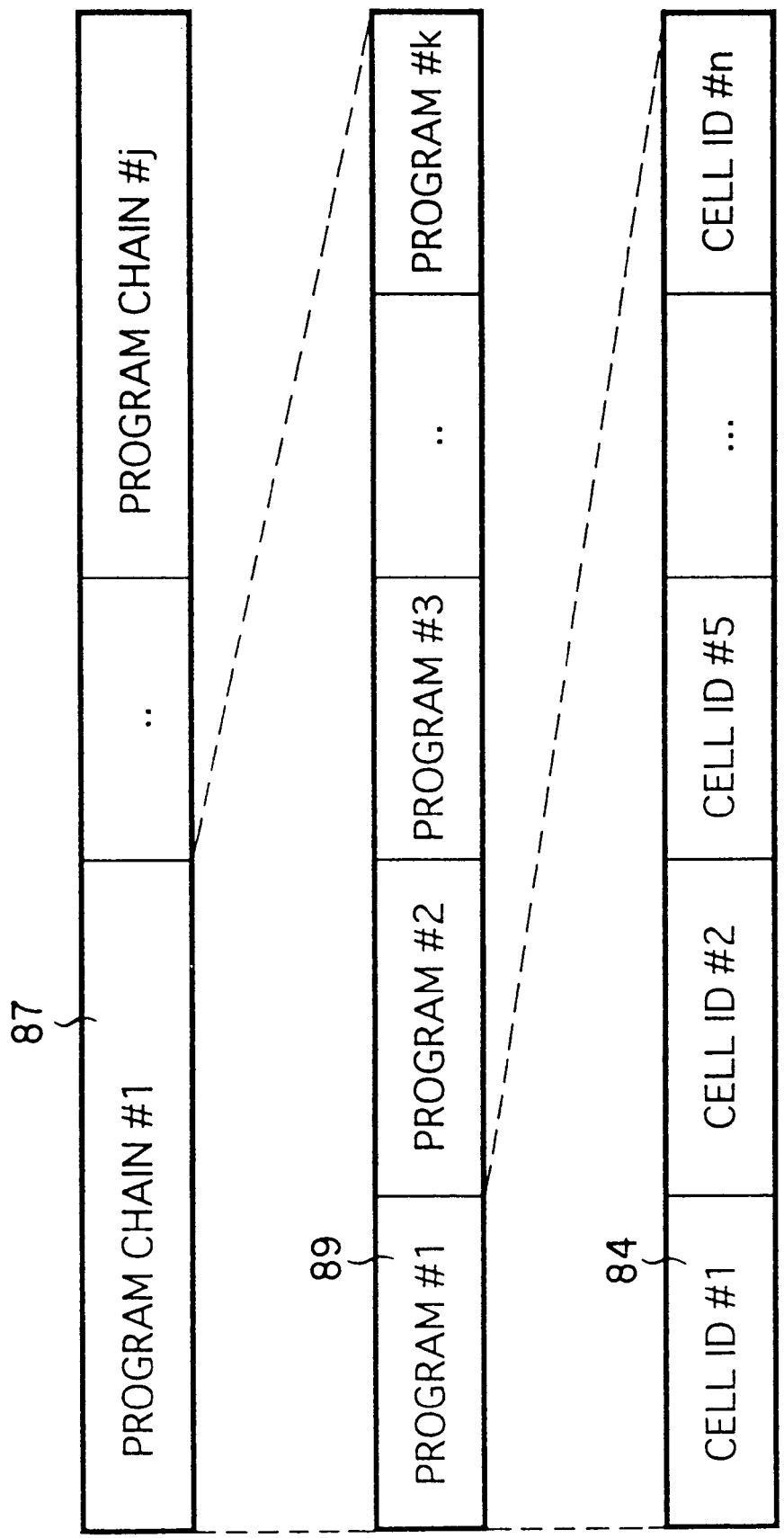
FIG. 7 is a diagram to help explain the structure of the video object unit of FIG. 6.

Here, a program chain 87 is a set of programs 89 that reproduce the story of a title as shown in FIG. 7. Continuous reproduction of a program chain 87 completes an educational program, such as English conversation for learning English, of a title. Therefore, the user can start to see the English conversation from a particular scene of the conversation by specifying the program 89.

In a third table of the video manager 71, a video title set attribution table (VTS_ATRT) 80, the attribute information determined in the video title set 72 in the volume of the optical disk 10 is written. Specifically, in this table 72, the following items are written as attribute information: the number of video title sets, video title set numbers, video attributes, such as a video data compression scheme, audio stream attributes, such as an audio coding mode, and sub-picture attributes, such as the type of sup-picture display.

The contents of the volume manager information management table (VMGI_MAT) 78 and the title search pointer table (TT_SRPT) 79 will be explained in detail with reference to FIGS. 8, 9, 10, and 11.

As shown in FIG. 8, written in the volume manager information management table (VMGI_MAT) 78 are a video manager identifier (VMG_ID), the size of video manager information (VMGI_SZ) in logical blocks (one logical block contains 2048 bytes as mentioned above), the version number (VERN) of the optical disk 10 complying with the digital versatile disk (DVD) video specification, and the category of video manager 71 (VMG_CAT).

In the category of video manager 71 (VMG_CAT), a flag indicating whether or not the DVD video directory prohibits copying is written. Further written in the table (VMGI_MAT) are a volume set identifier (VLMS_ID), the number of video title sets (VTS_Ns), the identifier for a person supplying the data to be recorded on the disk (Provider Unique ID: PVR_ID), a video manager menu video object set start address (VMGM_VOBS_SA), the end address (VMGI_MAT_EA) of a volume manager information management table (VMGI_MAT) 78, and the start address (TT_SRPT_SA) of a title search pointer table (TT_SRPT) 79. The end address of VMGI_MAT 78 (VMGI_MATEA) and the start address of TT_SRPT (TT_SRPT_SA) 79 are represented by the number of logical blocks, relative to the first logical block.

Furthermore, in the table 78, the start address (VTS_ATRTSA) of the attribute table (VTS_ATRT) 80 of video title sets (VTS) 72 is represented by the number of bytes, relative to the first byte in the VMGI manager table (VMGI_MAT) 71, and the video attribute (VMGM_V_AST ) of the video manager menu (VMGM) is written. Further written in the table 78 are the number of audio streams (VMGM_AST_Ns) in the video manager menu (VMGM), the attributes of audio streams (VMGM_AST_ATR) in the video manager menu (VMGM), the number of sub-picture streams (VMGM_SPST_Ns) in the video manager menu (VMGM), and the attributes of sub-picture streams (VMGM_SPST_ATR) in the video manager menu (VMGM).

In the title search pointer table (TT_SRPT) 79, as shown in FIG. 9, the title search pointer table information (TSPTI) is first written and then as many title search pointers for input numbers 1 to n (n≦99) as are needed are written consecutively. When only the reproducing data for one title, such as for example, only the video data for one title, is stored in the volume of the optical disk, only one title search pointer (TT_SRP) 93 is written in the table (TT_SRPT) 79.

The title search pointer table information (TSPTI) 92 contains the number of entry program chains (EN_PGC_Ns) and the end address (TT_SRPT_EA) of the title search pointer 93 as shown in FIG. 10. The address (TT_SRPT_EA) is represented by the number of bytes, relative to the first byte in the title search pointer table (TT_SRPT) 79. Furthermore, as shown in FIG. 11, each title search pointer (TT_SRP) 93 contains the video title set number (VTSN), the program chain number (PGCN), and the start address (VTS_SA) of the video title set 72. The contents of the title search pointer (TT_SRP) 93 specifies a video title set 72 to be reproduced and a program chain (PGC) 87 as well as a location in which the video title set 72 is to be stored. The start address (VTS_SA) of the video title set 72 is represented by the number of logical blocks in connection with the title set 72 specified by the video title set number (VTSN).

The structure of the logic format of the video title set 72 shown in FIG. 4 will be described with reference to FIG. 12. In each video title set (VTS) 72, four items are written in the order shown in FIG. 12. Each video title set (VTS) 72 is made up of one or more video titles having common attributes. The video title set information (VTSI) 94 contains the management information on the video titles, including the information on entry search points, the information on playback of video object sets 72, the information on playback of title set menus (VTSM), and the attribute information on video object sets 72.

Each video title set 72 is provided with the backup of the video title set information (VTSI_BUP) 97. Between the video title set information (VTSI) and the backup of the information (VTSI_BUP) 97, a video object set for video title set menus (VTSM_VOBS) 95 and a video object set for video title set titles (VTSTT_VOBS) 96 are arranged. Both of the video object sets (VTSM_VOBS and VTSTT_VOBS) 95, 96 have the structure shown in FIG. 6, as explained earlier.

The video title set information (VTSI) 94, the backup of the information (VTSI_BUP) 97, and the video object set (VTSTT_VOBS) 96 for video title set titles are items indispensable to the video title set 72. The video object set (VTSM_VOBS) 96 for video title set menus is an option provided as the need arises.

Figure 12:
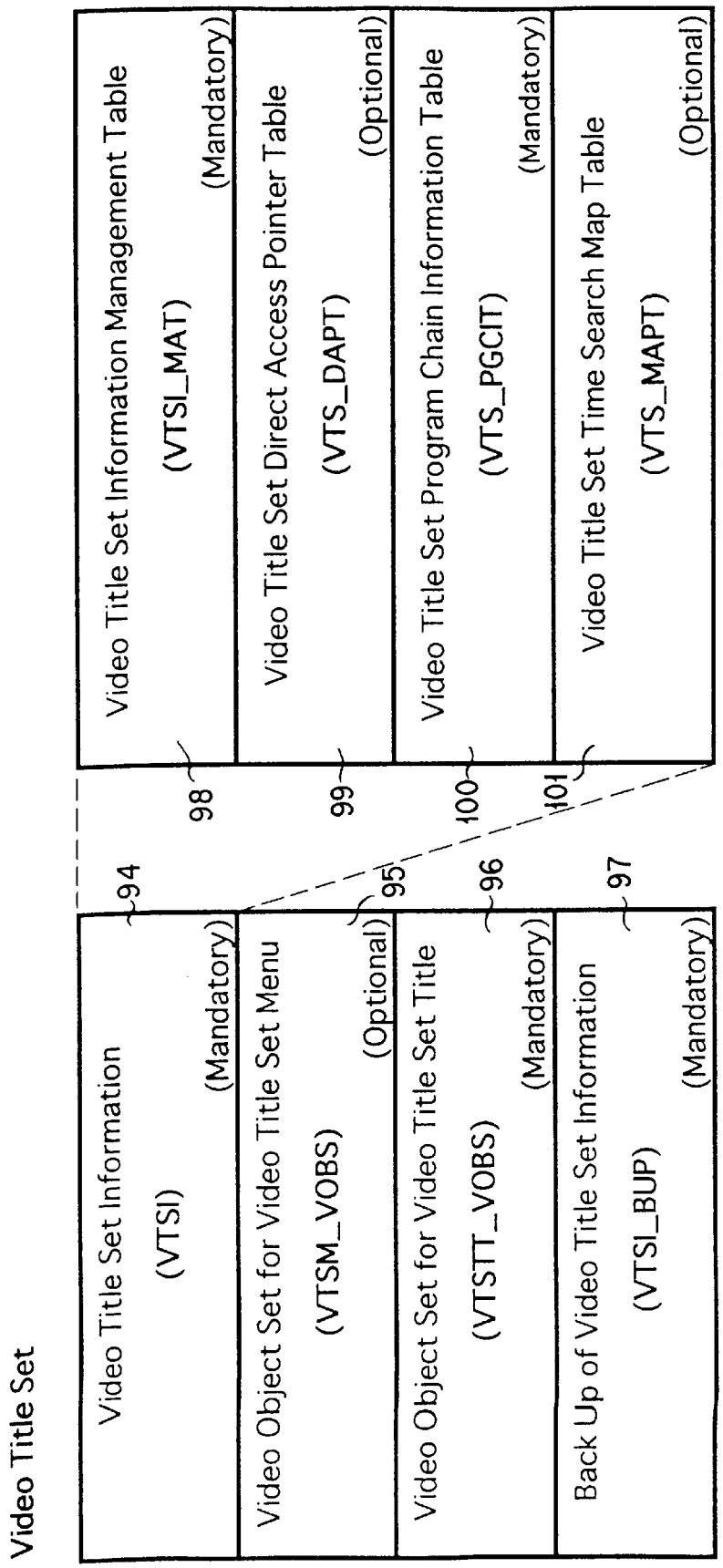
FIG. 12 illustrates the structure of the video title set of FIG. 4.

The video title set information (VTSI) 94 consists of four tables as shown in FIG. 12. The four tables are forced to align with the boundaries between logical sectors. The video title set information management table (VTSI_MAT) 98, a first table, is a mandatory table, in which the size of the video title set (VTS) 72, the start addresses of each piece of information in the video title set (VTS) 72, and the attributes of the video object sets (VOBS) 96 in the video title set (VTS) 72 are written.

The video title set direct access pointer table (VTS_DAPT) 99, a second table, is an optional table provided as the need arises. Written in the table 99 are the program chains (PGC) 87 and/or programs (PG) 89 contained in the video title set 72 that are selectable according to the entry of a title number from the key/display section 4 of the apparatus.

The video title set program chain information table (VTS_PGCIT) 100, a third table, is a mandatory table, in which the VTS program chain information (VTS_PGCI) 104 is written. The video title set time search map table (VTS_MAPT) 101, a fourth table, is an optional table provided as the need arises, in which the information on the recording location, for a specific period of time of display, of the video data in each program chain (PGC) 87 in the title set 72 to which the map table (VTS_MAPT) 101 belongs, is written.

Next, the video title information management table (VTSI_MAT) 98 and video title set program chain information table (VTSI_PGCIT) 100 shown in FIG. 12 will be described with reference to FIGS. 13 to 20.

FIG. 13 shows the contents of the video title information management table (VTSI_MAT) 98, in which the video title set identifier (VTS_ID), the size of the video title set 72 (VTS_SZ), the version number of the DVD video specification (VERN), and the video title set category (VTS_CAT) are written in that order. Furthermore, in the table (VTSI_MAT) 98, the start address of the video object set (VTSM_VOBS) for VTS menus is expressed by a logical block relative to the first logical block in the video title set (VTS) 72. The start address (VTSTT_VOB_SA) of the video object 83 for titles in the video title set (VTS) 72 is expressed by a logical block (RLBN) relative to the first logical block in the video title set (VTS) 72.

Furthermore, in the table (VTSI_MAT) 98, the end address (VTI_MAT_EA) of the video title set information management table (VTI_MAT) 98 is represented by the number of blocks, relative to the first byte in the table (VTI_MAT), 98 and the start address of the video title set direct access pointer table (VTS_DAPT) 99 is represented by the number of blocks, relative to the first byte in the video title set information (VTSI) 94.

Still furthermore, in the table (VTSI_MAT) 98, the start address (VTS_PGCIT_SA) of the video title set program chain information table (PGCIT) 100 is expressed by the number of blocks, relative to the first byte of the video title set information (VTSI) 94, and the start address (VTS_MAPT_SA) of the time search map (VTS_MAPT) 101 in the video title set (VTS) 72 is expressed by a logical sector relative to the first logical sector in the video title set (VTS) 72. Written in the table (VTSI_MAT) 98 are the video object set (VTSM_VOBS) 95 for the video title set menu (VTSM) in the video title set (VTS) 72, the video attributes (VTS_V_ATR) of the video object set (VTST_VOBS) 96 for the titles (VTSTT) in the video title set 72, and the number of audio streams (VTS_AST_Ns) in the video object set (VTSTT_VOBS) 82 for the titles (VTSTT) for the video title sets 72. Here, the video attributes (VTS_V_ATR) include a video compression mode, a frame rate of the TV system, and an aspect ratio for displaying an image on a display unit.

Written in the table (VTSI_MAT) 98 are the audio stream attributes (VTS_AST_ATR) of the video object set (VTST_VOBS) for the titles (VTSTT) in the video title set (VTS). The attributes (VTS_AST_ATR) include an audio encoding mode indicating how audio is encoded, the number of bits used to quantize audio, and the number of audio channels.

Furthermore, written in the table (VTSI_MAT) 98 are the number (VTS_SPST_Ns) of sub-picture streams in the video object set 82 for the titles (VTSTT) in the video title set (VTS) 72 and the attributes (VTS_SPST_ATR) of each sub-picture stream. The attributes (VTR_SPST_ATR) for each sub-picture stream include a sub-picture coding mode and a sub-picture display type.

Furthermore, in the table (VTSI_MAT) 98, written are the number (VTSM_AST_Ns) of audio streams in the video title set menu (VTSM), the audio stream attributes (VTSM_AST_ATR), the number (VTSM_SPSTNs) of sup-picture streams, and the sup-picture stream attributes (VISM_SPST_ATR).

Figure 14:
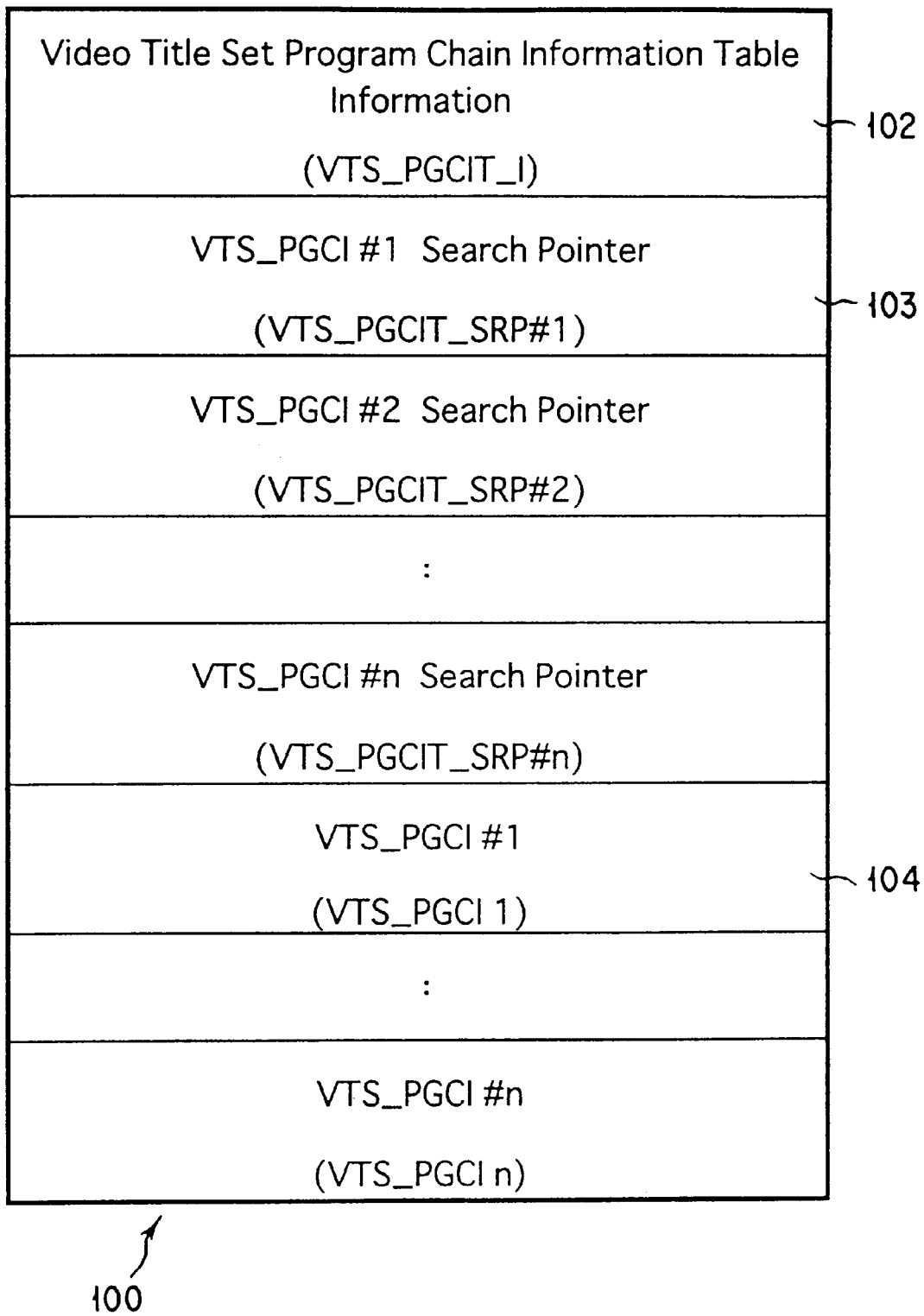
FIG. 14 illustrates the structure of the video title set program chain information table (VTS_PGCIT) of the video title set information (VTSI) of FIG. 12.

The VTS program chain information table (VTS_PGCIT) 100 has a structure as shown in FIG. 14. In the information table (VTS_PGCIT) 100, information on the VTS program chain (VTS_PGC) is written, starting with information (VTS_PGCIT_I) 102 on the information table (VTS_PGCIT) 100 related to the VTS program chain (VTS_PGC). In the information table (VTS_PGCIT) 100, the information (VTS_PGCIT_I) 102 is followed by as many VTS_PGCI search pointer (VTS_PGCIT_SRP) 103 used to search for VTS program chains (VTS_PGC) as the number (#1 to #n) of VTS program chains in the information table (VTS_PGCIT). At the end of the table, there are provided as many pieces of information (VTS_PGCI) 104 on the respective VTS program chains (VTS_PGC) as the number (from #1 to #n) of the VTS program chains (VTS_PGC).

The information (VTS_PGCIT_I) 102 in the VTS program chain information table (VTS_PGCIT) 100 contains the number (VTS_PGC_Ns) of VTS program chains (VTS_PGC) as shown in FIG. 15. The end address (VTS_PGCIT_EA) of the table information (VTS_PGCIT_I) 102 is expressed by the number of bytes, relative to the first byte in the information table (VTS_PGCIT) 100.

Furthermore, as shown in FIG. 16, the VTS_PGCIT search pointer (VTS_PGCIT_SRP) 103 contains the attributes (VTS_PGC_CAT) of the program chains (VTS_PGC) in the video title set (VTS) 72 and the start address (VTS_PGCI_SA) of the VTS_PGC information (VTS_PGCI) 104 expressed by the number of bytes, relative to the first byte in the VTS_PGC information table (VTS_PGCIT) 100. Here, the VTS_PGC attribute (VTS_PGC_CAT) is, for example, an attribute indicating whether an entry program chain (Entry PGC) is the first one to be reproduced. Usually, an entry program chain (PGC) is written before program chains (PGC) that are not entry program chains (PGC). Generally, program chains (PGC) are reproduced in the description order of VTS_PGCIs as shown in FIG. 14.

The PGC information (VTS_PGCI) 104 in the video title set 72 contains four items as shown in FIG. 17. In the PGC information (VTS_PGCI) 104, the program chain general information (PGC_GI) 105 on a mandatory item is first arranged, followed by at least three items that are made mandatory only when there is an video object 83. Specifically, contained as the three items in the PGC information (VTS_PGCI) 104 are a program chain program map (PGC_PGMAP) 106, a cell playback information table (C_PBIT) 107, and a cell position information table (C_POSIT) 108.

As shown in FIG. 18, the program chain general information (PGC_GI) 105 contains the category (PGCI_CAT) of the program chain 87, the contents (PGC_CNT) of the program chain (PGC) 87, and the playback time of the program chain (PGC) 87. Written in the category of PGC (PGCI_CAT) are whether the PGC can be copied or not and whether the programs 89 in the PGC are played back continuously or at random. The contents of PGC (PGC_CNT) contains the description of the program chain structure, that is, the number of programs 89, the number of cells 84, and the number of angles in the program chain 87. The playback time of PGC (PGC_PB_TIME) contains the total playback time of the programs 89 in the PGC. The playback time is the time required to continuously play back the programs 89 in the PGC, regardless of the playback procedure.

Furthermore, the program chain general information (PGC_GI) 105 contains PGC sub-picture stream control (PGC_SPST_CTL), PGC audio stream control (PGC_AST_CTL), and PGC sub-picture palette (PGC_SP_PLT). The PGC sub-picture stream control (PGC_SPST_CTL) contains the number of sub-pictures usable in the PGC 89 and the PGC audio stream control (PGC_AST_CTL) likewise contains the number of audio streams usable in the PGC 89. The PGC sub-picture palette (PGC_SP_PLT) contains a set of a specific number of color paletts used in all of the sub-picture streams in the PGC 89.

Furthermore, the PGC general information (PGC_GI) 105 contains the start address (C_PBIT_SA) of the cell playback information table (C_PBIT) and the start address (C_POSIT_SA) of the cell position information table (C_POSIT) 108. Both of the start addresses (C_PBIT_SA and C_POSIT_SA) are represented by the number of logical blocks, relative to the first byte in the VTS_PGC information (VTS_PGCI) 105.

The program chain program map (PGC_PGMAP) 108 is a map showing the arrangement of the programs 89 in the PGC 87 of FIG. 19. In the map (PGC_PGMAP) 106, the entry cell numbers (ECELLN), the start cell numbers of the individual programs 89, are written in ascending order as shown in FIGS. 19 and 20. In addition, program numbers are allocated, starting at 1, in the order in which the entry cell numbers are written. Consequently, the first entry number in the map (PGC_PGMAP) 106 must be #1.

The cell playback information table (C_PBIT) defines the order in which the cells 84 in the PGC 87 are played back. In the cell playback information table (C_PBIT) 107, pieces of the cell playback information (C_PBI) are written consecutively as shown in FIG. 21. Basically, cells 84 are played back in the order of cell number. The cell playback information (C_PBIT) 108 contains a cell category (C_CAT) as shown in FIG. 22. Written in the cell category (C_CAT) are a cell block mode indicating whether a cell is in the block and if it is in the block, whether the cell is the first one, a cell block type indicating whether a cell 84 is not part of the block or is in an angle block, and an STC discontinuity flag indicating whether the system time clock (STC) must be set again.

Further written in the cell category (C_CAT) are a cell playback mode indicating whether the video object units (VOBU) 85 in the cell 84 are played back continuously or a picture is made still at one video object unit (VOBU) 85 to another in the cell 84, and cell navigation control indicating whether the picture is made still after the playback of the cell or indicating the rest time.

As shown in FIG. 22, the cell playback information table (C_PBIT) 107 contains the cell playback time (C_PBTNM) representing the total playback time of the PGC 87. When the PGC 87 has an angle cell block, the playback time of the angle cell number 1 represents the playback time of the angle block. Further written in the cell playback information table (C_PBIT) 107 are the start address (C_FVOBU_SA) of the first video object unit (VOBS) 85 in the cell 84 expressed by the number of logical sectors, relative to the first logical sector in the video object unit (VOBS) 85 in which the cell 84 is written and the start address (C_LVOBU_SA) of the end video object unit (VOBS) 85 in the cell 84 expressed by the number of logical sectors, relative to the first logical sector in the video object unit (VOBS) 85 in which the cell 84 is written.

The cell position information table (C_POSI) 108 specifies the identification number (VOB_ID) of the video object (VOB) 85 in the cell used in the PGC 87 and the identification number (Cell_ID) of the cell 84. In the cell position information table (C_POSI) 108, pieces of the cell position information (C_POSI) corresponding to the cell numbers written in the cell playback information table 107 as shown in FIG. 23 are written in the same order as in the cell playback information table (C_PBIT) 107. The cell position information (C_POSI) contains the identification number (C_VOB_IDN) of the video object unit (VOBS) 85 in the cell 84 and the cell identification number (C_IDN) as shown in FIG. 24.

Figure 25:
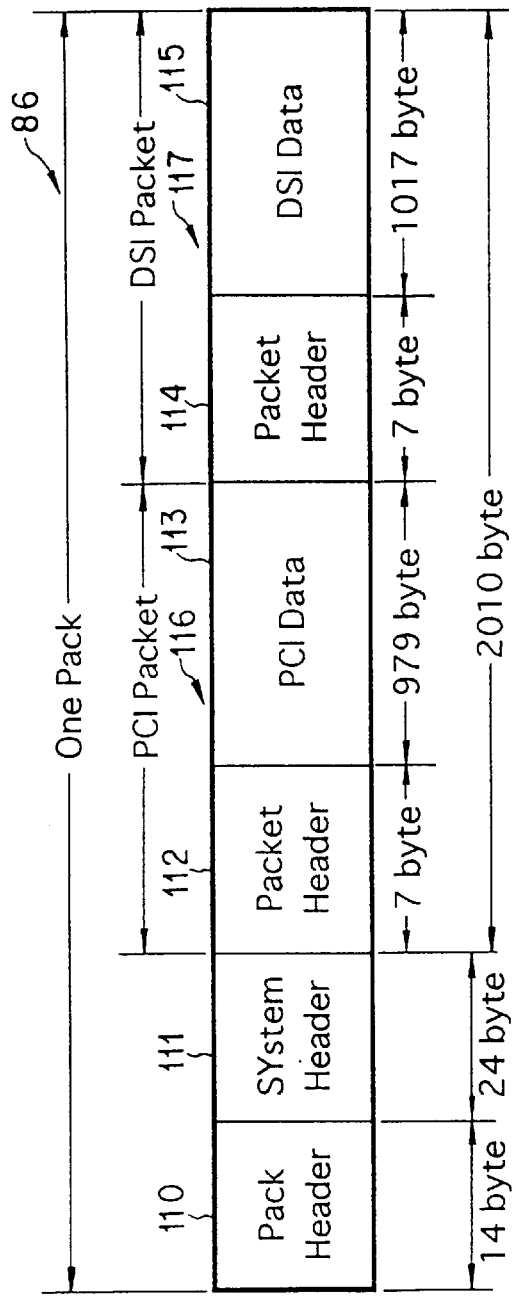
FIG. 25 illustrates the structure of the navigation pack of FIG. 23.

As explained with reference to FIG. 6, a cell 84 is a set of video object units (VOBU) 85. A video object unit 85 is defined as a pack train starting with a navigation (NAV) pack 86. Therefore, the start address (C_FVOBU_SA) of the first video object unit (VOBU) 85 in a cell 84 is the start address of the NAV pack 86. As shown in FIG. 25, the NAV pack 86 consists of a pack header 110, a system header 111, and two packets 116, 117 of navigation data; namely, a presentation control information (PCI) packet 116 and a data search information (DSI) packet 117. As many bytes as shown in FIG. 25 are allocated to the respective sections so that one pack may contain 2048 bytes corresponding to one logical sector. The NAV pack is provided immediately before the video pack 88 which contains the first data item in the group of pictures (GOP). Even if the object unit 85 contains no video pack 88, the NAV pack 86 is positioned at the head of the object unit 85, provided that the object unit 85 contains an audio pack 91 and/or a sub-picture pack 90. Thus, even if object unit 85 contains no video pack, its playback time is determined on the basis of the time required for playing back a video pack 88, exactly in the same way as in the case where the unit 85 contains a video pack 88.

Here, GOP is defined as a data train constituting a screen determined in the MPEG standards. In other words, GOP is equivalent to compressed data which may be expanded into image data representing a plurality of frames of a moving picture. The pack header 110 contains a pack starting code, a system clock reference (SCR), and a multiplex rate. The system header 111 contains a bit rate and a stream ID. The packet header 112, 114 of each of the PCI packet 116 and DCI packet 117 contains a packet starting code, a packet length, and a stream ID as determined in the MPEG2.

Figure 26:
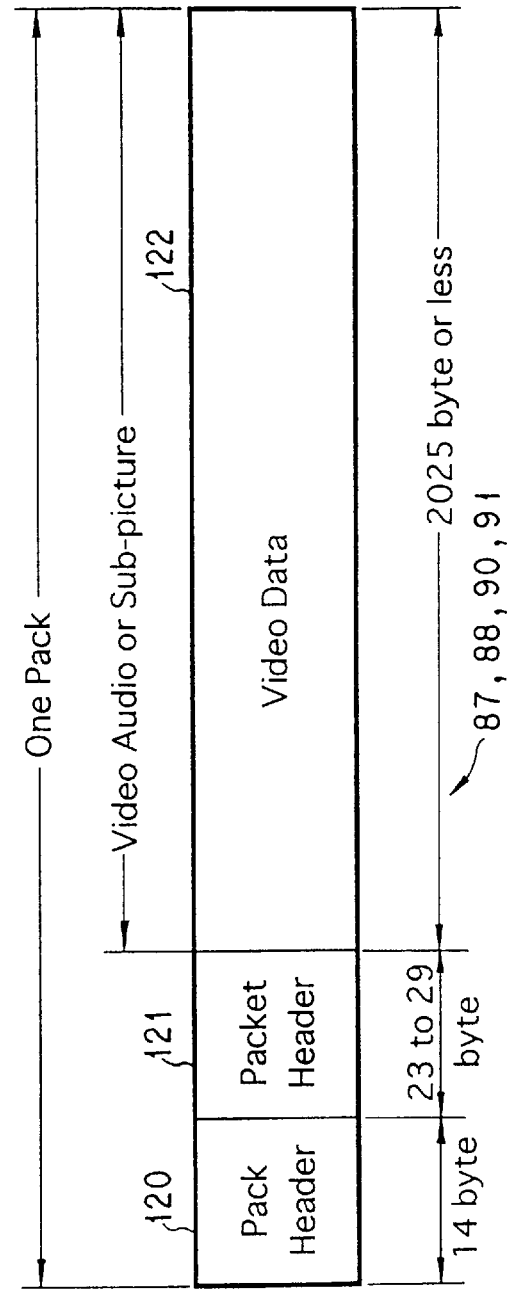
FIG. 26 illustrates the structure of the video, audio, sub-picture, or VBI pack of FIG. 6.
Figure 36:
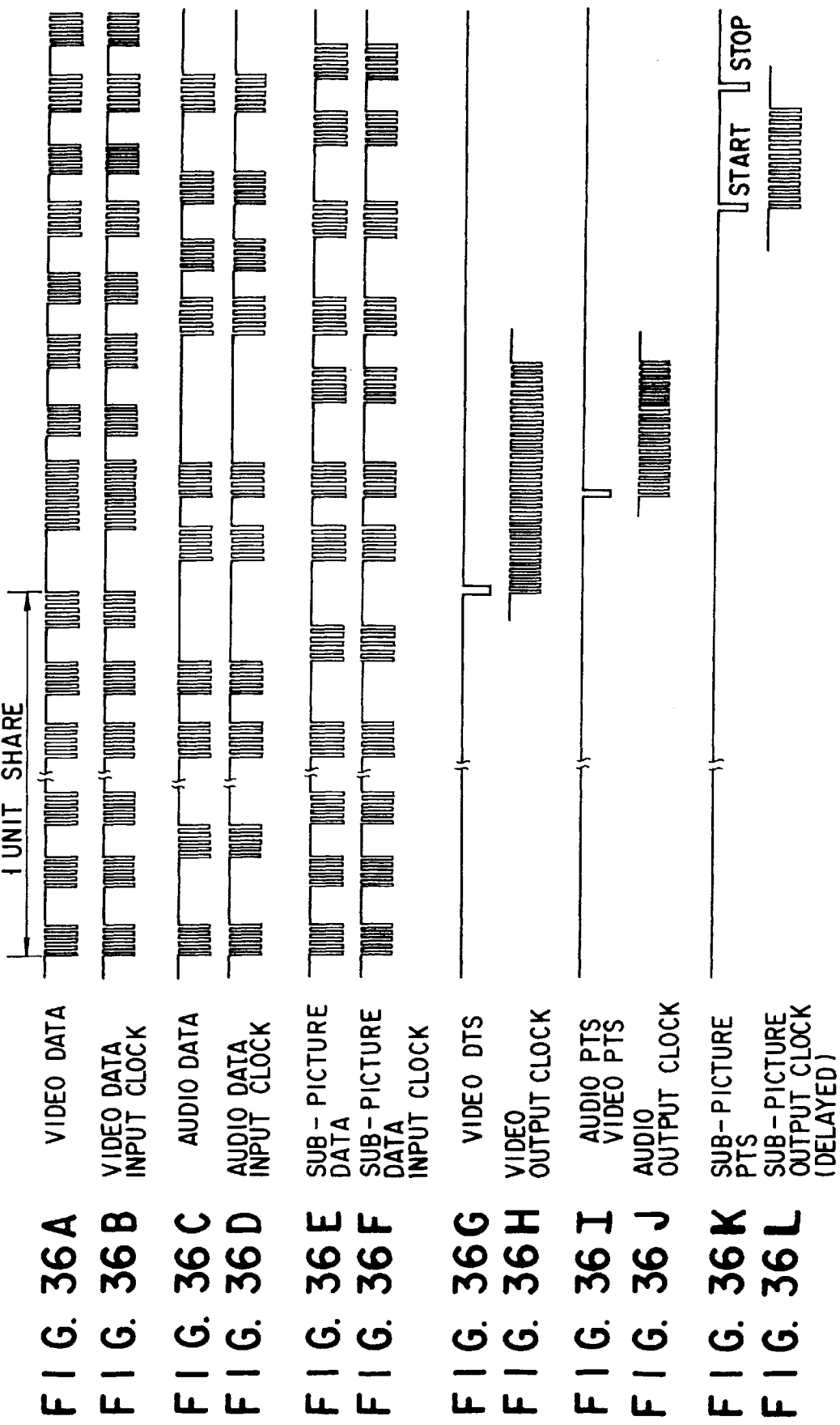
FIGS. 36A through 36L present a timing chart for explaining the relationship among an input clock, output clock, PTS and DTS for use in the reproduction of video data, audio data and sub-picture data.

As shown in FIG. 26, another video park 88, audio park 91 or sub-picture pack 90 consists of a pack header 120, packet header 121, and a packet 122 containing the corresponding data as in the system layer 24 MPEG 2. Its pack length is determined to be 2048 bytes. Each of these packs is aligned with the boundaries between logical blocks.

It is to be noted that PTS (Presentation Time Stamp; time management information for the reproduced output) and DTS (Decoding Time Stamp; decoding time management information) are additionally stored in the packet header 121 of the video pack 88 which includes head data of the I picture of GOP. PTS is additionally stored in the packet header 121 of the audio pack 91. PTS is additionally stored in the packet header 121 of the sub-picture pack 90, which includes the head data of a sub-picture unit consisting of a plurality of sub-picture packs 90 for one still picture to be reproduced at the same time.

The SCR to be stored in each pack increases in the recording order on the optical disk 10 with the value of the head pack of (video) data for each video object taken as 0.

The PCI data (PCI) 113 in the PCI packet 116 is navigation data used to make a presentation, or to change the contents of the display, in synchronization with the playback of the video data in the VOB unit (VOBU) 85. Specifically, the PCI data (PCI) 113 contains PCI general information (PCI_GI) as information on the entire PCI data 113 change as shown in FIG. 27. The PCI general information (PCI_GI) contains the address (NAV_PCK_LBN) of the NV pack (NV_PCK) 86 in which the PCI data is recorded as shown in FIG. 28, the address being expressed in the number of blocks, relative to the VOBU logical sector in which the PCI data is recorded. The PCI general information (PCI_GI) contains the category of VOBU (VOBU_CAT), the start PTS of VOBU 85 (VOBU_SPTS), and the end PTS of VOBU 85 (VOBU_EPTS). Here, the start PTS of VOBU 85 (VOBU_SPTS) indicates the playback start time (start presentation time stamp (SPTS)) of the video data in the VOBU 85 containing the PCI data. The playback start time is the playback start time of the first picture in the first GOP in the VOBU 85. Normally, the first picture corresponds to I picture (intra-picture) data in the MPEG standards. The end PTS (VOBU_EPTS) in the VOBU 85 indicates the playback end time (end presentation time stamp (EPTS)) of the video data in the VOBU 85 containing the PCI data. The playback end time is the playback start time of the last picture in the last GOP in the VOBU 85.

The DSI data (DSI) 115 in the DSI packet 117 shown in FIG. 25 is the navigation data used to search for a VOB unit (VOBU) 85. The DSI data (DSI) 115 contains the DSI general information (DSI_GI), VOBU search information (VOBU_SI), and the synchronizing playback information (SYNCI) as shown in FIG. 29.

The DSI information (DSI_GI) contains information about the entire DSI data 115. Specifically, as shown in FIG. 30, the DSI general information (DSI_GI) contains the system clock reference for the NV pack (NV_PCK_SCR) 86. The system clock reference (NV_PCK_SCR) is stored in the system time clock (STC) 54A, 58A, 60A or 62A built in each section of FIG. 1. On the basis of the STC 54A, 58A, 60A, 62A, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NAV_PCK) 86 containing the DSI data expressed by the number of logical sectors (RLSN), relative to the first logical sector in the VOB set (VOBS) 82 containing the DSI, and the address (VOBU_EA) of the last pack in the VOB unit (VOBU) 85 containing the DSI data expressed by the number of logical sectors (RLSN), relative to the first logical sector in the VOB unit (VOBU) 85.

Furthermore, the DSI general information (DSI_GI) contains the end address (VOBU_IP_EA) of the V pack (V_PCK) 88 containing the last data item for the first I picture in the VOB unit (VOBU) expressed by the number of logical sectors (RLSN), relative to the first logical sector in the VOB unit (VOBU) 85 containing the DSI data, and the identification number (VOBU_IP_EA) of the VOB 83 containing the DSI and the identification number (VOBU_C_IDN) of the cell 84 in which the DSI data is recorded.

The search information (VOBU_SI) in VOBU 85 contains information used to identify the first address in a cell 84.

The synchronizing information (SYNCI) contains address information on the sub-pictures and audio data reproduced in synchronization with the playback start time of the video data in the VOB unit (VOBU) 85 containing the DSI data. Specifically, as shown in FIG. 31, the start address (A_SYNCA) of the target audio pack (A_PCK) is expressed by the number of logical sectors (RLSN), relative to the NAV pack (NV_PCK) 86 in which DSI data 115 is recorded. When there is more than one audio stream (8 audio streams maximum), as many pieces of the synchronizing information (SYNCI) as there are audio streams are written. Furthermore, the synchronizing information (SYNCI) contains the address (SP_SYNCA) of the NAV pack (NV_PCK) 86 of the VOB unit (VOBU) 85 containing the target audio pack (SP_PCK) 91, the address being expressed by the number of logical sectors (RLSN), relative to the NV pack (NV_PCK) 86 in which DSI 115 are recorded. When there are more than one sub-picture stream (32 sub-picture streams maximum), as many pieces of the synchronizing information (SYNCI) as there are sub-picture streams are written.

Referring to FIG. 32, a sub-picture unit constituted of sub-picture data of a plurality of sub-picture packets will now be described. A sub-picture unit having several dozen pieces of still picture data (e.g., superimposition data) can be recorded in one GOP. The sub-picture unit consists of a sub-picture unit header (SPUH), pixel data (PXD) comprised of run-length data, and a display control sequence table (DCSQT).

Described in the sub-picture unit header (SPUH) are the size (SPDSZ) of the sub-picture unit and the start address (SPDCSQTA) of the display control sequence table, as shown in FIG. 33.

Display control sequences (DCSQ) are described in a chronological order in the display control sequence table (DCSQT) as shown in FIG. 34.

The start address (SPNDCSQA) and display control command (SPDCCMD) of the next display control sequence are described in each display control sequence (DCSQ) as shown in FIG. 35.

The display control command (SPDCCMD) consists of a command (FSTA_DSP) for setting the timing for starting the forced-display of pixel data, a command (STA_DSP) for setting the display start timing for pixel data, a command (STP_DSP) for setting the display end timing for pixel data, a command (SET_COLOR) for setting a color code of pixel data, a command (SET_CONTR) for setting the contrast between pixel data and main picture, a command (SET_DAREA) for setting the display area for pixel data, a command (SET_DSPXA) for setting the display start address for pixel data, a command (CHG_COLCON) for setting a color change and contrast change in pixel data, and a command (CMD_END) for terminating the display control command.

The command (STA_DSP) designates the display start time for sub-picture data, and is described by an offset PTS from PTS described in a sub-picture packet which includes a sub-picture unit header (start PTS). The command (STP_DSP) designates the display stop time for sub-picture data, and is described by the offset PTS from PTS described in a sub-picture packet which includes a sub-picture unit header (stop PTS).

The start PTS and stop PTS are delayed by arbitrary predetermined times from those of main picture data and audio data which are reproduced in the same time slot.

The system processor section 54 shown in FIG. 1 has a packet discrimination/transfer section 54b, which compares the time in an internal STC timer 54a with the SCR (System Clock Reference) described in the pack header of each pack to discriminate the packet type of a matching pack, and sends the data of that packet to individual associated sections. The packet data of a navigation pack, which has been discriminated by this packet discrimination/transfer section 54b, is transferred to the data RAM section 56, the packet data of a video pack, discriminated by the section 54b, is transferred together with an input clock to the video buffer section 59, the packet data of an audio pack, discriminated by the section 54b, is transferred together with an input clock to the audio buffer section 61, and the packet data of a sub-picture pack, discriminated by the section 54b, is transferred together with an input clock to the sub-picture buffer section 63.

As shown in FIGS. 36A to 36F, for example, when data is output packet by packet, the input clock is output to the buffer associated with that packet type.

Accordingly, the system processor section 54 sequentially outputs sequences of video data, audio data and sub-picture data, which are to be reproduced in the same time slot, together with the input clock to the associated buffers.

The system processor section 54 sends the PTS (Presentation Time Stamp) and DTS (Decoding Time Stamp), described in the packet header of a video data pack, the PTS, described in the packet header of an audio data pack, the start PTS and stop PTS, which are specified by the display control command (DCSQ) and are included in the PTS, described in the packet header of a sub-picture data pack, and the time in the internal STC timer 54a or the SCR to the buffer control/STC control section 57.

The buffer control/STC control section 57 is designed to store the SCR from the system processor section 54 into an STC timer 57a, outputs the SCR and the PTS and DTS of each data to the associated decoders, and outputs an output clock to the buffers associated with the PTS and DTS.

For example, one unit of output clocks as shown in FIG. 36H is output to the video buffer section 59 in accordance with the DTS for video data as shown in FIG. 36G, one unit of output clocks as shown in FIG. 36J is output to the audio buffer section 61 in accordance with the PTS for audio data as shown in FIG. 36I, and one unit of output clocks as shown in FIG. 36L is output to the sub-picture buffer section 63 in accordance with the start PTS for sub-picture data as shown in FIG. 36K.

Each of the video buffer section 59, audio buffer section 61 and sub-picture buffer section 63 shown in FIG. 1 is an FIFO (First In First Out) memory which is a ring buffer comprised of FF circuits, as shown in FIG. 37. If the capacity of this FIFO memory is set to approximately 10 times the VOBU (Video Object) recorded on the optical disk 10, data for several seconds to ten seconds can be retained. The FIFO memory stores data, supplied from the system processor section 54, in accordance with input data that is simultaneously supplied, and outputs the stored data in response to the output clock supplied from the buffer control/STC control section 57.

The video decoder section 58 shown in FIG. 1 comprises an STC timer 58a, registers 58b and 58c, comparators 58d and 58e, and a decoder 58f, as shown in FIG. 38. The SCR set by the buffer control/STC control section 57 is stored in the STC timer 58a and the time therein is updated by a clock. The register 58b retains the DTS for video data which is set by the buffer control/STC control section 57. The register 58c retains the PTS for video data which is set by the buffer control/STC control section 57. The comparator 58d compares the STC in the STC timer 58a with the DTS in the register 58b to check if they match with each other. The comparator 58e compares the STC in the STC timer 58a with the PTS in the register 58c to check if they match with each other. The decoder 58f decodes the video data input from the video buffer section 59 in accordance with the output of the comparator 58d and outputs the decoding result to the mixing section 64 in accordance with the output of the comparator 58d.

The audio decoder section 60 shown in FIG. 1 comprises an STC timer 60a, a register 60b, a comparator 60c, and a decoder 60d, as shown in FIG. 39. The SCR set by the buffer control/STC control section 57 is stored in the STC timer 60a and the time therein is updated by a clock. The register 60a retains the PTS for audio data which is set by the buffer control/STC control section 57. The comparator 60c compares the STC in the STC timer 60a with the PTS in the register 60b to check if they match with each other. The decoder 60d decodes the audio data input from the audio buffer section 61 in accordance with the output of the comparator 58d when a match is made, and outputs the decoding result to the audio D/A section 68.

Figure 40:
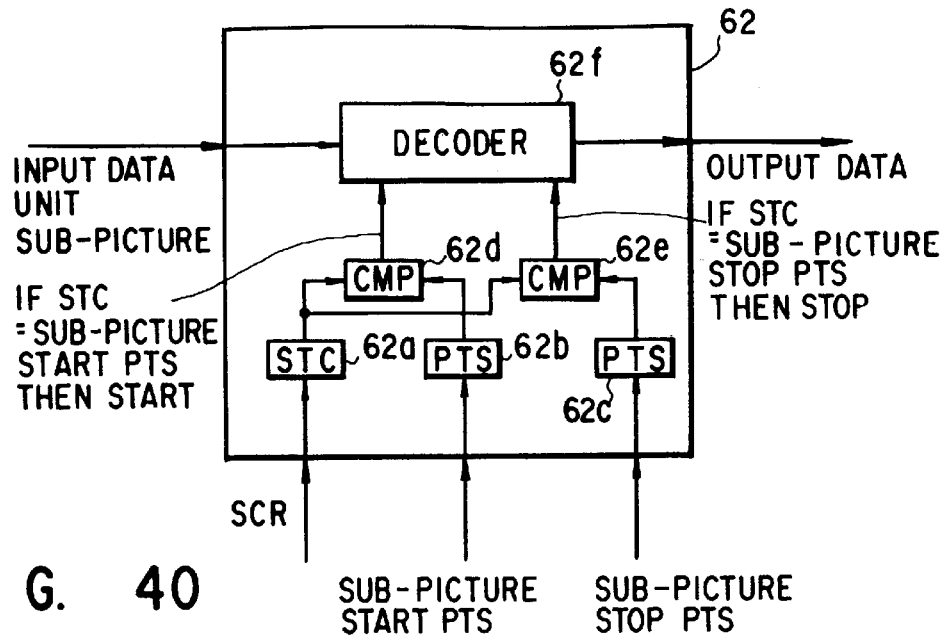
FIG. 40 illustrates the structure of the sub-picture decoder section shown in FIG. 1.

The sub-picture decoder section 62 shown in FIG. 1 comprises an STC timer 58a, registers 62b and 62c, comparators 62d and 62e, and a decoder 62f, as shown in FIG. 40. The SCR set by the buffer control/STC control section 57 is stored in the STC timer 62a and the time therein is updated by a clock. The register 62b retains the start PTS for sub-picture data which is set by the buffer control/STC control section 57. The register 62c retains the stop PTS for sub-picture data which is set by the buffer control/STC control section 57. The comparator 62d compares the STC in the STC timer 62a with the start PTS in the register 62b to check if they match with each other. The comparator 62e compares the STC in the STC timer 62a with the stop PTS in the register 62c to check if they match with each other. The decoder 62f starts decoding the sub-picture data input from the sub-picture buffer section 63 in accordance with the output of the comparator 62d when there is a match, and outputs the decoding result to the mixing section 64 in accordance with the output of the comparator 62d when there is a match.

Referring again to FIG. 1, a description will now be given of the operation of reproducing movie data on English conversations for learning English, from the optical disk 10 which has the logical format shown in FIGS. 4 to 31.

When the optical disk apparatus shown in FIG. 1 is powered on and the optical disk 10 where movie data for English conversations for learning English is recorded is loaded, the system CPU section 50 reads the initialization program from the system ROM and RAM section 52, and activates the disk drive section 30. Therefore, the disk drive section 30 starts reading the lead-in area 27 and reads the volume and file structure area 70, which follows the lead-in area 27 and defines the volume and file structure in conform to ISO-9660 or the like. More specifically, to read the volume and file structure area 70 recorded at a predetermined position on the disk 10 set in the disk drive section 30, the system CPU section 50 sends a read command to the disk drive section 30 to read the contents of the volume and file structure area 70 and temporarily stores the contents in the data RAM section 56 via the system processor section 54. The system CPU section 50 extracts information on the recorded position, recording capacity, size or the like of each file and other necessary management information via the pass table and directory record stored in the data RAM section 56, transfers the extracted information at predetermined positions in the system ROM and RAM section 52 and saves the information there.

Next, the system CPU section 50 refers to information on the recorded position and recording capacity of each file from the system ROM and RAM section 52 to acquire a video manager 71, which consists of a plurality of files starting with a file number 0. That is, referring to the information on the recorded position and recording capacity of each file acquired from the system ROM and RAM section 52, the system CPU section 50 sends a read command to the disk drive section 30 to obtain the positions and sizes of a plurality of files which constitute the video manager 71 existing on the root directory, reads this video manager 71 and stores the acquired information into the data RAM section 56 via the system processor section 54. A volume manager information management table (VMGI_MAT) 78, which is the first table in this video manager 71, is searched. Through this search, the start address (VMGM_VOBS_SA) of a video object set (VMGM_VOBS) 76 for a video manager menu (VMGM) is acquired and the video object set (VMGM_VOBS) 76 is reproduced. As the procedures for reproducing this video object set (VMGM_VOBS) 76 for the video manager menu are the same as those for the video object set (VTSM_VOBS) for a title in the video title set (VTS), their description will not be repeated. When a language is set in the video object set (VMGM_VOBS) 76 or when there is no video manager menu (VMGM), the volume manager information management table (VMGI_MAT) 78 is searched to acquire the start address (TT_SRPT_SA) of a title search pointer table (TT_SRPT) 79.

Through this search, the title search pointer table (TT_SRPT) 79 is transferred to a predetermined position in the system ROM and RAM section 52 to be saved there. Next, the system CPU section 50 acquires the end address of the title search pointer table (TT_SRPT) 79 from title search pointer table information (TSPTI) 92 and acquires the video title set number (VTSN), program chain number (PGCN) and the start address (VTS_SA) of the video title set, which are associated with a number entered from the key/display section 4, from a title search pointer (TT_SRP) 93 according to that input number. When there is only one title set, one title search pointer (TT_SRP) 93 is searched to acquire the start address (VTS_SA) of that title set, irrespective of whether or not there is an input number from the key/display section 4. The system CPU section 50 acquires the target title set from the start address (VTS_SA) of this title set.

The system CPU section 50 acquires the number of streams of the video, audio and sub-picture data for the volume menu and their attribute information, described in the volume manager information management table (VMGI_MAT) 78 in a volume manager (VMGI) 75, and sets parameters for reproducing the video manager menu in the associated video decoder section 58, audio decoder section 60 and sub-picture decoder section 62 based on the attribute information.

Next, as shown in FIG. 12, video title set information (VTSI) 94 of the title set is acquired from the start address (VTS_SA) of a video title set 72. From a video title set information management table (VTSI_MAT) 98 in this video title set information (VTSI) 94, the end address (VTI_MAT_EA) of the video title set information management table (VTSI_MAT) 98 shown in FIG. 13 is acquired. Based on the number of streams (VTS_AST_Ns, VTS_SPST_Ns) of audio data and sub-picture data and the attribute information (VTS_V_ATR, VTS_A_ATR, VTS_SPST_ATR) of the video, audio and sub-picture data, the individual sections of the reproducing apparatus shown in FIG. 1 are set according to their attributes.

Cell playback information (C_PBI) shown in FIG. 21 is acquired from a start address (C_POSIT_SA), and the start address (C_FVOBU_SA) of the first VOBU 85 and the start address (C_LVOBU_SA) of the last VOBU in the cell shown in FIG. 22, which are described in the playback information (C_PBI), are acquired to search for the target cell. The cell playback order is determined in such a way that playback cells 84 are determined one by one by referring to the program map shown in FIG. 19 in a PGC program map (PGC_PGMAP) 106 shown in FIG. 17. The data cells 84 of the program chain, determined in this manner, are sequentially read from a video object 144 and are input to the data RAM section 56 via the system processor section 54. The system processor section 54 sends each data cell 84 via the individual buffer sections 59, 61 and 63 to the video decoder section 58, audio decoder section 60 and sub-picture decoder section 62 to be decoded based on the DTS as decode time information and the PTS as playback time information. The video data and sub-picture data are mixed in the mixing section 64, after which the resultant data is converted to a video signal by the video D/A section 66 to reproduce an image on the monitor section 6. The audio data is converted to an audio signal by the audio D/A section 68 which is sent to the speaker section 8 for sound reproduction.

At this time, the superimposition as sub-picture data is mixed with main picture data to be displayed when a predetermined time elapses after the display of the main picture data.

The reproduction of video data will be described more specifically, with reference to the flowchart illustrated in FIG. 41.

Figure 41:
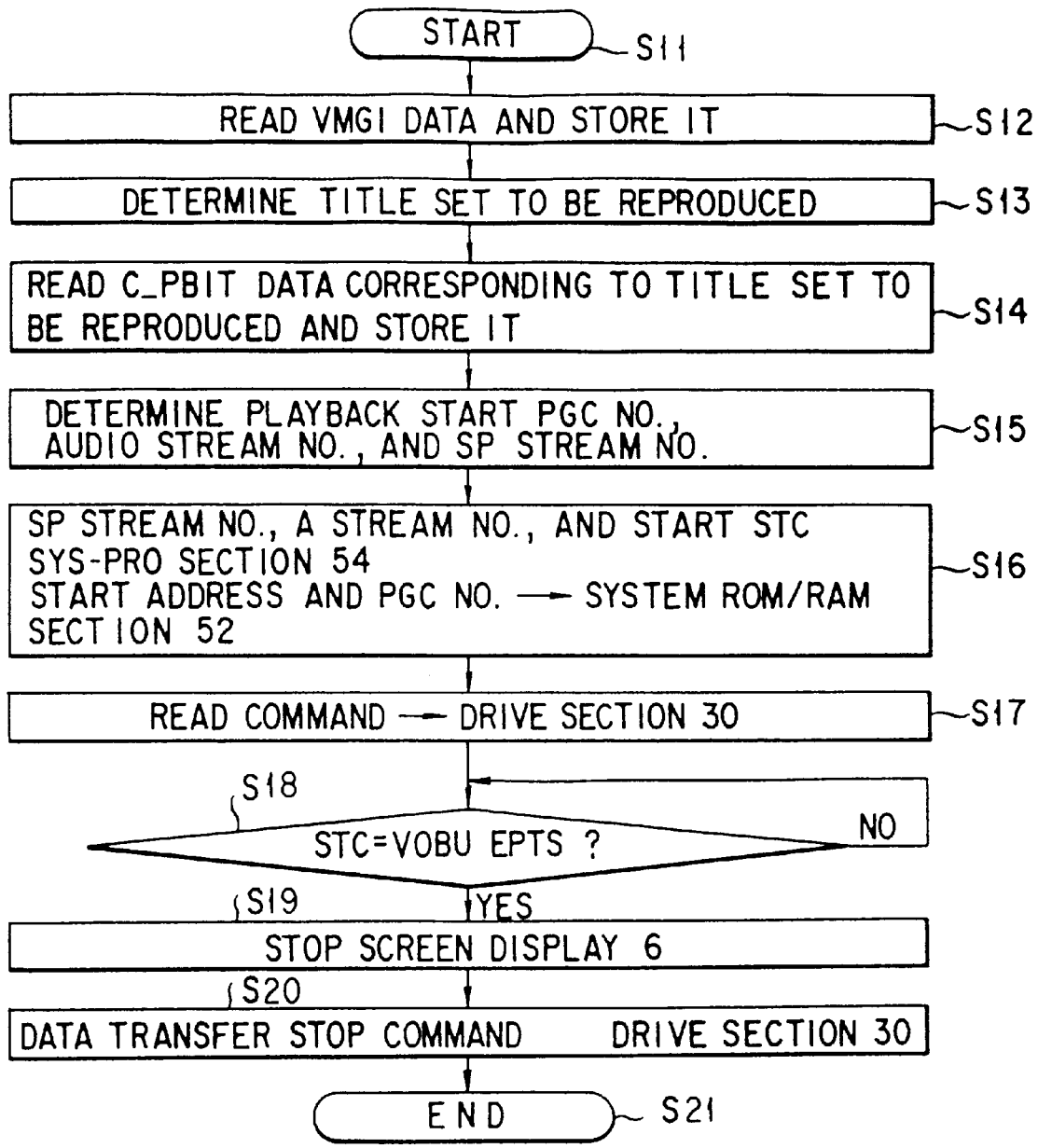
FIG. 41 is a flowchart illustrating the procedures of reproducing video data, audio data and sub-picture data.
Figure 45:
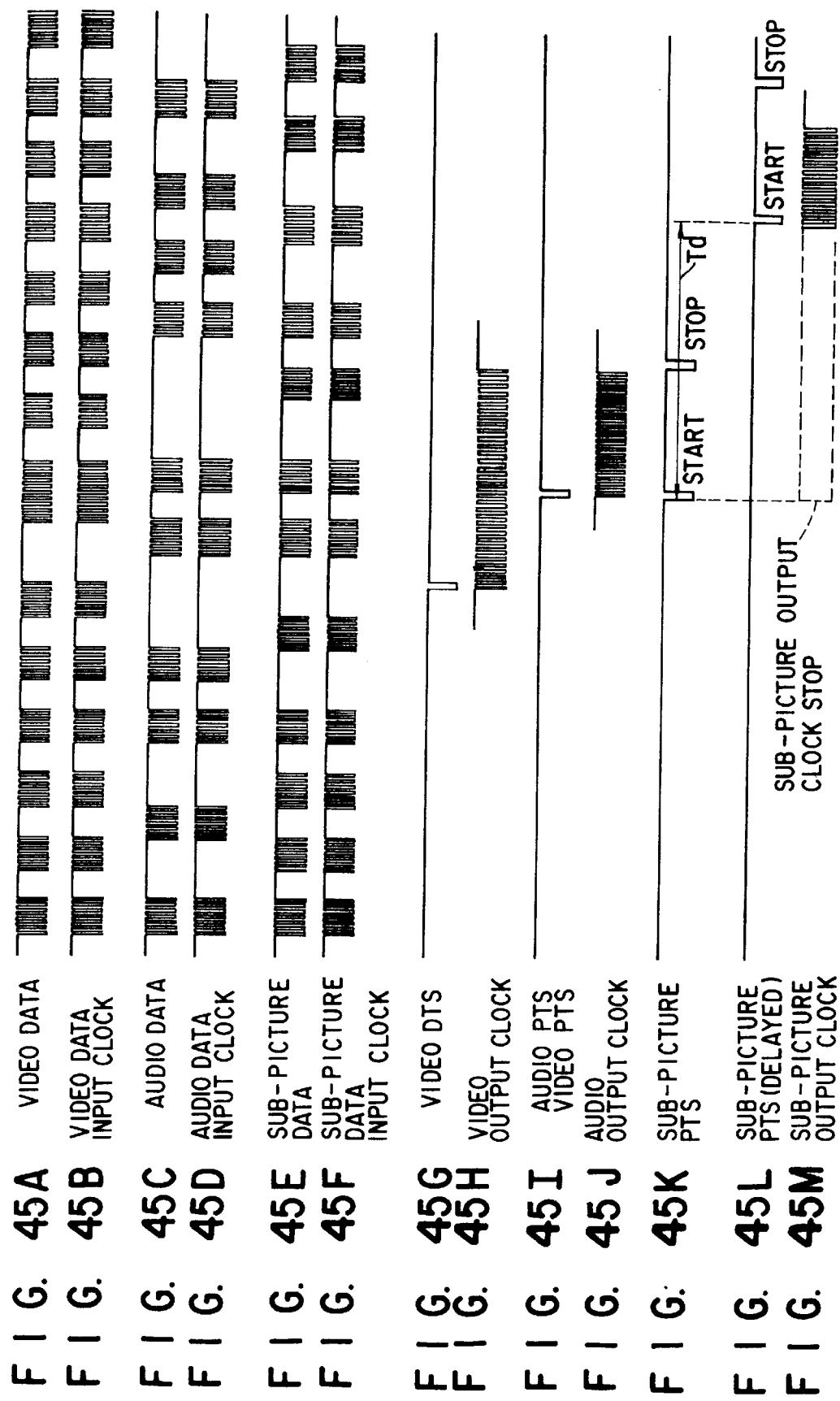
FIGS. 45A through 45M present a timing chart for explaining the relationship among an input clock, output clock, PTS and DTS for use in the reproduction of video data, audio data and sub-picture data according to this second embodiment.

In the reproduction of video data, when playback starts at step S11 as shown in FIG. 41, the system CPU section 50 searches the volume manager (VMGI) 75 and stores it in the system ROM and RAM section 52 in step S12 as has already been discussed above. Likewise, the video title set information (VTSI) 94 of the video title set (VTS) 72 is read based on this volume manager (VMGI) 75, and the video title set menu is displayed on the monitor section 6 using its video object set (VTSM_VOBS) 95. Based on this display, the title set 72 to be reproduced and the playback conditions or the like are determined by a user as indicated in step S13. When the determined title set 72 is selected using the key/display section 4, the system CPU section 50 reads data of a cell playback information table (C_PBIT) 107, shown in FIGS. 17, 21 and 22, from a program chain information (VTS_PGCIT) 100 shown in FIG. 12 in the selected title set 72 and stores the data in the system ROM and RAM section 52 as indicated in step S14.

In accordance with the playback conditions entered from the key/display section 4, the system CPU section 50 determines the program chain number (VTS_PGC_Ns) for starting playback, the audio stream number and sub-picture stream number, as indicated in step S15. For example, lessen 1 of the English conversation for learning English is selected as a title, and displaying superimposition as a sub-picture is determined. The determined sub-picture number and audio stream number are set in the register (not shown) in the system processor section 54 as indicated in step S16. Likewise, the playback start time is set in the system clock (STC) timers 54a, 57a, 58a, 60a and 62a in the system processor section 54, buffer control/STC control section 57, video decoder section 58 and audio decoder section 60 and sub-picture decoder section 62. Further, the start address of the first VOBU in a cell as the start address and the PGC number or cell number are stored in the system ROM and RAM section 52.

As indicated in step S17, the system CPU section 50 sends a read command to the disk drive section 30 when it is ready to read the video title set, and the disk drive section 30 seeks the optical disk 10 based on the aforementioned start address. In response to the read command, cells associated with the specified program chain (PGC) are sequentially read from the optical disk 10, and are sent to the data RAM section 56 via the system CPU section 50 and system processor section 54. The transferred cell data is stored in the data RAM section 56 pack by pack, starting from navigation pack 86 as the head pack of the video object unit (VOBU) 85 as shown in FIG. 6. Thereafter, the system processor section 54 and buffer control/STC control section 57 distribute the video data of the video pack 88 of the video object unit (VOBU) to the video decoder section 58 via the video buffer section 59, distribute the audio data of the audio pack 91 to the audio decoder section 60 via the audio buffer section 61, and distribute the sub-picture data of the sub-picture pack 90 to the sub-picture decoder section 62 via the sub-picture buffer section 63. The video data decoded by the video decoder section 58 and the sub-picture data decoded by the sub-picture decoder section 62 are mixed by the mixing section 64, and the mixed data is sent to the video D/A section 66. The audio data decoded by the audio decoder section 60 is sent to the audio D/A section 68. Consequently, a video signal is sent to the monitor section 6 and an audio signal is sent to the speaker section 8, so that the video display and audio playback will start. After a predetermined period of time, the sub-picture is superimposed on the display.

When the playback is complete in step S18, or when the end PTS (VOBU_EPTS) described in general information (PCI_GI) of the PCI 113 is referred to and this end PTS (VOBU_EPTS) matches with the system time clock (STC) as indicated in step S18, the screen display on the monitor section 6 is stopped as indicated in step S19. Then, the system CPU section 50 sends a data transfer stop command to the disk drive section 30 to stop data transfer, terminating the playback operation as indicated in step S20.

This playback process will be described more specifically with reference to the timing chart shown in FIGS. 36A through 36H and the flowchart illustrated in FIG. 42.

As indicated in step S31, the system processor section 54 sequentially reads the pack data, which is to be reproduced in the same time slot as the playback time set in the STC timer 54a, from the data RAM section 56 by referring to the SCR given to the pack header, determines the packet type described in the packet header in that pack, and sends the packet data determined as the main picture to the video buffer section 59 as video data, the packet data determined as the audio data to the audio buffer section 61 as audio data, and the packet data determined as the sub-picture to the sub-picture buffer section 63 as sub-picture data in accordance with the determined packet type.

As depicted in step S32, the system processor section 54 sends the time set in the STC timer 54a (SCR as the playback time), the DTS and PTS, described in the packet header of the head pack of the video data, the PTS, described in the packet header of the head pack of the audio data, and the start PTS and stop PTS, which are specified by the display control command (DCSQ) and are included in the PTS, described in the packet header of the head pack of the sub-picture data, to the buffer control/STC control section 57.

The buffer control/STC control section 57 sets the supplied SCR as the playback time in the STC timer 58a of the video decoder section 58, the STC timer 60a of the audio decoder section 60 and STC timer 62a of the sub-picture decoder section 62 as specified in step S33.

Further, the buffer control/STC control section 57 outputs the input clock to the video buffer section 59 when packet data of the video data is sent to the video buffer section 59 from the system processor section 54, outputs the input clock to the audio buffer section 61 when the packet data of the audio data is sent to the audio buffer section 61 from the system processor section 54, and outputs the input clock to the sub-picture buffer section 63 when the packet data of the sub-picture data is sent to the sub-picture buffer section 63 from the system processor section 54.

As a result, the video buffer section 59, audio buffer section 61 and sub-picture buffer section 63 store the supplied data in response to the input clock as described in step S34.

When the STC in the STC timer 57a matches with the DTS of the video data, the buffer control/STC control section 57 outputs one unit of output clocks to the video buffer section 59. When the STC in the STC timer 58a in the video decoder section 58 matches with the DTS in the register 58b, the decoder 58f starts decoding based on the output of the comparator 58d.

Consequently, the video data output from the video buffer section 59 in accordance with the output clock is decoded by the decoder 58f as indicated in step S35.

As is apparent from step S36, when the STC in the STC timer 58a in the video decoder section 58 matches with the PTS in the register 58c, the decoded output of the decoder 58f is sent to the video D/A section 66 via the mixing section 64 based on the output from the comparator 58e.

When the STC in the STC timer 57a matches with the PTS in the audio data, the buffer control/STC control section 57 outputs one unit of output clocks to the audio buffer section 61. When the STC in the STC timer 60a in the audio decoder section 60 matches with the PTS in the register 60b, the decoder 60d also starts decoding based on the output of the comparator 60c.

Consequently, as depicted in step S37, the audio data output from the audio buffer section 61 in accordance with the output clock is decoded by the decoder 60d and the decoded output is then sent to the audio D/A section 68.

After a predetermined time has passed, i.e., when the STC in the STC timer 57a matches with the start PTS of the sub-picture data, the buffer control/STC control section 57 outputs one unit of output clocks to the sub-picture buffer section 63. When the STC in the STC timer 62a in the sub-picture decoder section 62 matches with the start PTS in the register 62b, the decoder 62f starts decoding based on the output of the comparator 62d.

Consequently, as specified in step S38, the sub-picture data output from the sub-picture buffer section 63 in accordance with the output clock is decoded by the decoder 62f and the decoded output is then mixed with the video data in the mixing section 64. The resultant data is then sent to the video D/A section 66.

When the STC in the STC timer 62a in the sub-picture decoder section 62 matches with the stop PTS in the register 62c, the decoder 62f stops decoding based on the output of the comparator 62e.

Accordingly, as indicated in step S39, the decoder 62f in the sub-picture decoder section 62 stops outputting the decoded data.

Consequently, the image corresponding to the video data is displayed on the monitor section 6 and the voice corresponding to the audio data is reproduced from the speaker section 8. After a predetermined time delay, the mixed image corresponding to the sub-picture data and video data is displayed on the monitor section 6. Thereafter, the sub-picture data will disappear.

Figures 43A, 43B:
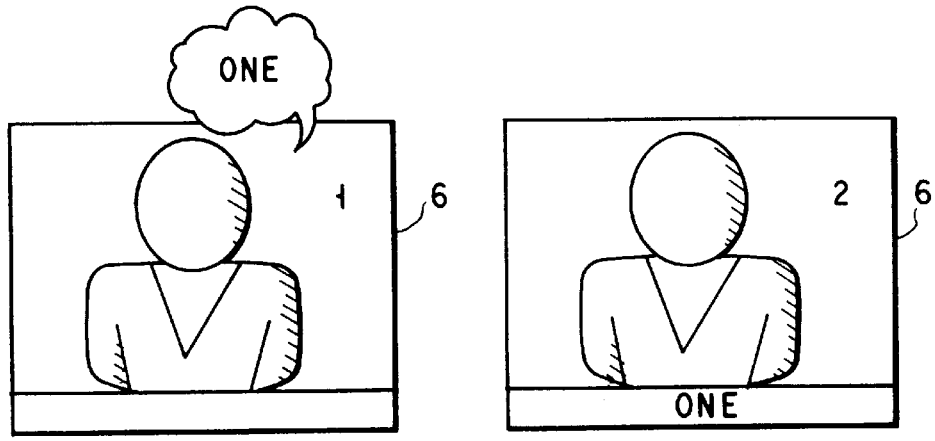
FIGS. 43A through 43C show the output states of video data, audio data and sub-picture data in the reproduction process illustrated in FIG. 41.
Figure 43C:
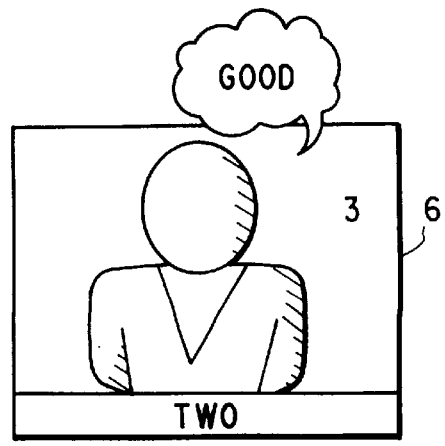

At the first timing, therefore, the image of a teacher pronouncing "ONE" is displayed as the main picture on the monitor section 6 and the teacher's voice "ONE" is reproduced from the speaker section 8, as shown in FIG. 43A. At the next timing, as shown in FIG. 43B, the image of the teacher saying "ONE" is displayed as the main picture on the monitor section 6 and the superimposition "ONE" as the sub-picture is superimposed on the main picture. At this timing, an apprentice as a listener should pronounce the word. At the next timing, as shown in FIG. 43C, the image of the teacher saying "GOOD" is displayed as the main picture on the monitor section 6 and the teacher's voice "GOOD" is reproduced from the speaker section 8.

As a result, the sub-picture which is to be displayed at the same time as the reproduction of the normal voice is delayed or the sub-picture is displayed with a some delay. In learning a language, for example, a listener can listen first without any hint and then confirm it later.

The second embodiment of this invention will now be described, centering on the modified parts which differ from the first embodiment, with reference to FIGS. 43A to 43C and FIGS. 44 to 46.

According to the second embodiment, the delay time Td for delaying sub-picture data is preset in the reproducing apparatus.

In this embodiment, the start PTS described in the sub-picture unit as sub-picture data on the optical disk 10 is the same as the PTS's of video data and audio data which are to be processed in the same time slot.

FIG. 44 presents a block diagram of an optical disk reproducing apparatus for explaining the second embodiment.

The delay time Td for delaying sub-picture data is previously stored in the system ROM and RAM section 52 or the internal memory (not shown) of the system CPU section 50. Accordingly, the delay time Td read from the system ROM and RAM section 52 by the system CPU section 50 is supplied to the buffer control/STC control section 57.

FIGS. 45A through 45M show a timing chart for explaining the relationship among an input clock, output clock, PTS and DTS for use in the reproduction of video data, audio data and sub-picture data. FIGS. 45A–45J are identical to FIGS. 36A through 36J.

The buffer control/STC control section 57 sends the start PTS and stop PTS with respect to the sub-picture data, supplied from the system processor section 54, to the sub-picture decoder section 62 with the delay time Td, and also delays one unit of output clocks to be sent to the sub-picture buffer section 63 by the delay time Td.

The start PTS and stop PTS for the sub-picture data supplied from the system processor section 54 are shown in FIG. 45K, the start PTS and stop PTS for the sub-picture data, which are to be delayed by the delay time Td, are shown in FIG. 45L and one unit of output clocks for the sub-picture data, which are to be delayed by the delay time Td, are shown in FIG. 45M.

The playback operation of this structure will now be discussed referring to the timing chart shown in FIGS. 45A–45M and the flowchart illustrated in FIG. 46.

As indicated in step S41, the system processor section 54 sequentially reads the pack data, which is to be reproduced in the same time slot as the playback time set in the STC timer 54a, from the data RAM section 56 by referring to the SCR given to the pack header, determines the packet type described in the packet header in that pack, and sends the packet data determined as the main picture to the video buffer section 59 as video data, the packet data determined as the audio data to the audio buffer section 61 as audio data, and the packet data determined as the sub-picture to the sub-picture buffer section 63 as sub-picture data in accordance with the determined packet type.

As depicted in step S42, the system processor section 54 sends the time set in the STC timer 54a (SCR as the playback time), the DTS and PTS, described in the packet header of the head pack of the video data, the PTS, described in the packet header of the head pack of the audio data, and the start PTS and stop PTS, which are specified by the display control command (DCSQ) and are included in the PTS, described in the packet header of the head pack of the sub-picture data, to the buffer control/STC control section 57. The system CPU section 50 supplies the delay time Td for the sub-picture data, read from the system ROM and RAM section 52, to this buffer control/STC control section 57.

The buffer control/STC control section 57 sets the supplied SCR as the playback time in the STC timer 58a of the video decoder section 58, the STC timer 60a of the audio decoder section 60 and STC timer 62a of the sub-picture decoder section 62 as specified in step S43.

Further, the buffer control/STC control section 57 outputs the input clock to the video buffer section 59 when packet data of the video data is sent to the video buffer section 59 from the system processor section 54, outputs the input clock to the audio buffer section 61 when the packet data of the audio data is sent to the audio buffer section 61 from the system processor section 54, and outputs the input clock to the sub-picture buffer section 63 when the packet data of the sub-picture data is sent to the sub-picture buffer section 63 from the system processor section 54.

As a result, the video buffer section 59, audio buffer section 61 and sub-picture buffer section 63 store the supplied data in response to the input clock as indicated in step S44.

When the STC in the STC timer 57a matches with the DTS of the video data, the buffer control/STC control section 57 outputs one unit of output clocks to the video buffer section 59. When the STC in the STC timer 58a in the video decoder section 58 matches with the DTS in the register 58b, the decoder 58f starts decoding based on the output of the comparator 58d.

Consequently, the video data output from the video buffer section 59 in accordance with the output clock is decoded by the decoder 58f as described in step S45.

As is apparent from step S46, when the STC in the STC timer 58a in the video decoder section 58 matches with the PTS in the register 58c, the decoded output of the decoder 58f is sent to the video D/A section 66 via the mixing section 64 based on the output from the comparator 58e.

When the STC in the STC timer 57a matches with the PTS in the audio data, the buffer control/STC control section 57 outputs one unit of output clocks to the audio buffer section 61. When the STC in the STC timer 60a in the audio decoder section 60 matches with the PTS in the register 60b, the decoder 60d also starts decoding based on the output of the comparator 60c.

Consequently, as depicted in step S47, the audio data output from the audio buffer section 61 in accordance with the output clock is decoded by the decoder 60d and the decoded output is then sent to the audio D/A section 68.

After a predetermined time has passed, i.e., when the delay time Td elapses after the matching of the STC in the STC timer 57a with the start PTS of the sub-picture data, the buffer control/STC control section 57 outputs one unit of output clocks to the sub-picture buffer section 63. When the STC in the STC timer 62a in the sub-picture decoder section 62 matches with the start PTS delayed by the delay time Td in the register 62b, the decoder 62f starts decoding based on the output of the comparator 62d.

Consequently, as indicated in step S48, the sub-picture data output from the sub-picture buffer section 63 in accordance with the output clock is decoded by the decoder 62f and the decoded output is then mixed with the video data in the mixing section 64. The resultant data is then sent to the video D/A section 66.

When the STC in the STC timer 62a in the sub-picture decoder section 62 matches with the stop PTS delayed by the delay time Td in the register 62c, the decoder 62f stops decoding based on the output of the comparator 62e.

Accordingly, as specified in step S49, the decoder 62f in the sub-picture decoder section 62 stops outputting the decoded data.

Consequently, the image corresponding to the video data is displayed on the monitor section 6 and the voice corresponding to the audio data is reproduced from the speaker section 8. After a predetermined time delay, the mixed image corresponding to the sub-picture data and video data is displayed on the monitor section 6. Thereafter, the sub-picture data will disappear.

At the first timing, therefore, the image of a teacher saying "ONE" is displayed as the main picture on the monitor section 6 and the teacher's voice "ONE" is reproduced from the speaker section 8, as shown in FIG. 43A. At the next timing, as shown in FIG. 43B, the image of the teacher pronouncing "ONE" is displayed as the main picture on the monitor section 6 and the superimposition "ONE" as the sub-picture is superimposed on the main picture. At this timing, an apprentice as a listener should pronounce the word. At the next timing, as shown in FIG. 43C, the image of the teacher saying "GOOD" is displayed as the main picture on the monitor section 6 and the teacher's voice "GOOD" is reproduced from the speaker section 8.

The third embodiment of this invention will now be discussed with reference to FIGS. 43A through 43C, FIG. 44, FIGS. 45A through 45M, and FIGS. 47A, 47B and 48. The delay time at which the sub-picture data is reproduced with respect to the main picture data is preset in the reproducing apparatus in the second embodiment, whereas a user can freely set the delay time using the key/display section 4 and what is displayed on the monitor section 6 in the third embodiment. The key/display section 4 may be constituted of a remote controller, for example.

Figures 47A, 47B:
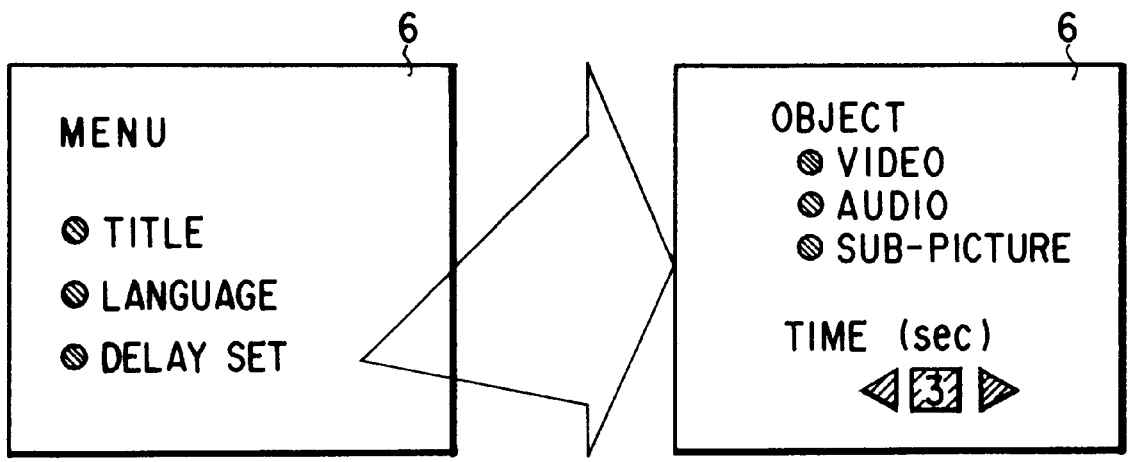
FIGS. 47A and 47B show display examples of a menu on a key/display section according to the third embodiment of this invention.

For instance, the basic menu screen for setting the delay time as shown in FIG. 47A is displayed on the monitor section 6, and a user selects "DELAY SET" for setting the delay time from among the selections "TITLE," "LANGUAGE" and "DELAY SET" on the basic menu screen using the key/display section 4. Then, the delay time setting screen as shown in FIG. 47B is displayed on the monitor section 6. Using the key/display section 4, the user selects, for example, "SUB-PICTURE" from "VIDEO," "AUDIO" and "SUB-PICTURE" on the delay time setting screen, as the type for which the delay time is to be set, and then sets the delay time (seconds) through the time setting section on that screen.

Figure 48:
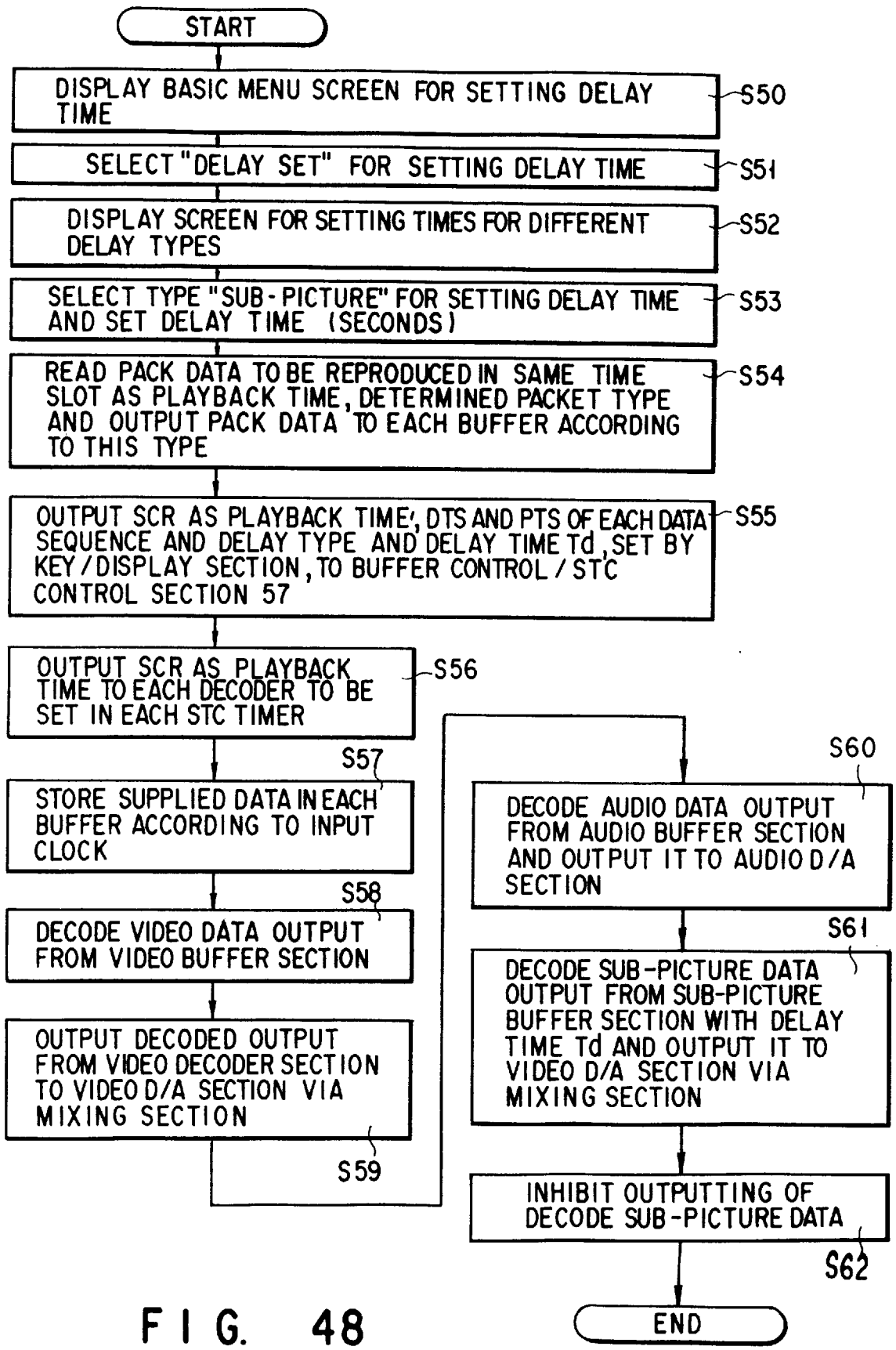
FIG. 48 is a flowchart illustrating the procedures of reproducing video data, audio data and sub-picture data according to the third embodiment.

The playback operation of this structure will now be discussed referring to the timing chart shown in FIGS. 45A–45M and the flowchart illustrated in FIG. 48.

First, the basic menu screen for setting the delay time as shown in FIG. 47A is displayed on the monitor section 6 as indicated in step S50. The user then selects "DELAY SET" for setting the delay time from among "TITLE," "LANGUAGE" and "DELAY SET" on the basic menu screen using the key/display section 4 as indicated in step S51.

Consequently, the time setting screen for each type to be delayed (hereinafter referred to as "type-by-type delay time setting screen") as shown in FIG. 47B is displayed on the monitor section 6 as indicated in step S52. Then, using the key/display section 4, the user selects, for example, "SUB-PICTURE" from among "VIDEO," "AUDIO" and "SUB-PICTURE" on the type-by-type delay time setting screen, as the type for which the delay time is to be set, and then sets the delay time (seconds) through the time setting section on that screen as depicted in step S53.

Then, as indicated in step S54, the system processor section 54 sequentially reads the pack data, which is to be reproduced in the same time slot as the playback time set in the STC timer 54a, from the data RAM section 56 by referring to the SCR given to the pack header, determines the packet type described in the packet header in that pack, and sends the packet data determined as the main picture to the video buffer section 59 as video data, the packet data determined as the audio data to the audio buffer section 61 as audio data, and the packet data determined as the sub-picture to the sub-picture buffer section 63 as sub-picture data in accordance with the determined packet type.

As depicted in step S55, the system processor section 54 sends the time set in the STC timer 54a (SCR as the playback time), the DTS and PTS, described in the packet header of the head pack of the video data, the PTS, described in the packet header of the head pack of the audio data, and the start PTS and stop PTS, which are specified by the display control command (DCSQ) and are included in the PTS, described in the packet header of the head pack of the sub-picture data, to the buffer control/STC control section 57. The system CPU section 50 supplies the type targeted for the delay, set by the key/display section 4, the delay time Td for the sub-picture data, read from the system ROM and RAM section 52, to this buffer control/STC control section 57.

The buffer control/STC control section 57 sets the supplied SCR as the playback time in the STC timer 58a of the video decoder section 58, the STC timer 60a of the audio decoder section 60 and STC timer 62a of the sub-picture decoder section 62 as specified in step S56.

Further, the buffer control/STC control section 57 outputs the input clock to the video buffer section 59 when packet data of the video data is sent to the video buffer section 59 from the system processor section 54, outputs the input clock to the audio buffer section 61 when the packet data of the audio data is sent to the audio buffer section 61 from the system processor section 54, and outputs the input clock to the sub-picture buffer section 63 when the packet data of the sub-picture data is sent to the sub-picture buffer section 63 from the system processor section 54.

As a result, the video buffer section 59, audio buffer section 61 and sub-picture buffer section 63 store the supplied data in response to the input clock as indicated in step S57.

When the STC in the STC timer 57a matches with the DTS of the video data, the buffer control/STC control section 57 outputs one unit of output clocks to the video buffer section 59. When the STC in the STC timer 58a in the video decoder section 58 matches with the DTS in the register 58b, the decoder 58f starts decoding based on the output of the comparator 58d.

Consequently, the video data output from the video buffer section 59 in accordance with the output clock is decoded by the decoder 58f as described in step S58.

As is apparent from step S59, when the STC in the STC timer 58a in the video decoder section 58 matches with the PTS in the register 58c, the decoded output of the decoder 58f is sent to the video D/A section 66 via the mixing section 64 based on the output from the comparator 58e.

When the STC in the STC timer 57a matches with the PTS in the audio data, the buffer control/STC control section 57 outputs one unit of output clocks to the audio buffer section 61. When the STC in the STC timer 60a in the audio decoder section 60 matches with the PTS in the register 60b, the decoder 60d also starts decoding based on the output of the comparator 60c.

Consequently, as depicted in step S60, the audio data output from the audio buffer section 61 in accordance with the output clock is decoded by the decoder 60d and the decoded output is then sent to the audio D/A section 68.

After a predetermined time has passed, i.e., when the delay time Td elapses after the matching of the STC in the STC timer 57a with the start PTS of the sub-picture data, the buffer control/STC control section 57 outputs one unit of output clocks to the sub-picture buffer section 63. When the STC in the STC timer 62a in the sub-picture decoder section 62 matches with the start PTS delayed by the delay time Td in the register 62b, the decoder 62f starts decoding based on the output of the comparator 62d.

Consequently, as indicated in step S61, the sub-picture data output from the sub-picture buffer section 63 in accordance with the output clock is decoded by the decoder 62f and the decoded output is then mixed with the video data in the mixing section 64. The resultant data is then sent to the video D/A section 66.

When the STC in the STC timer 62a in the sub-picture decoder section 62 matches with the stop PTS delayed by the delay time Td in the register 62c, the decoder 62f stops decoding based on the output of the comparator 62e.

Accordingly, as specified in step S62, the decoder 62f in the sub-picture decoder section 62 stops outputting the decoded data.

Consequently, the image corresponding to the video data is displayed on the monitor section 6 and the voice corresponding to the audio data is reproduced from the speaker section 8. After a predetermined time delay, the mixed image corresponding to the sub-picture data and video data is displayed on the monitor section 6. Thereafter, the sub-picture data will disappear.

At the first timing, therefore, the image of a teacher saying "ONE" is displayed as the main picture on the monitor section 6 and the teacher's voice "ONE" is reproduced from the speaker section 8, as shown in FIG. 43A. At the next timing, as shown in FIG. 43B, the image of the teacher pronouncing "ONE" is displayed as the main picture on the monitor section 6 and the superimposition "ONE" as the sub-picture is superimposed on the main picture. At this timing, an apprentice as a listener should pronounce the word. At the next timing, as shown in FIG. 43C, the image of the teacher saying "GOOD" is displayed as the main picture on the monitor section 6 and the teacher's voice "GOOD" is reproduced from the speaker section 8.

Although the foregoing description of this embodiment has been given with reference to the case where sub-picture data is delayed, this invention may also be adapted to the case where main picture data or audio data is delayed.

The fourth embodiment of this invention will now be described referring to FIG. 1, FIGS. 49A through 49N, FIG. 50 and FIGS. 51A through 51C. According to the fourth embodiment, by utilizing the fact that the display period of a sub-picture which is expressed by using the start PTS and stop PTS of a sub-picture unit corresponds to one phrase of the normal speech, the display timing of a sub-picture is delayed by one phrase and during the display of this sub-picture, the main picture and voice are stopped or frozen.

In this embodiment, the start PTS described in the sub-picture unit as sub-picture data on the optical disk 10 is the same as the PTS's of video data and audio data which are to be processed in the same time slot.

FIGS. 49A through 49M show a timing chart for explaining the relationship among an input clock, output clock, PTS and DTS for use in the reproduction of video data, audio data and sub-picture data. FIGS. 49A–49F are identical to FIGS. 36A through 36F.

The buffer control/STC control section 57 delays the start PTS and stop PTS with respect to the sub-picture data, supplied from the system processor section 54, by the delay time Td corresponding to one phrase computed from the difference between the start PTS and stop PTS, and outputs the delayed start PTS and stop PTS to the sub-picture decoder section 62, and also delays one unit of output clocks to be sent to the sub-picture buffer section 63 by the delay time Td.

The start PTS and stop PTS for the sub-picture data supplied from the system processor section 54 are shown in FIG. 49K, the start PTS and stop PTS for the sub-picture data, which are to be delayed by the delay time Td, are shown in FIG. 49L and one unit of output clocks for the sub-picture data, which are to be delayed by the delay time Td, are shown in FIG. 49M.

During the period from the start PTS for the sub-picture data output with the delay time Td to the stop PTS, the buffer control/STC control section 57 outputs a stop signal to the STC timer 58a in the video decoder section 58 and the STC timer 60a in the audio decoder section 60.

In other words, the buffer control/STC control section 57 stops the STC timers 58a and 60a in accordance with the start PTS delayed by the delay time Td, and sets the time leading by the delay time Td from the STC corresponding to the start PTS delayed by the delay time in the STC timers 58a and 60a in accordance with the stop PTS.

While a sub-picture is being displayed, freezing the video and audio data is carried out.

The playback operation of this structure will now be discussed referring to the timing chart shown in FIGS. 49A–49N and the flowchart illustrated in FIG. 50.

As indicated in step S71, the system processor section 54 sequentially reads the pack data, which is to be reproduced in the same time slot as the playback time set in the STC timer 54a, from the data RAM section 56 by referring to the SCR given to the pack header, determines the packet type described in the packet header in that pack, and sends the packet data determined as the main picture to the video buffer section 59 as video data, the packet data determined as the audio data to the audio buffer section 61 as audio data, and the packet data determined as the sub-picture to the sub-picture buffer section 63 as sub-picture data in accordance with the determined packet type.

As indicated in step S72, the system processor section 54 sends the time set in the STC timer 54a (SCR as the playback time), the DTS and PTS, described in the packet header of the head pack of the video data, the PTS, described in the packet header of the head pack of the audio data, and the start PTS and stop PTS, which are specified by the display control command (DCSQ) and are included in the PTS, described in the packet header of the head pack of the sub-picture data, to the buffer control/STC control section 57.

The buffer control/STC control section 57 sets the supplied SCR as the playback time in the STC timer 58a of the video decoder section 58, the STC timer 60a of the audio decoder section 60 and STC timer 62a of the sub-picture decoder section 62 as indicated in step S73.

The buffer control/STC control section 57 computes the delay time Td corresponding to one phrase from the difference between the start PTS and stop PTS for the sub-picture data.

Further, the buffer control/STC control section 57 outputs the input clock to the video buffer section 59 when packet data of the video data is sent to the video buffer section 59 from the system processor section 54, outputs the input clock to the audio buffer section 61 when the packet data of the audio data is sent to the audio buffer section 61 from the system processor section 54, and outputs the input clock to the sub-picture buffer section 63 when the packet data of the sub-picture data is sent to the sub-picture buffer section 63 from the system processor section 54.

As a result, the video buffer section 59, audio buffer section 61 and sub-picture buffer section 63 store the supplied data in response to the input clock as indicated in step S74.

When the STC in the STC timer 57a matches with the DTS of the video data, the buffer control/STC control section 57 outputs one unit of output clocks to the video buffer section 59. When the STC in the STC timer 58a in the video decoder section 58 matches with the DTS in the register 58b, the decoder 58f starts decoding based on the output of the comparator 58d.

Consequently, the video data output from the video buffer section 59 in accordance with the output clock is decoded by the decoder 58f as indicated in step S75.

As is apparent from step S76, when the STC in the STC timer 58a in the video decoder section 58 matches with the PTS in the register 58c, the decoded output of the decoder 58f is sent to the video D/A section 66 via the mixing section 64 based on the output from the comparator 58e.

When the STC in the STC timer 57a matches with the PTS in the audio data, the buffer control/STC control section 57 outputs one unit of output clocks to the audio buffer section 61. When the STC in the STC timer 60a in the audio decoder section 60 matches with the PTS in the register 60b, the decoder 60d also starts decoding based on the output of the comparator 60c.

Consequently, as indicated in step S77, the audio data output from the audio buffer section 61 in accordance with the output clock is decoded by the decoder 60d and the decoded output is then sent to the audio D/A section 68.

After a predetermined time has passed, i.e., when the computed delay time Td elapses after the matching of the STC in the STC timer 57a with the start PTS of the sub-picture data, the buffer control/STC control section 57 outputs one unit of output clocks to the sub-picture buffer section 63. When the STC in the STC timer 62a in the sub-picture decoder section 62 matches with the start PTS delayed by the delay time Td in the register 62b, the decoder 62f starts decoding based on the output of the comparator 62d.

Consequently, as indicated in step S78, the sub-picture data output from the sub-picture buffer section 63 in accordance with the output clock is decoded by the decoder 62f and the decoded output is then mixed with the video data in the mixing section 64. The resultant data is then sent to the video D/A section 66.

At this time, the buffer control/STC control section 57 supplies a stop signal to the STC timer 58a in the video decoder section 58 and the STC timer 60a in the audio decoder section 60. Consequently, decoding by the decoder 58f and decoding by the decoder 60d stop and the video image on the screen when the decoding operations are stopped is displayed on the monitor section 6 with no sounds generated.

When the STC in the STC timer 62a in the sub-picture decoder section 62 matches with the stop PTS delayed by the delay time Td in the register 62c, the decoder 62f stops decoding based on the output of the comparator 62e.

At this time, the buffer control/STC control section 57 sets the time leading by the delay time Td from the STC corresponding to the start PTS, delayed by the delay time Td, in the STC timer 58a in the video decoder section 58 and the STC timer 60a in the audio decoder section 60. As a result, the decoders 58f and 60d restart decoding.

Accordingly, as indicated in step S79, the decoder 62f in the sub-picture decoder section 62 stops outputting the decoded data, and the decoded output of the decoder 58f is supplied to the video D/A section 66 via the mixing section 64 while the decoded output of the decoder 60d is supplied to the audio D/A section 68.

Consequently, the image corresponding to the video data is displayed on the monitor section 6 and the voice corresponding to the audio data is reproduced from the speaker section 8. After a predetermined time delay corresponding to one phrase, the mixed image corresponding to the sub-picture data and video data is displayed on the monitor section 6. At this time, the video and audio data are frozen. Thereafter, the sub-picture data will disappear and the video and audio data are reproduced from that time.

Figure 51A:
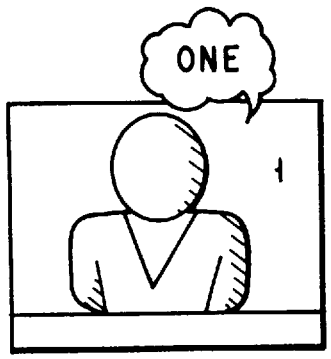
FIGS. 51A through 51C show the output states of video data, audio data and sub-picture data at the time superimposition is displayed after a phrase.
Figure 51B:
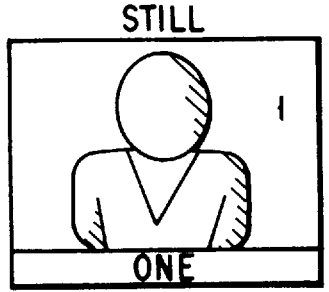
Figure 51C:
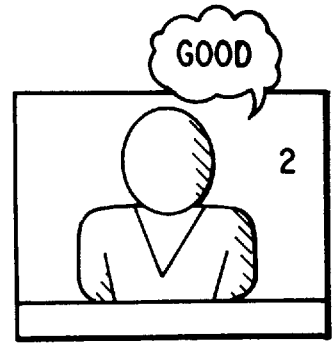

At the first timing, therefore, the image of a teacher saying "ONE" is displayed as the main picture on the monitor section 6 and the teacher's voice "ONE" is reproduced from the speaker section 8, as shown in FIG. 51A. At the next timing, as shown in FIG. 51B, the image of the teacher having said "ONE" and the superimposition "ONE" as the sub-picture are displayed in the superimposing manner on the monitor section 6. At this timing, an apprentice as a listener should pronounce the word. At the next timing, as shown in FIG. 51C, the image of the teacher saying "GOOD" is displayed as the main picture on the monitor section 6 and the teacher's voice "GOOD" is reproduced from the speaker section 8.

As a result, at the time of learning a language, a student can make a pronunciation while referring to the superimposition after the pronunciation by the teacher.

Figure 52A:
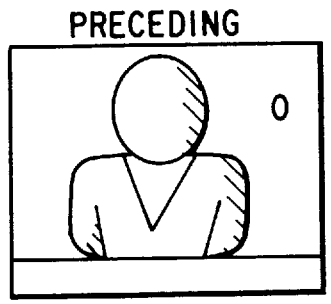
FIGS. 52A through 52C show the output states of video data, audio data and sub-picture data at the time of displaying superimposition before freezing the video and audio.
Figure 52B:
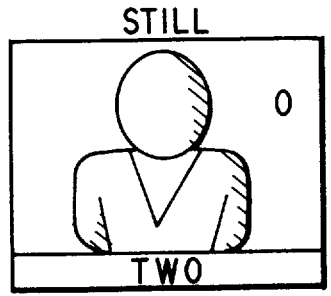
Figure 52C:
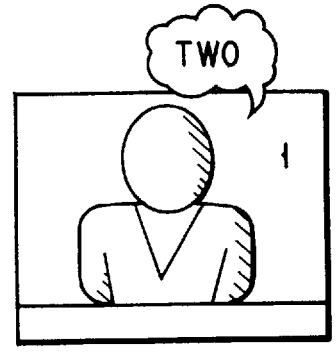

As shown in FIGS. 52A–52C, the superimposition as a sub-picture may be displayed previously, the main picture and sound may be frozen for the display period of this sub-picture, and the main picture and sound may be reproduced after the display of the sub-picture is completed.

First, at the first timing, the picture of the teacher is displayed on the monitor section 6 as the main picture as shown in FIG. 52A. At the next timing, the image of the teacher still on the screen as the main picture and the superimposition "TWO" as the sub-picture are superimposed on the monitor section 6 as shown in FIG. 52B. At this timing, an apprentice as a listener is expected to make a pronunciation. At the next timing, the image of the teacher saying "TWO" is displayed on the monitor section 6 and the teacher's voice "TWO" is reproduced from the speaker section 8, as shown in FIG. 52C.

In this case, the delay times for the main picture and sound may be set from the menu and delaying may be executed accordingly, or delaying may be done by the time specified by the start PTS and stop PTS for the sub-picture unit.

Figure 53A:
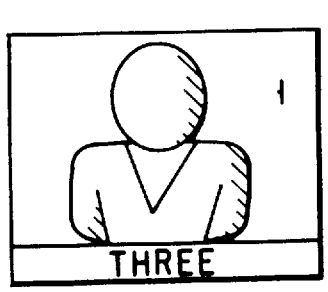
FIGS. 53A through 53C show the output states of video data, audio data and sub-picture data at the time sounds for only a phrase portion are reproduced with some delay and the video image and sub-picture are frozen.
Figure 53B:
Figure 53C:

As shown in FIGS. 53A–53C, the sound for only the phrase portion may be delayed and then reproduced, the main picture and the superimposition as the sub-picture may be frozen for the playback period of this sound, and the main picture and sound may be reproduced after the sound reproduction is completed.

First, at the first timing, the picture of the teacher as the main picture and the superimposition "THREE" as the sub-picture are superimposed on the monitor section 6 as shown in FIG. 53A. At this timing, the apprentice as a listener is expected to make a pronunciation. At the next timing, the image of the teacher pronouncing "THREE" is displayed on the monitor section 6 and the teacher's voice "THREE" is reproduced from the speaker section 8, as shown in FIG. 53B. At the next timing, as shown in FIG. 54C, the image of the teacher saying "GOOD" as the main picture is displayed on the monitor section 6 and the teacher's voice "GOOD" is reproduced from the speaker section 8.

In this case, the delay times for the main picture and sound may be set from the menu and delaying may be executed accordingly, or delaying may be done by the time specified by the start PTS and stop PTS for the sub-picture unit, as the phrase period.

As shown in FIGS. 54A–54C, when the first sound and second sound are present in addition to the main picture and sub-picture, the second sound may be reproduced with a delay, the main picture, the superimposition as the sub-picture and the first sound may be frozen for the playback period of the second sound, and the main picture, the sub-picture and the first sound may be reproduced after the reproduction of the second sound is completed.

At the first timing, the image of the teacher saying "FOUR" as the main picture and the superimposition "FOUR" as the sub-picture are superimposed on the monitor section 6, and the first voice "FOUR" by the teacher is reproduced from the speaker section 8, as shown in FIG. 54A. At the next timing, as shown in FIG. 54B, the image of the teaching having said "FOUR" as the main picture is kept displayed on the monitor section 6, and the second voice "YON" (in Japanese) by the teacher is reproduced from the speaker section 8. At this timing, an apprentice as a listener can know the translation of the English word. At the next timing, as shown in FIG. 54C, the image of the teacher saying "GOOD" as the main picture is displayed on the monitor section 6 and the teacher's first voice "GOOD" is reproduced from the speaker section 8.

As a result, the student can listen to the translation of the conversation at the delayed timing at the time of learning the language.

In this case, the delay times of the main picture, sub-picture and the first sound may be set from the menu, or delaying may be done by the time specified by the start PTS and stop PTS for the sub-picture unit.

As shown in FIGS. 55A–55C, when the first sound and second sound are present in addition to the main picture and sub-picture, the first sound and the superimposition as the sub-picture may be reproduced with a certain delay, the main picture and the second sound may be frozen for the playback period of the first sound and the sub-picture, and the main picture and the second sound may be reproduced after the reproduction of the first sound and sub-picture is completed.

At the first timing, as shown in FIG. 55A, the image of the teacher saying "GO" (in Japanese) as the main picture is displayed on the monitor section 6, and the second voice "GO" by the teacher is reproduced from the speaker section 8. At the next timing, as shown in FIG. 55B, the image of the teaching having said "GO" as the main picture and the superimposition "FIVE" as the sub-picture are superimposed on the monitor section 6, and the first voice "FIVE" by the teacher is reproduced from the speaker section 8. At this timing, an apprentice as a listener can know the translation of the English word. At the next timing, as shown in FIG. 55C, the image of the teacher saying "GOOD" as the main picture is displayed on the monitor section 6 and the teacher's first voice "GOOD" is reproduced from the speaker section 8.

As a result, the student can listen to the translation of the conversation at the delayed timing at the time of learning the language.

In this case, the delay times of the first sound and the sub-picture may be set from the menu, or delaying may be done by the time specified by the start PTS and stop PTS for the sub-picture unit.

As shown in FIGS. 56A–56C, when the first sub-picture and second sub-picture are present in addition to the main picture and sound, the second sub-picture may be reproduced with a certain delay, the main picture and sound may be frozen for the playback period of the second sub-picture, and the main picture and sound may be reproduced after the reproduction of the second sub-picture is completed.

At the first timing, as shown in FIG. 56A, the image of the teacher saying "SIX" as the main picture and the superimposition "SIX" as the first sub-picture are superimposed on the monitor section 6, and the teacher's voice "SIX" is reproduced from the speaker section 8. At the next timing, as shown in FIG. 56B, the image of the teaching having said "SIX" as the main picture and the superimposition "ROKU" (in Japanese) as the second sub-picture or translation are superimposed on the monitor section 6. At this timing, an apprentice as a listener can know the translation of the English word. At the next timing, as shown in FIG. 56C, the image of the teacher saying "GOOD" as the main picture is displayed on the monitor section 6 and the teacher's voice "GOOD" is reproduced from the speaker section 8.

As a result, the student can listen to the translation of the conversation at the delayed timing at the time of learning the language.

In this case, the delay time of the second sub-picture may be set from the menu, or delaying may be done by the time specified by the start PTS and stop PTS for the sub-picture unit of the second sub-picture.

Alternatively, the first and second sub-pictures may be displayed simultaneously, in which case separate display positions should be set for the first and second sub-pictures or the display colors should be changed for the distinction.

Instead of delaying sub-picture data, the sub-picture data may be displayed as if hidden by a mosaic or black filling for the delay time.

Figure 57:
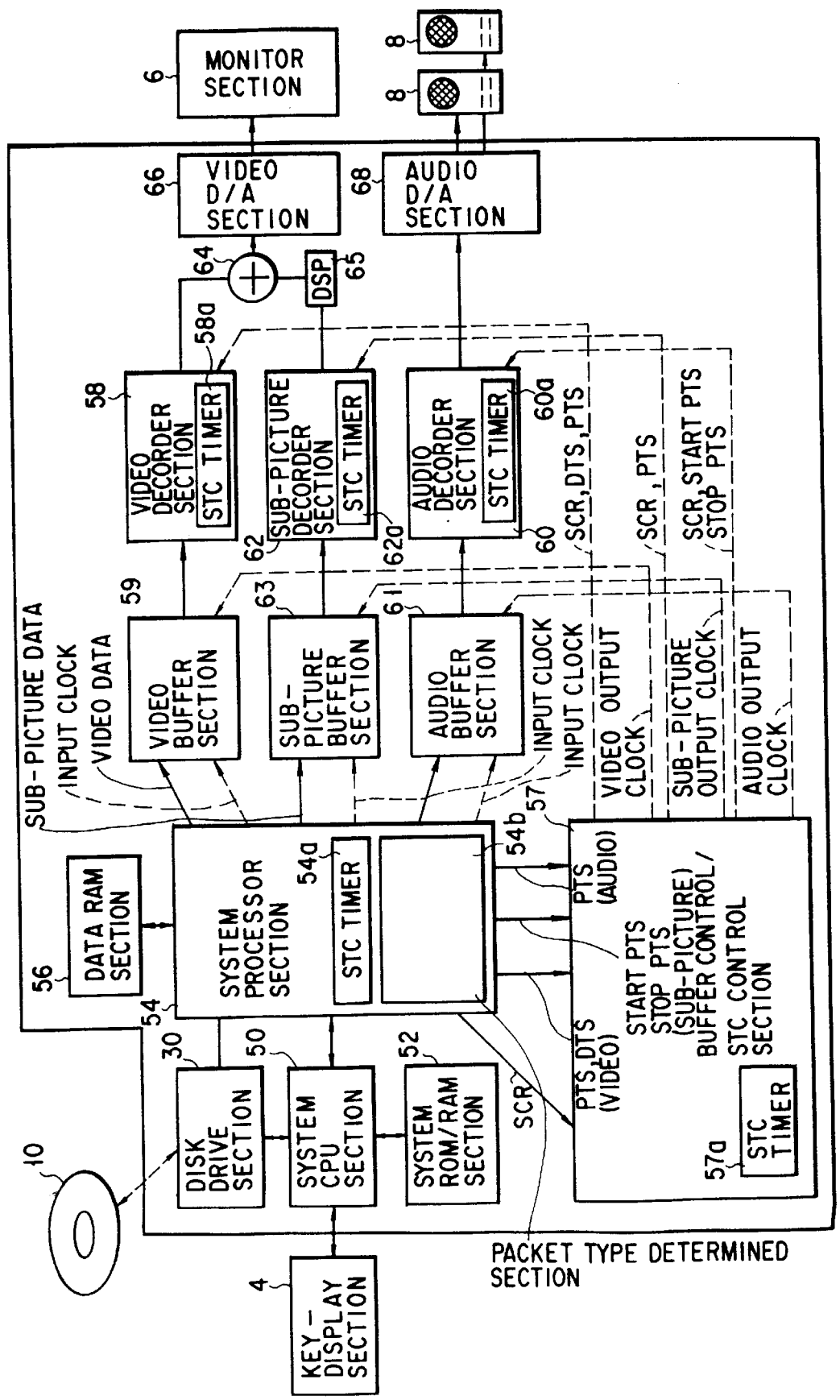
FIG. 57 is a block diagram schematically showing an optical disk apparatus according to another embodiment.

In this case, as shown in FIG. 57, a digital signal processor (DSP) 65 which selectively turns the sub-picture data from the sub-picture decoder section 62 into a mosaic pattern or painting the data with black is provided between the sub-picture decoder section 62 and the mixing section 64 in the structure in FIG. 1.

In the case where an 8×8 dot mosaic is to be generated, this DSP 65 comprises a first sample and hold section for sampling and holding data input dot by dot, a first line memory for storing the output of the first sample and hold section, a second sample and hold section for sampling and holding the output of the first line memory for one line, a second line memory for storing one line of data from the second sample and hold section, a first frequency divider for sending a timing signal, obtained by dividing the horizontal dot clock by 8, to the first sample and hold section, and a second frequency divider for sending a timing signal, obtained by dividing the vertical sync signal by 8, to the second sample and hold section.

Figure 58A:
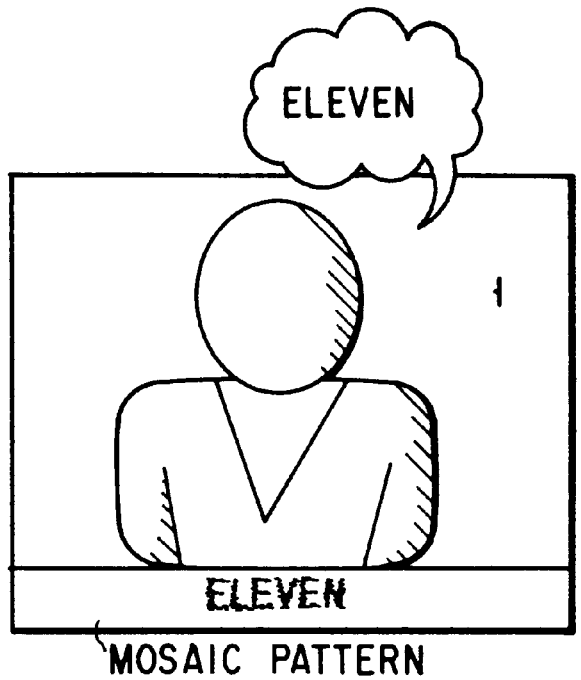
FIGS. 58A and 58B show the output states of video data, audio data and sub-picture data at the time of presenting the mosaic display of sub-pictures for a delay time.
Figure 58B:
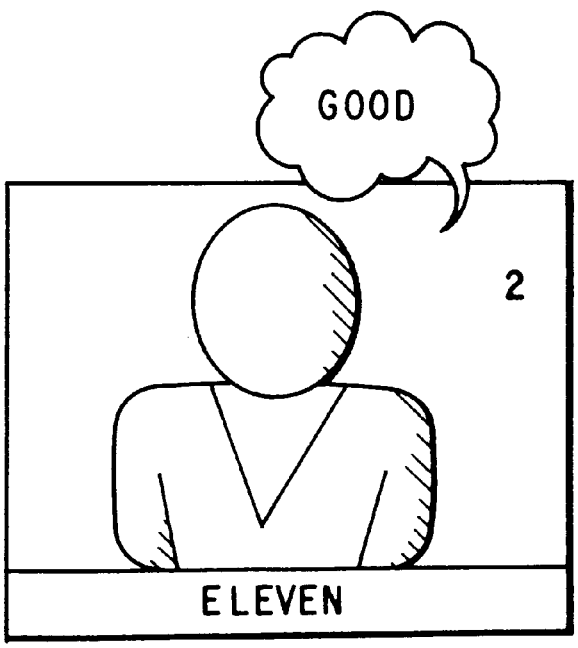

At the first timing, as shown in FIG. 58A, the image of the teacher saying "ELEVEN" as the main picture and the superimposition "ELEVEN" as the sub-picture which has been turned to a mosaic pattern by the DSP 65 are superimposed on the monitor section 6, and the teacher's voice "ELEVEN" is reproduced from the speaker section 8. At the next timing, as shown in FIG. 58B, the image of the teacher saying "GOOD" and the superimposition "ELEVEN" as the sub-picture are superimposed on the monitor section 6 and the teacher's voice "GOOD" is reproduced from the speaker 8.

The reproduction of the no-sound period between phrases may be skipped.

A special reproduction, such as a strobe effect or after-image effect, may be accomplished by performing predetermined data processing on the main picture data, delayed in the above-described manner, and combining the processed main picture data with main picture with the zero delay time.

Next, the video data in the logic formats shown in FIGS. 4 to 31, a method of recording data on the optical disk 10 to reproduce the video data, and a recording system to which the recording method is applied will be explained with reference to FIGS. 59 to 64.

FIG. 59 shows an encoder system that creates a video file of a title set 84 in which the video data is encoded. In the system of FIG. 59, for example, a videotape recorder (VTR) 201, an audiotape recorder (ATR) 202, and a sub-picture source 203 are used as sources of the main video data, the audio data, and the sup-picture data. Under the control of a system controller (Sys con) 205, they create the main video data, audio data, and sup-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the main video data, audio data, and sup-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Sub-pict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

According to the flow of FIG. 60, the main video data and the audio data are encoded and the encoded main video data and audio data (Comp Video, Comp Audio) are supplied. Specifically, when the encoding process is started, as shown in step S70 of FIG. 60, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data is set. As shown in step S274, part of the parameters are stored in the system controller (Sys con) 205 and used in the file formatter (FFMT) 214. On the basis of the parameters, the sub-picture data is encoded. By the process, the sup-picture data is encoded.

According to the flow of FIG. 61, the encoded main video data, audio data, and sup-picture data (Com Video, Com Audio, Comp Sub-pict) are mixed and converted so as to form a video data title set structure as explained in FIGS. 4 and 12. Specifically, as shown in step S276, a cell is set as the smallest unit of the video data and cell playback information on a cell (C_PBI) is created. Then, as shown in step S277, the structure of the cells constituting a program chain and the main video, sub-picture, and audio attributes (the information obtained in encoding the respective data items are used part of these attributes) are set and the video title set information management table information (VTSI_MAT) 98 containing information on a program chain and a video title set time search map table (VTS_MAPT) 142 are created. At this time, as the need arises, a video title set direct access pointer table (VTS_DAPT) is also created. The encoded main video data, audio data, and sup-picture data (Com Video, Comp Audio, Comp Sup-pict) are subdivided into specific packs. An NV pack is placed at the head of each VOBU unit so that playback can be effected in the order of time code of each data item. With the NV packs arranged this way, each data cell is positioned so that a video object (VOB) may be composed of a plurality of cells as shown in FIG. 6. A set of such video objects is formatted into the title set structure.

Time stamps like PTS and DTS are described in each pack.

According to the first embodiment, described in the PTS of a sub-picture, for example, is a time arbitrarily delayed from the PTS of main picture data or audio data which is to be reproduced in the same time slot as the sub-picture.

According to the second and other embodiments, the same time as described in the PTS of main picture data or audio data which is to be reproduced in the same time slot is described in the PTS of a sub-picture.

In the flow of FIG. 61, the program chain information (PGI) is obtained in the process of step S277 by using the database in the system controller (Sys con) 205 or entering data again as the need arises.

FIG. 62 shows a disk formatter system that records on an optical disk the title set formatted as described above. In the disk formatter system of FIG. 48, the memories 220, 222 in which the created title set is stored supply these file data items to a volume formatter (VFMT) 226. In the volume formatter (VFMT) 226 extracts the management information from the title sets 84, 86, produces a video manager 71, and create the logic data to be recorded on the disk 10 in the arrangement of FIG. 4. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described with reference to FIGS. 63 and 64. FIG. 63 shows the flow for creating the logic data to be recorded on the disk 10. Specifically, as shown in step S280, parameter data items, including the number of video data files, their arrangement, and the size of each video data file, are set first.

Next, in step S281 video manger 71 is generated from the parameters set and the video title set information 281 of each video title set 72. In step S282, the video manager 71 and the video tile set 71 are arranged in the order mentioned, according to their logic block numbers, thereby generating logic data which is to be recorded on the disk 10.

Thereafter, the flow for creating the physical data to be recorded on the disk as shown in FIG. 64 is executed. Specifically, as shown in step S283, the logic data is divided into units of a specific number of bytes, thereby forming error correction data. Next, as shown in step S284, the logic data divided into units of a specific number of bytes are mixed with the created error correction data to form physical sectors. Thereafter, as shown in step S285, physical data is created by combining physical sectors. In this way, the modulating process based on certain rules is performed on the physical data created in the flow of FIG. 64, thereby forming the recording data. Thereafter, the recording data is recorded on the disk 10.

Figure 65:
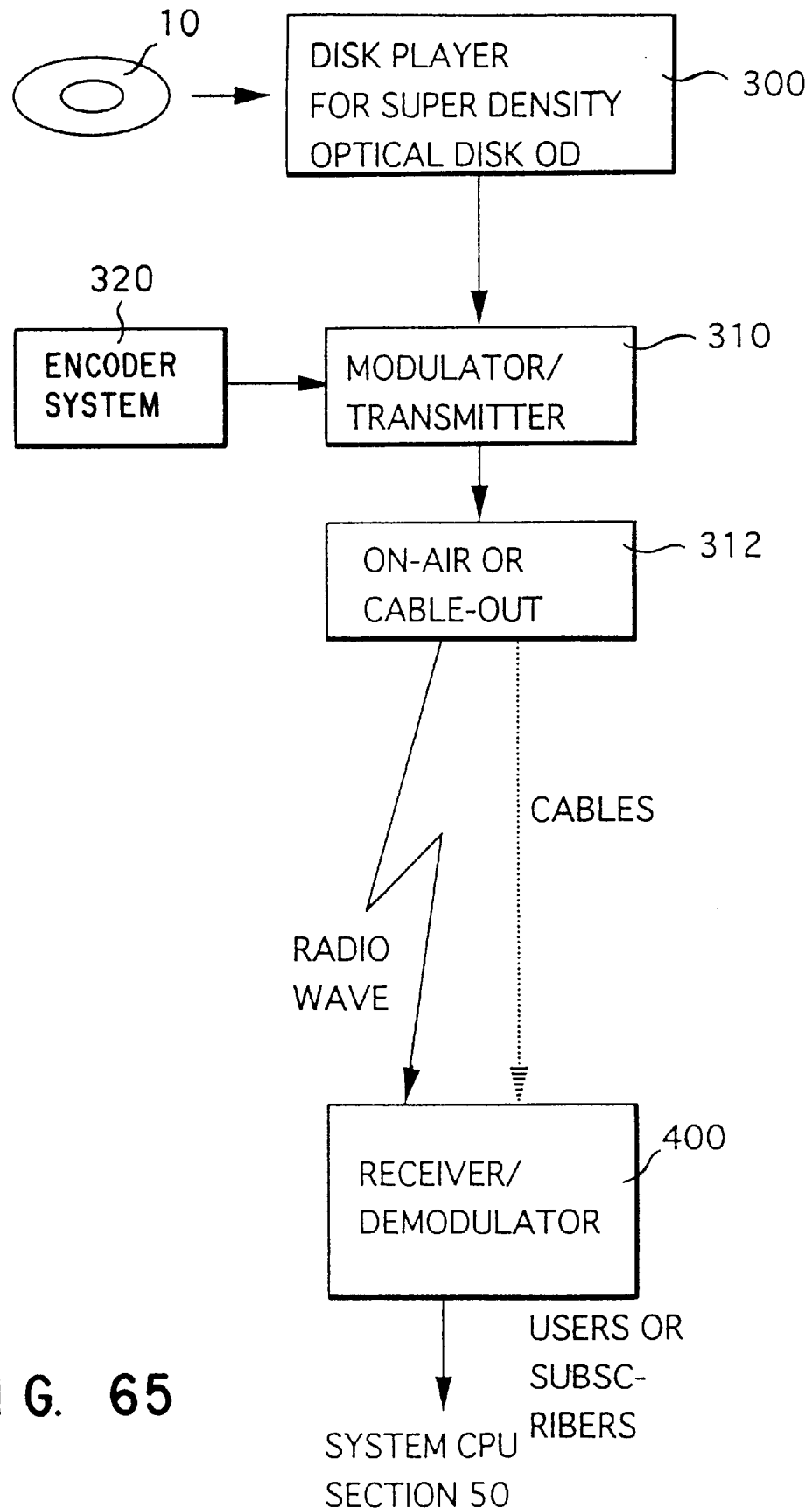
FIG. 65 is a schematic diagram of a system that transfers the video title set of FIG. 4 via a communication route.

The above-described data structure can be applied not only to a case where the data is recorded on recording mediums, such as optical disks, and then the disks are distributed to the users, but also to a communication system as shown in FIG. 65. Specifically, according to the procedure shown in FIGS. 59 to 62, an optical disk 10 in which a video manager 71 and video title set 72 as shown in FIG. 4 may be loaded into a reproducing unit 300, from whose system CPU section 50 the encoded data is taken out digitally and transmitted by a modulator/transmitter 310 to the users or the cable subscribers by radio or via a cable. Furthermore, the encoding system 320 shown in FIGS. 59 and 62 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing unit on the user or subscriber side of FIG. 1 in the same manner as in the above-described reproducing process, whereby the video data is reproduced.

In transferring the video title set 72, the video object sets 95, 96 are transferred using the video object unit 85 of FIG. 6 as a unit. At the head of the video object unit 85, an NV pack 86 containing video playback and search information is arranged. Furthermore, because the NV pack contains the addresses of the video object units to be reproduced immediately before and after the video object unit 85 to which the NV pack 86 belongs, even if the video object unit 85 is lost during transfer for some reason, the video object can be reproduced reliably on the user side by requesting the lost video object unit 85 to be transmitted again. Furthermore, even if transfer is not carried out in the order of playback of video object units, because the system ROM/RAM section 52 on the user side holds the accurate playback information on program chains, the system CPU section 50 can specify the order of playback referring to the address data in its NV pack.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of reproducing reproduction data from a recording medium, comprising:

acquiring from said recording medium a plurality of data units recorded thereon to be reproduced within a given time period, each of said data units containing a stream of a plurality of data packs and playback time information, said data packs containing packets of reproduction data including first and second audio data, main-picture data representing a motion picture, and sub-picture data used for bit mapping, wherein playback time information of a data unit including said sub-picture data to be reproduced within a given time period is later by a predetermined time than playback time information of a data unit including said first audio data and main-picture data to be reproduced within said given time period; and converting said data units into a reproduction signal in accordance with said playback time information included in said data units and reproducing said reproduction signal, wherein after said predetermined time elapses after reproduction data of said data unit including at least one of said first audio data and reproduction data of said data unit including main-picture data are simultaneously reproduced, reproduction data of said data unit including said sub-picture data is reproduced while said reproduction data of a data unit including main-picture data obtained during said predetermined time is kept reproduced, and wherein when reproduction of said reproduction data of said data unit including said sub-picture data is completed, reproduction data of a data unit including said second audio data and reproduction data of said data unit including main-picture data, both data being associated with said predetermined time, are simultaneously reproduced.

2. A method of reproducing reproduction data from a recording medium, comprising:

acquiring from said recording medium a plurality of data units recorded thereon to be reproduced within a given time period, each of said data units containing a stream of a plurality of data packs and playback time information, said data packs containing packets of reproduction data including first and second audio data, main-picture data representing a motion picture, and sub-picture data used for bit mapping, wherein playback time information of a data unit including said sub-picture data to be reproduced within a given time period is later by a predetermined time than playback time information of a data unit including said first audio data and main-picture data to be reproduced within said given time period; and converting said data units into a reproduction signal in accordance with said playback time information included in said data units and reproducing said reproduction signal, wherein while reproduction data of a data unit including main-picture data is being reproduced after said predetermined time, reproduction data of said data unit including said sub-picture data is reproduced, and when reproduction of said reproduction data of said data unit including said sub-picture data is completed, reproduction data of a data unit including said second audio data and reproduction data of said data unit including main-picture data, both data being associated with said predetermined time, are simultaneously reproduced.

3. A method of reproducing reproduction data from a recording medium, comprising:

acquiring from said recording medium a plurality of data units recorded thereon to be reproduced within a given time period, each of said data units containing a stream of a plurality of data packs and playback time information, said data packs containing packets of reproduction data including first and second audio data, main-picture data representing a motion picture, and sub-picture data used for bit mapping, wherein said playback time information of a data unit including said sub-picture data to be reproduced within a given time period is later by a predetermined time than playback time information of a data unit including said first audio data and main-picture data to be reproduced within said given time period; and converting said data units into a reproduction signal in accordance with said playback time information included in said data units and reproducing said reproduction signal, wherein after said predetermined time elapses after reproduction data of said data unit including at least one of main-picture data and reproduction data of said data unit including said sub-picture data are simultaneously reproduced, reproduction data of a data unit including said second audio data is reproduced while said reproduction data of said data unit including main-picture data obtained during said predetermined time is kept reproduced, and wherein when reproduction of said reproduction data of said data unit including said second audio data is completed, reproduction data of a data unit including third audio data and reproduction data of said data unit including main-picture data, both data being associated with said predetermined time, are simultaneously reproduced.

4. A method of reproducing reproduction data from a recording medium, comprising;

acquiring from said recording medium a plurality of data units recorded thereon to be reproduced in a time sequential manner within a given time period, each of said data units containing a stream of a plurality of data packs and playback time information, said data packs containing packets of reproduction data including at least one of main-picture data and audio data, and sub-picture data;

storing data corresponding to a predetermined delay time;

a first conversion step of converting a data unit acquired in said acquiring step and including at least one of the main-picture data and the audio data into a reproduction signal in accordance with said playback time information included in said data unit;

a first reproduction step of reproducing one of the main-picture data and the audio data from the reproduction signal produced in the first conversion step;

adding data corresponding to the delay time stored in the storing step to the playback time information included in a data unit acquired in said acquiring step and including sub-picture data;

storing said data unit acquired by the acquiring step and including sub-picture data for a predetermined period of time;

a second conversion step of converting the data unit including sub-picture data into a reproduction signal after a period of time calculated in said adding step has elapsed; and a second reproduction step of reproducing the sub-picture data from the reproduction signal obtained in the second conversion step.

* * * * *